US012689471B2

(12) United States Patent
Lou et al.

(10) Patent No.: US 12,689,471 B2
(45) Date of Patent: Jul. 21, 2026

(54) METHODS FOR ENHANCING WLAN WITH ADVANCED HARQ DESIGN

(71) Applicant: INTERDIGITAL PATENT HOLDINGS, INC., Wilmington, DE (US)

(72) Inventors: Hanqing Lou, Syosset, NY (US); Alphan Sahin, Westbury, NY (US); Xiaofei Wang, Cedar Grove, NJ (US); Oghenekome Oteri, San Diego, CA (US); Frank La Sita, Setauket, NY (US); Li-Hsiang Sun, San Diego, CA (US); Rui Yang, Greenlawn, NY (US); Joseph S. Levy, Merrick, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 383 days.

(21) Appl. No.: 17/292,072

(22) PCT Filed: Nov. 8, 2019

(86) PCT No.: PCT/US2019/060438
§ 371 (c)(1),
(2) Date: May 7, 2021

(87) PCT Pub. No.: WO2020/097441
PCT Pub. Date: May 14, 2020

(65) Prior Publication Data
US 2021/0399838 A1 Dec. 23, 2021

Related U.S. Application Data

(60) Provisional application No. 62/900,084, filed on Sep. 13, 2019, provisional application No. 62/846,215,
(Continued)

(51) Int. Cl.
| | |
|---|---|
| *H04L 1/18* | (2023.01) |
| *H04L 1/1812* | (2023.01) |
| *H04L 1/1829* | (2023.01) |

(52) U.S. Cl.
CPC .......... *H04L 1/1812* (2013.01); *H04L 1/1848* (2013.01)

(58) Field of Classification Search
CPC ....... H04L 1/1812; H04L 1/1848; H04L 1/08; H04L 1/1822; H04L 2001/0092; H04L 1/1845; H04L 1/1861; H04W 72/542
See application file for complete search history.

(56) References Cited

U.S. PATENT DOCUMENTS

| | | | |
|---|---|---|---|
| 9,191,469 B2 | 11/2015 | Wentink et al. | |
| 10,305,550 B2 | 5/2019 | Wang et al. | |

(Continued)

FOREIGN PATENT DOCUMENTS

| EP | 2180743 A1 * | 4/2010 | ............ H04W 36/18 |
|---|---|---|---|
| EP | 2862306 B1 | 7/2016 | |

(Continued)

OTHER PUBLICATIONS

Choi et al., "View on EHT Objectives and Technologies," IEEE 802.11-18/1171r0 (Jul. 8, 2018).

(Continued)

*Primary Examiner* — Vinncelas Louis
(74) *Attorney, Agent, or Firm* — Volpe Koenig

(57) ABSTRACT

Methods and apparatus for multi-hybrid automatic repeat request (HARQ) transmission are provided. An access point (AP) may transmit a multi-HARQ transmission to a plurality of stations (STAs). The AP may receive a H-ARQ feedback response from the plurality of STAs. The H-ARQ feedback may include a field to indicate that the H-ARQ feedback is a codeword (CW)/CW group (CWG) based acknowledg-
(Continued)

ment. The H-ARQ feedback may include a packet identification (ID). The packet ID may be a HARQ transmission ID, a sequence number, a MPDU ID or a PPDU ID. The packet ID may be carried in a PLCP header. The H-ARQ feedback may be an aggregated CW/CWG acknowledgment. The H-ARQ feedback may be carried in a null data packet (NDP). A PLCP header of the NDP packet may include a wideband PLCP header and a narrow band PLCP header.

14 Claims, 33 Drawing Sheets

Related U.S. Application Data filed on May 10, 2019, provisional application No. 62/790,852, filed on Jan. 10, 2019, provisional application No. 62/757,512, filed on Nov. 8, 2018.

(56) References Cited

U.S. PATENT DOCUMENTS

| | | | |
|---|---|---|---|
| 2006/0013161 A1 | 1/2006 | Suzuki | |
| 2012/0044925 A1* | 2/2012 | Lee | H04W 72/21 |
| | | | 370/338 |
| 2014/0050148 A1* | 2/2014 | Choi | H04L 1/1819 |
| | | | 370/328 |
| 2014/0233478 A1 | 8/2014 | Wentink et al. | |
| 2015/0110027 A1 | 4/2015 | Lim et al. | |
| 2015/0288427 A1* | 10/2015 | Wang | H04W 72/542 |
| | | | 370/329 |
| 2015/0295629 A1 | 10/2015 | Xia et al. | |
| 2016/0119969 A1* | 4/2016 | Vajapeyam | H04W 72/0453 |
| | | | 370/329 |
| 2016/0270100 A1 | 9/2016 | Ng et al. | |
| 2017/0126363 A1 | 5/2017 | Wang et al. | |
| 2017/0195089 A1* | 7/2017 | Lee | H04L 1/08 |
| 2017/0195915 A1 | 7/2017 | Zhang et al. | |
| 2018/0139012 A1 | 5/2018 | Hosseini et al. | |
| 2018/0205442 A1 | 7/2018 | Oteri et al. | |
| 2018/0263000 A1 | 9/2018 | Nabetani et al. | |
| 2019/0068331 A1* | 2/2019 | Lee | H04L 1/1861 |

FOREIGN PATENT DOCUMENTS

| | | | | |
|---|---|---|---|---|
| WO | 2008065697 A1 | 6/2008 | | |
| WO | WO-2009062185 A2 * | 5/2009 | | H04W 52/0241 |
| WO | 2015/006640 | 1/2015 | | |
| WO | 2015050995 A2 | 4/2015 | | |
| WO | 2015142932 A1 | 9/2015 | | |

OTHER PUBLICATIONS

Draft Standard for Information Technology—Telecommunications and information exchange between systems—Local and metropoli-tan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax D3.0 (Jun. 2018).
Gidvani et al., "6 GHz operation for 11ax," IEEE 802.11-18/1607r1 (Sep. 11, 2018).
Hart et al., "Recommended Direction for EHT," IEEE 802.11-18/1549r0 (Sep. 9, 2018).
IEEE Standard for Information technology—Telecommunications and information exchange between systems—Local and metropoli-tan area networks—Specific requirements; Part 11: Wireless LAN Medium Access Control (MAC) and Physical Layer (PHY) Speci-fications, IEEE Std. 802.11-2012 (Mar. 29, 2012).
IEEE Standard for Information technology—Telecommunications and information exchange between systems—Local and metropoli-tan area networks—Specific requirements; Part 11: Wireless LAN Medium Access Control (MAC) and Physical Layer (PHY) Speci-fications, IEEE Std. 802.11-2016 (Dec. 7, 2016).
IEEE Standard for Information technology—Telecommunications and information exchange between systems—Local and metropoli-tan area networks—Specific requirements; Part 11: Wireless LAN Medium Access Control (MAC) and Physical Layer (PHY) Speci-fications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropoli-tan area networks—Specific requirements; Part 11: Wireless LAN Medium Access Control (MAC) and Physical Layer (PHY) speci-fications; Amendment 5: Television White Spaces (TVWS) Opera-tion, IEEE 802.11af-2013 (Dec. 11, 2013).
Montemurro, "EHT TIG Agenda," IEEE 802.11-18/1067r2 (Jul. 10, 2018).
Oteri et al., "Coordinated Multi-AP Transmission for EHT," IEEE 802.11-19/0071r0 (Jan. 13, 2019).
Oteri et al., "Effect of Preamble Decoding on HARQ in 802.11be," IEEE 802.11-19/0390r0 (Mar. 9, 2019).
Oteri et al., "HARQ in Collision-Free and Collision-Dominated Environments," IEEE 802.11-19/0070r0 (Jan. 13, 2019).
Porat et al., "Distributed MU-MIMO and HARQ Support for EHT," IEEE 802.11-18/1116r0 (Jul. 6, 2018).
Shilo et al., "HARQ for EHT," IEEE 802.11-18/1587r1 (Sep. 3, 2018).
Yang et al., "Discussion on EHT Study Group Formation," IEEE 802.11-18/1180r0 (Jul. 9, 2018).
4G Americas, "LTE Aggregation and Unlicensed Spectrum," White Paper, pp. 1-27 (Nov. 2015).

\* cited by examiner

Special HARQ Process ID Value
Indicate HARQ Over Multiple AP$_s$
or a Multi-AP HARQ Field Special HARQ Process ID Value
Indicate HARQ Over Multiple AP$_s$
or a Multi-AP HARQ Field

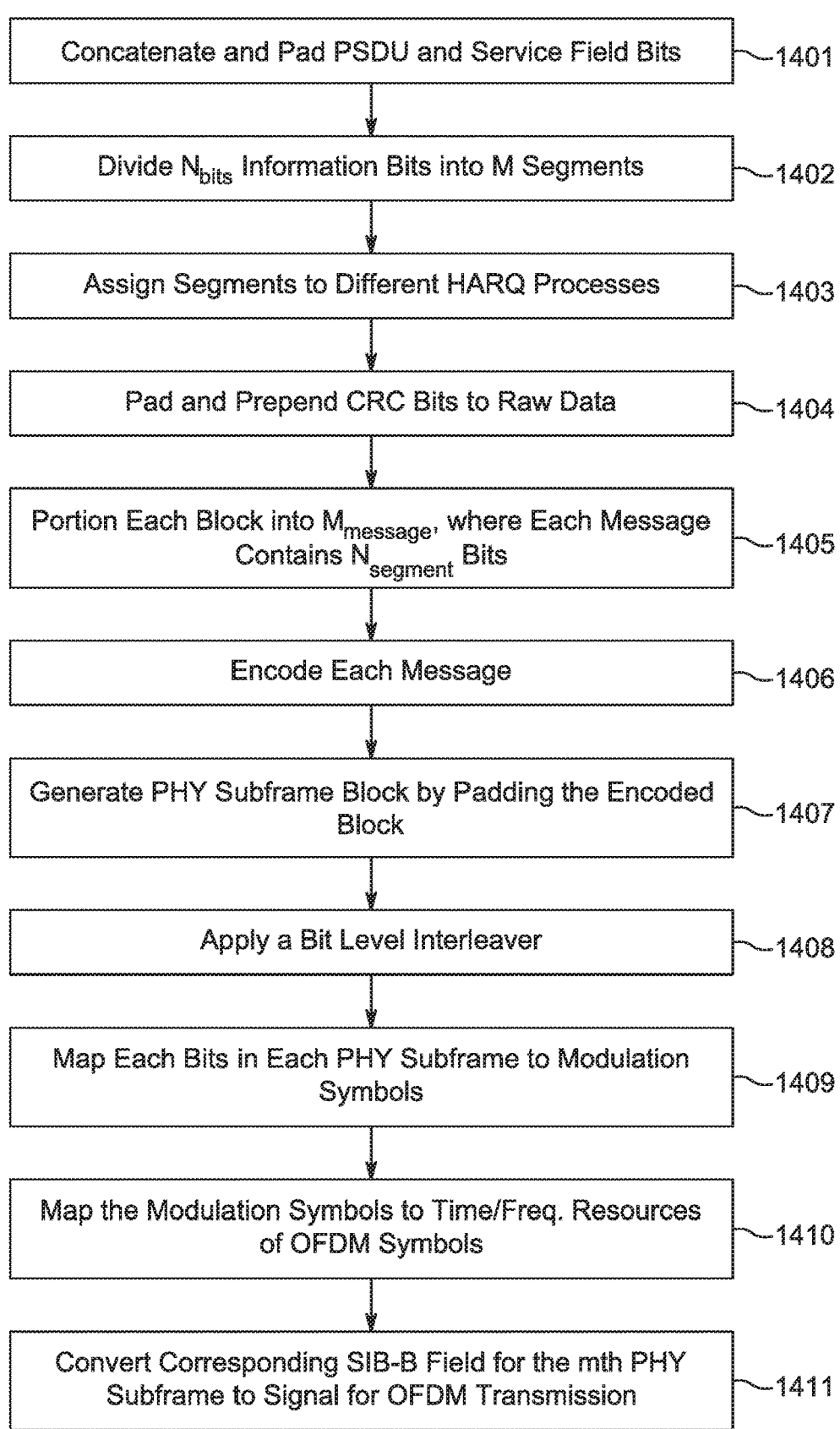

Concatenate and Pad PSDU and Service Field Bits —1401

Divide $N_{bits}$ Information Bits into M Segments —1402

Assign Segments to Different HARQ Processes —1403

Pad and Prepend CRC Bits to Raw Data —1404

Portion Each Block into $M_{message}$, where Each Message Contains $N_{segment}$ Bits —1405

Encode Each Message —1406

Generate PHY Subframe Block by Padding the Encoded Block —1407

Apply a Bit Level Interleaver —1408

Map Each Bits in Each PHY Subframe to Modulation Symbols —1409

Map the Modulation Symbols to Time/Freq. Resources of OFDM Symbols —1410

Convert Corresponding SIB-B Field for the mth PHY Subframe to Signal for OFDM Transmission —1411

FIG. 14A

Anchor AP ⌐2802

Servant AP ⌐2803

Same LTF/STF for a given SS (e.g., SS1)

STA ⌐2801

SS1

SS2

Band A ⌐2805

METHODS FOR ENHANCING WLAN WITH ADVANCED HARQ DESIGN

CROSS-REFERENCE TO RELATED APPLICATIONS

This application is the U.S. National Stage, under 35 U.S.C. § 371, of International Application No. PCT/US2019/060438 filed Nov. 8, 2019, which claims the benefit of the following U.S. Provisional Applications, all of which are incorporated herein by reference: 62/757,512 filed on Nov. 8, 2018; 62/790,852 filed on Jan. 10, 2019; 62/846,215 filed on May 10, 2019; and, 62/900,084 filed on Sep. 13, 2019.

BACKGROUND

In the field of wireless communication, several different protocols exist that address different technologies and use cases. For example, the 802.11 protocols address wireless local area networks. As new use cases arise, the protocols may need to be adapted and improved to address the new use cases.

SUMMARY

Methods and apparatus for multi-access point (AP) hybrid automatic repeat request (HARQ) transmission are provided. In an embodiment, a method comprises a station (STA) monitoring a channel. The method further comprises receiving a packet on the channel from a first AP. The first AP indicates that the packet is a multi-AP HARQ transmission. The method further comprises determining that a received first AP identification (AID) is associated with the first AP. The method further comprises determining that the received packet is a multi-AP HARQ transmission. The method further comprises determining that the received packet is a retransmission. The method further comprises determining that a timer is not expired. The method further comprises combining the received packet with a saved packet. The method further comprises decoding the combined packet successfully. The method further comprises stopping the timer. The method further comprises sending an acknowledgment to the first AP based on an acknowledgment policy.

Methods and apparatus for multi-hybrid automatic repeat request (HARQ) transmission are provided. A method may comprise an access point (AP) transmitting a multi-HARQ transmission to a plurality of stations (STAs). The multi-HARQ transmission may comprise a plurality of transmissions to each of the plurality of STAs for a plurality of H-ARQ processes. The method may comprise receiving a H-ARQ feedback response from the plurality of STAs. The method may comprise the AP transmitting a H-ARQ feedback response trigger message to the plurality of STAs. The method may comprise the AP receiving the H-ARQ feedback response based on the H-ARQ feedback response trigger message. The H-ARQ feedback response trigger message may comprise STA identifications (IDs). The H-ARQ feedback response trigger message may comprise a set of resource units (RUs) for a STA to use. The H-ARQ feedback response trigger message may comprise a resource unit (RU) factor that indicates a number of RUs that are allowed for uplink transmission. The RU factor may include a RU purpose. The RU purpose may be a repetition transmission. The RU purpose may be an independent transmission.

The H-ARQ feedback may include a field to indicate that the H-ARQ feedback is a codeword (CW)/CW group (CWG) based acknowledgment. The H-ARQ feedback may include a packet identification (ID). The packet ID may be a HARQ transmission ID, a sequence number, a MAC protocol data unit (MPDU) ID or a physical layer convergence protocol (PLOP) protocol data unit (PPDU) ID. The packet ID may be carried in a PLOP header. The H-ARQ feedback may be an aggregated CW/CWG acknowledgment. The H-ARQ feedback may be carried in a null data packet (NDP). The NDP packet may include a PLOP header. The PLOP header of the NDP packet may include a wideband PLOP header and a narrow band PLOP header.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 is a transmission diagram illustrating an example of a multi-AP HARQ uplink transmission;

FIG. 14A is a flow diagram that illustrates an example transmission process using a unique SIG-B field for each HARQ process;

DETAILED DESCRIPTION

Figure 1A:
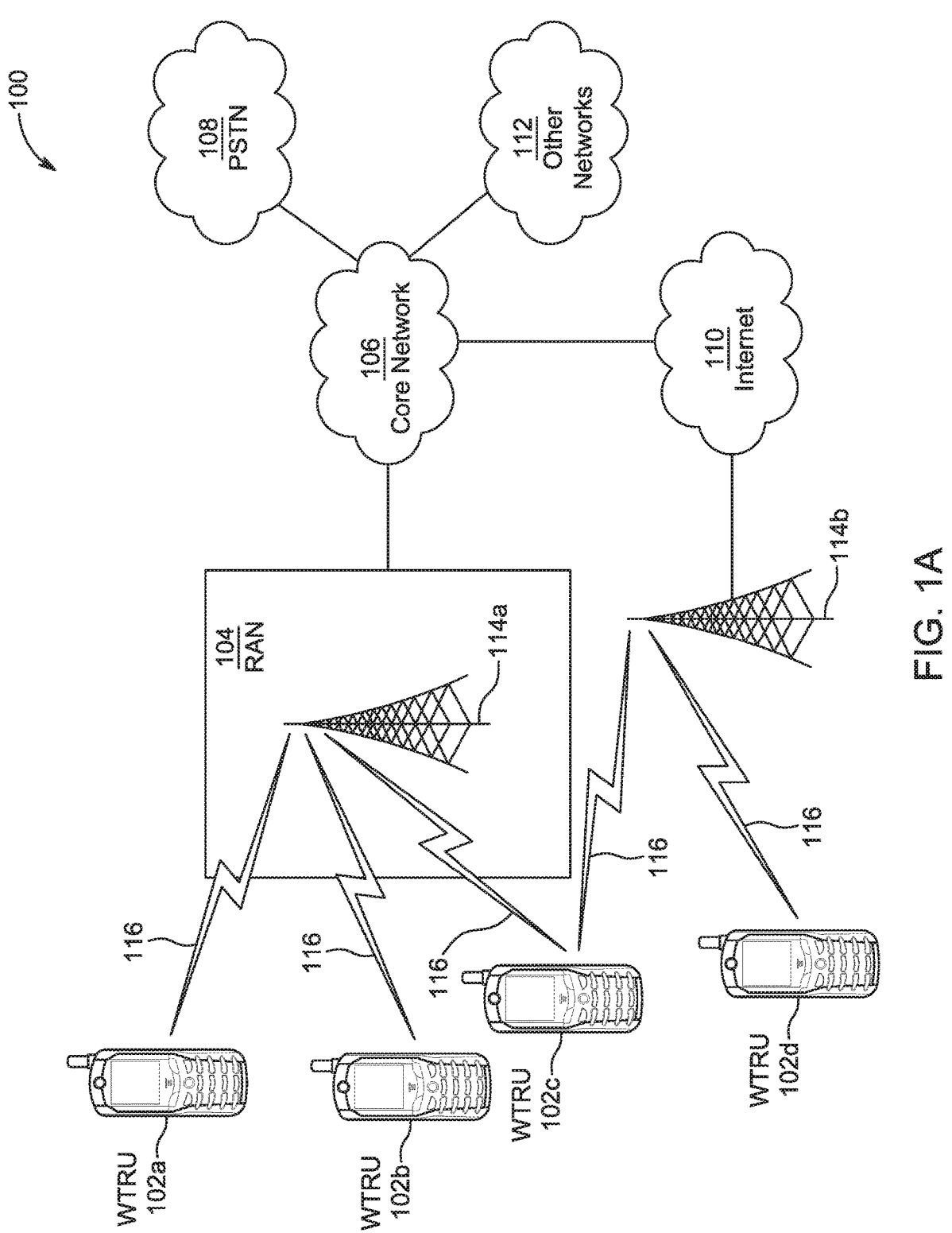
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, may be configured to transmit and/or receive wireless signals and may be equivalent to, or include, a user equipment (UE), a mobile station, a fixed or mobile subscriber unit, a subscription-based unit, a pager, a cellular telephone, a personal digital assistant (PDA), a smartphone, a STA, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE. As discussed herein, a WTRU may interchangeably be referred to as a STA, and a STA may be interchangeably referred to as a WTRU; as disclosed herein a STA and a WTRU may be equivalent and/or the same.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one scenario, the base station 114a may include three transceivers (e.g., one for each sector of the cell). In one scenario, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In one scenario, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In one scenario, the base station 114a and the WTRUs 102a, 102b, 102c may implement a radio technology such as NR Radio Access, which may establish the air interface 116 using NR.

In one scenario, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other scenarios, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one scenario, the base station 114b and the WTRUs 102c, 102d may implement a radio technology such as IEEE 802.11 to establish a wireless local area network (WLAN). In one scenario, the base station 114b and the WTRUs 102c, 102d may implement a radio technology such as IEEE 802.15 to establish a wireless personal area network (WPAN). In another scenario, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
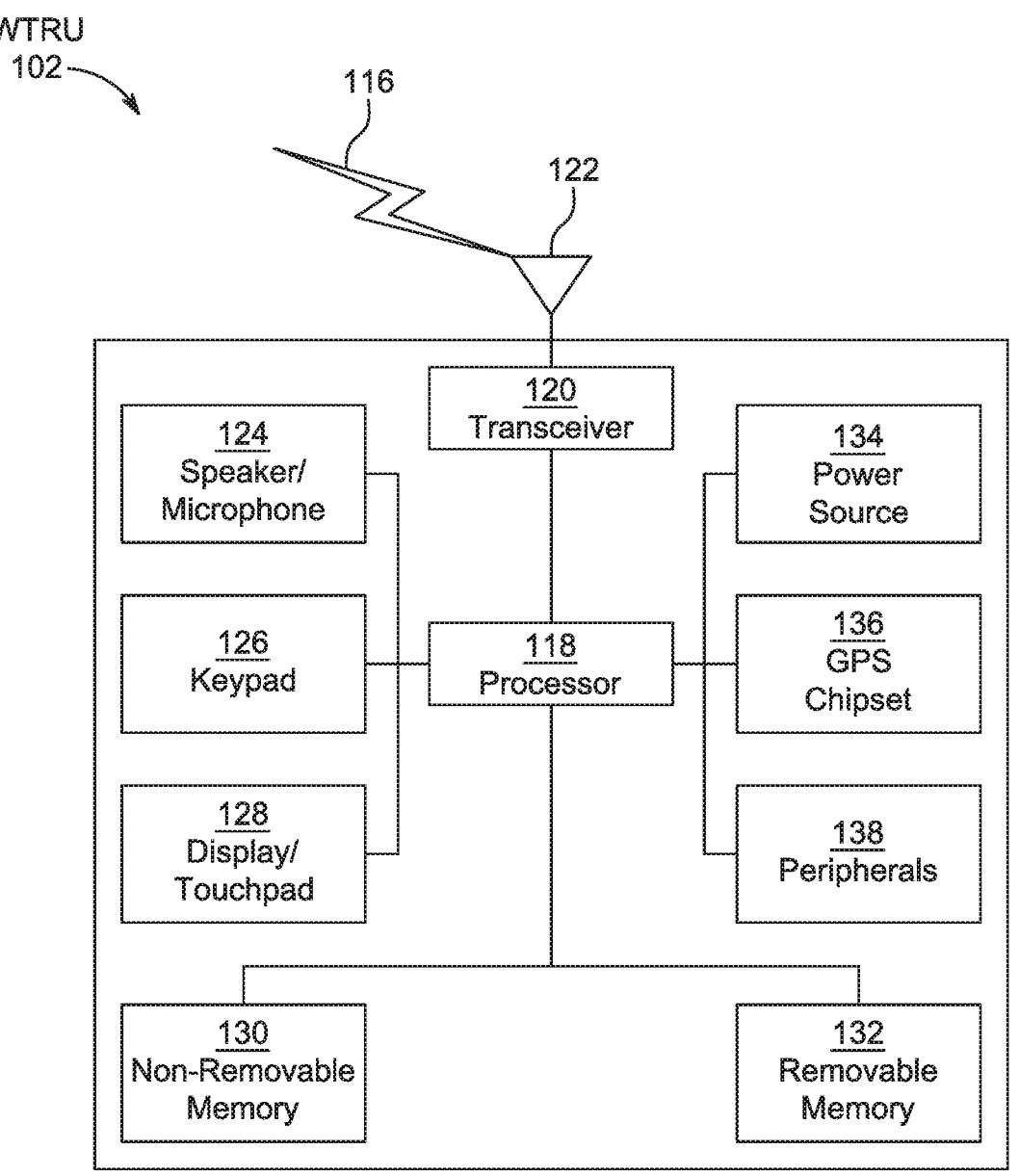
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, the transmit/receive element 122 may be an antenna configured to transmit and/or receive RF signals. In one scenario, the transmit/receive element 122 may be an emitter/detector configured to transmit and/or receive IR, UV, or visible light signals, for example. In another scenario, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one scenario, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality (VR) and/or Augmented Reality (AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In one scenario, the WTRU 102 may include a half-duplex radio for which transmission and reception of some or all of the signals (e.g., associated with particular subframes for either the UL (e.g., for transmission) or the DL (e.g., for reception)).

Figure 1C:
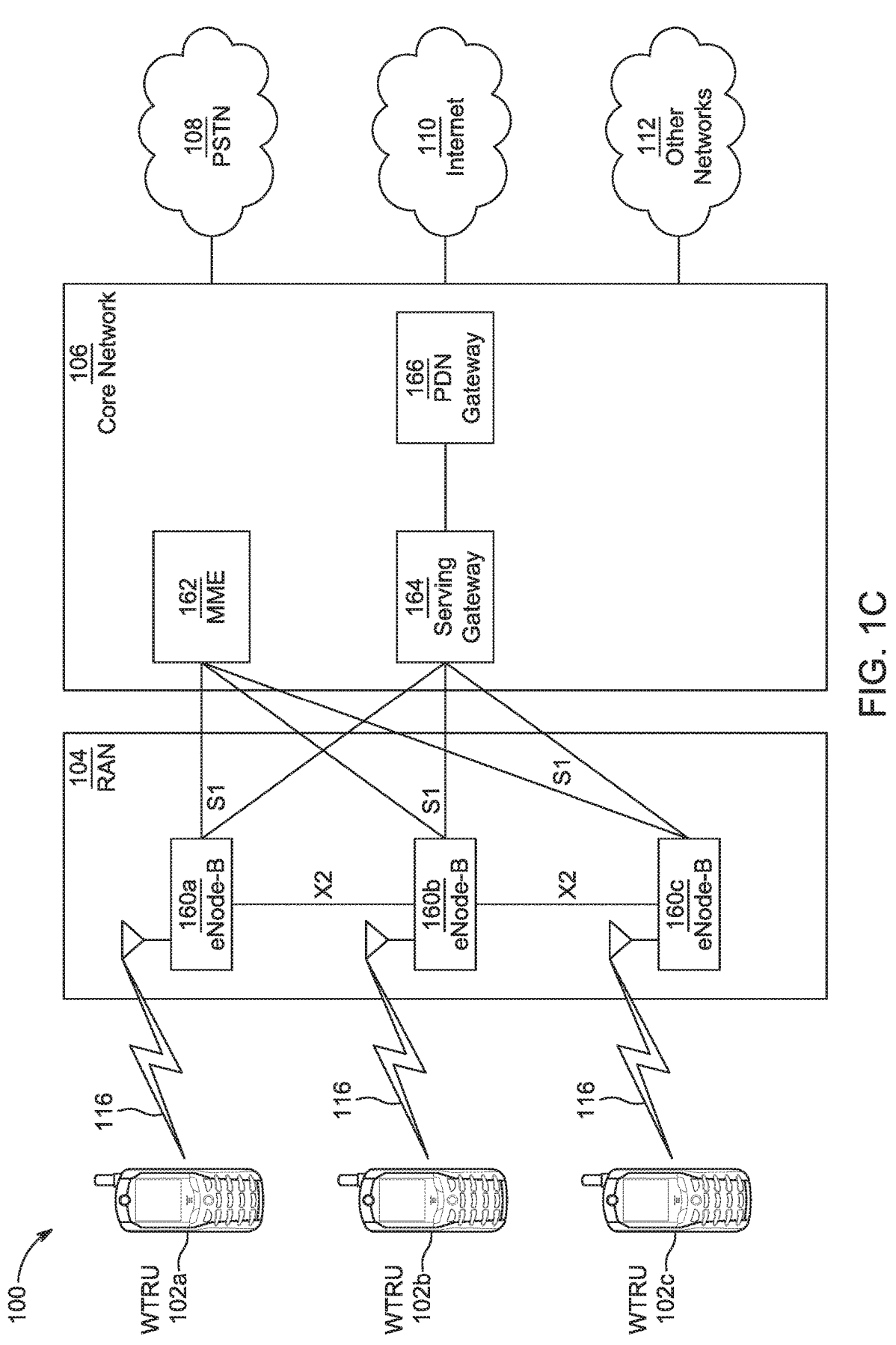
FIG. 1D is a system diagram illustrating a further example RAN and a further example CN that may be used within the communications system illustrated in FIG. 1A according to an embodiment.
FIG. 1E is a system diagram illustrating an example communications system in which one or more disclosed embodiments may be implemented.

FIG. 1C is a system diagram illustrating the RAN 104 and the CN 106 according to one or more embodiments. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one scenario, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1E as a wireless terminal, it is contemplated that in certain representative embodiments that such a terminal may use (e.g., temporarily or permanently) wired communication interfaces with the communication network.

Figure 1D:
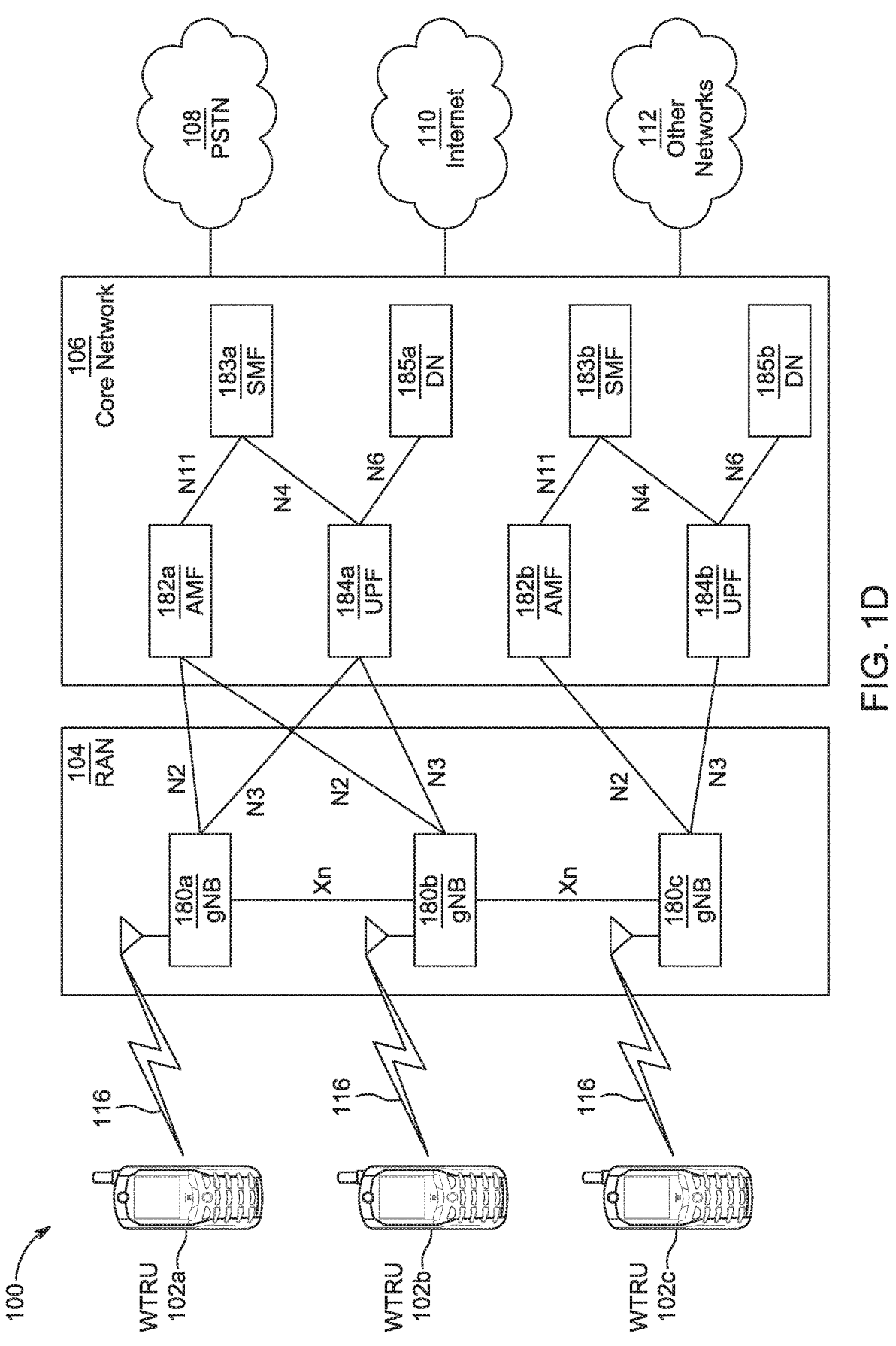

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one scenario, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In one scenario, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In one scenario, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one scenario, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1E, and the corresponding description of FIGS. 1A-1E, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, APs 190a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1E:
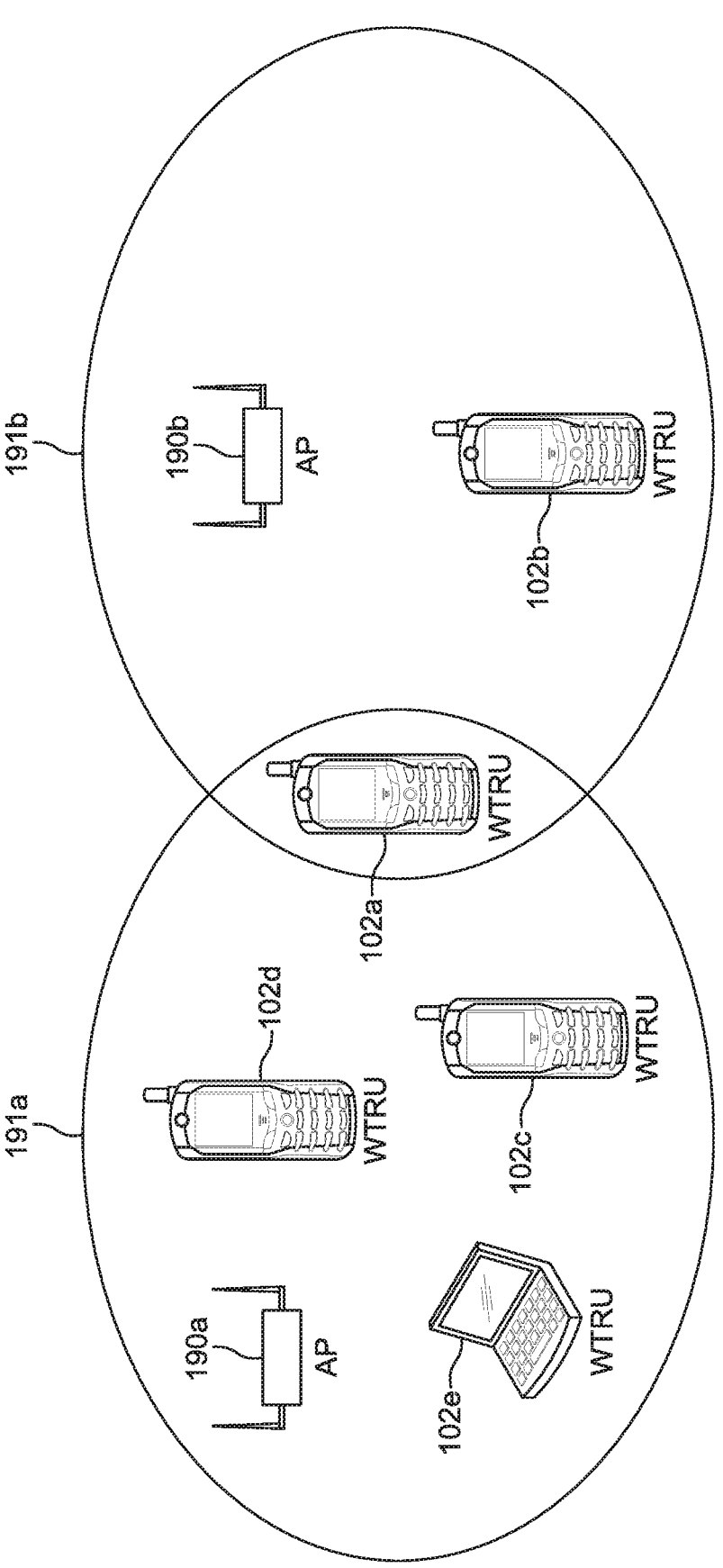

In some examples, the other network 112 of FIG. 1A may be a wireless local area network (WLAN), such as defined by IEEE 802.11. FIG. 1E is a system diagram illustrating an example communication system (e.g., WLAN).

A WLAN in Infrastructure Basic Service Set (BSS) 191a and 191b mode may each have an Access Point (AP) 190a and 190b, respectively, for the BSSs 191a and 191b and one or more WTRUs 102a-e (e.g., STAs) associated with the APs 190a, 190b. As discussed herein, a given BSS may be referred to as a network and may refer to communication that occurs locally. The APs 190a, 190b may have access or an interface to a Distribution System (DS) or another type of wired/wireless network that carries traffic in to and/or out of the BSS (not shown). Traffic to WTRUs that originate from outside of a BSS (e.g., 191a, 191b) may arrive through an AP (e.g., 190a, 190b) and may be delivered to the WTRUs. Traffic originating from WTRUs 190c-e to destinations outside BSS 191a may be sent to the AP 190a to be delivered to respective destinations. Traffic between WTRUs 190c-e within the BSS 191a may be sent through the AP 190a, for example, where the source WTRU 102c may send traffic to the AP 190a and the AP 190a may deliver the traffic to the destination STA 190d. Traffic between STAs (e.g., 190c-e) within a BSS (e.g., 191a) may be considered and/or referred to as peer-to-peer traffic. The peer-to-peer traffic may be sent between (e.g., directly between) the source and destination WTRUs with a direct link setup (DLS). In some cases, the DLS may use an 802.11e DLS or an 802.11z tunneled DLS (TDLS).

In some cases, a WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, an AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In some situations, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, then that particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. In some situations, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems that may support multiple channels and channel bandwidths, such as 802.11n, 802.11ac, 802.11af, and 802.11ah, may include a channel that may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (e.g., which supports only a 1 MHz operating mode) transmitting to the AP, all available frequency bands may be considered busy even though a majority of the available frequency bands remains idle.

In the United States the available frequency bands that may be used by 802.11ah may be from 902 MHz to 928

MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Generally, the High Efficiency WLAN (HEW) may enhance the quality of service that all users experience for a broad spectrum of wireless users in many usage scenarios including high-density scenarios in the 2.4 GHz, 5 GHz and 6 GHz band. Use cases that support dense deployments of APs, and STAs, and associated Radio Resource Management (RRM) technologies may be included in HEW. Potential applications for HEW may include usage scenarios high user density scenarios (e.g., train stations, stadium events, enterprise/retail environments, etc.), may address increased dependence on video/data delivery and wireless services for medical applications. HEW may be implemented in 802.11ax.

Additionally, 802.11ax may address traffic for a variety of scenarios that have short packets. The scenarios include: Virtual office; TPC ACK; Video streaming ACK, Device/ Controller (Mice, keyboards, Game controls, etc.); Access— Probe request/response; Network selection—probe requests, ANQP; and Network management—Control frames.

802.11ax may have multi-user (MU) features that include UL and DL OFDMA and UL and DL MU-MIMO. Further, there may be mechanisms for multiplexing UL random access for different purposes.

Hybrid Automatic Repeat Request (HARQ) is a transmission error control technique in wireless communication networks, which relies on a combination of error correction codes and retransmissions. HARQ has been used in some communications systems such as 3GPP UMTS and LTE.

There are two popular types of HARQ combining schemes: Chase Combining (CC) HARQ and Incremental Redundancy (IR) HARQ.

For the Chase Combining HARQ scheme, each retransmission may contain the same data and parity bits. A receiver may use a Maximum Ratio Combining (MRC) to combine the received packet with a previous transmission. Chase Combining may be regarded as repetition coding, in which each retransmission increases the energy per bit to noise power spectral density ratio ($E_b/N_0$) at the receiver.

For the IR HARQ scheme, each retransmission may use a different set of coded bits (e.g., different redundancy versions generated by puncturing the encoder output). For turbo code, this means different systematic and parity bits. At each retransmission, the receiver may gain extra information. The retransmission may contain only parity bits or may be self-decodable.

HARQ schemes may be categorized as either synchronous or asynchronous, with retransmissions in each case being either adaptive or non-adaptive. For synchronous HARQ, retransmissions for each process may occur at predefined times relative to the initial transmission. Hence, there is no need to signal a HARQ process ID, which may be inferred from the retransmission timing. For asynchronous HARQ, retransmissions may occur at any time relative to the initial transmission. Hence, explicit signaling is required to indicate a HARQ process ID to ensure that the receiver can correctly associate each retransmission with the corresponding previous transmission.

In LTE, the HARQ entity is located in the MAC layer, which is responsible for transmit/receive HARQ operations. The transmit HARQ operation includes the transmission and retransmission(s) of transport blocks, and reception and processing of ACK/NAK signaling. The receive HARQ operation includes reception of transport blocks, combining of the received data and generation of ACK/NAK signaling based on decoding results. In order to enable continuous transmission while previous transport blocks are being decoded, up to eight HARQ processes in parallel may be used to support multi-process 'Stop-And-Wait' (SAW) HARQ operation. Multi-process HARQ interlaces several independent SAW processes in time so that all the transmission resources can be used by one of the processes. Each HARQ process is responsible for a separate SAW operation and manages a separate buffer.

In LTE, asynchronous adaptive HARQ is used in the downlink and synchronous HARQ, which may be either adaptive or non-adaptive, is used in the uplink.

In LTE, the following signaling may be used to support HARQ: HARQ process ID (e.g., for asynchronous HARQ only); New Data Indicator (NDI), which may be toggled whenever a new packet transmission begins; Redundancy Version (RV), RV of the transmission block (e.g., for adaptive HARQ only); and Modulation and Coding Scheme (MCS)(e.g., for adaptive HARQ only).

In NR, the following HARQ features may be supported: multiple HARQ processes; dynamic and semi-static HARQ ACK codebook; codeword block group (CBG) level HARQ retransmission; asynchronous and adaptive HARQ; and flexible timing between data transmission and HARQ ACK feedback.

In NR, there may be CBG level HARQ retransmission, where a transmit block (TB) may contain one or more CBGs, which may have their own HARQ ACK bits. Thus, the transmitter may retransmit a partial TB. Two CBG related signaling fields, CBG transmission information (CBGTI) and CBG flushing out information (CBGFI), may be carried by downlink control information (DCI). The CBGTI indicates the CBG(s) that the (re)transmission carries. When the CBGFI is set to '0' it may indicate that the earlier received instances of the same CBGs being transmitted may be corrupted. When the CBGFI is set to '1' it may indicate that the CBGs being retransmitted are combinable with the earlier received instances of the same CBGs.

In NR unlicensed (NR-U), where devices operate in one or more unlicensed or shared frequency resources or in some combination of licensed and unlicensed bands, HARQ feedback may be transmitted on an unlicensed band. NR-U may utilize mechanisms to support flexible triggering and multiplexing of HARQ feedback for one or more DL HARQ processes. NR-U may handle reduced HARQ ACK/NAK transmission opportunities for a given HARQ process due to LBT failure by including mechanisms to provide multiple and/or supplemental time and/or frequency domain transmission opportunities. Additionally, NR-U may have transmissions of HARQ ACK/NAK for the corresponding data in the same shared channel occupation/occupancy time (COT). In some cases, the HARQ ACK/NAK has to be transmitted in a separate COT from the one the corresponding data was transmitted in.

For Extremely High Throughput (EHT) may address the increasing peak throughput and improve the efficiency of 802.11 networks. Use cases for EHT may comprise applications that require high throughput and low latency such as Video-over-WLAN, Augmented Reality (AR), and Virtual Reality (VR). EHT may employ one or more of the following features: Multi-AP; Multi-Band; 320 MHz bandwidth; 16 Spatial Streams; HARQ; Full Duplex (in time and frequency domain); AP Coordination; Semi-Orthogonal Multiple Access (SOMA); and new designs for 6 GHz channel access.

HARQ for EHT may be used to combat weak link adaptation. This HARQ may combine aggressive MCS and other PHY features to provide enhanced performance for the BSS edge coverage (e.g., coverage for STAs that are physically far away, and possibly at the furthest possible distance, from the nearest source of transmissions such as an AP or another STA). HARQ may be utilized in EHT cases, such as MU or Trigger Based (TB) PPDUs. HARQ may provide 10-30% of gain using chase combining and can potentially provide higher throughput gain if incremental redundancy is used.

While the processes, apparatuses, and systems concerning the techniques discussed herein generally relate to HARQ implementation in EHT scenarios, these techniques are also applicable to other wireless technologies and scenarios and none of the examples and instances of description are intended to be limiting in how, where, when, or to what these techniques may be applied.

In some use cases for EHT that involve low latency applications (e.g., gaming, Augmented Reality, Virtual Reality, etc.), STAs may need to transmit many small packets with low latency and high reliability. In one approach, UL/DL OFDMA may be used with HARQ to support these low latency and high reliability (e.g., ultra-reliable) applications. In one example, HARQ transmissions may be conducted concurrently over a number of Resource Units (RUs). As discussed herein, an RU may be a basic transmission unit of resources (e.g., time, frequency, etc.). An RU may be replaced by the resource of a sub-channel or channel. For example, a sub-channel may be a 20 MHz channel in 802.11.

Figure 2:
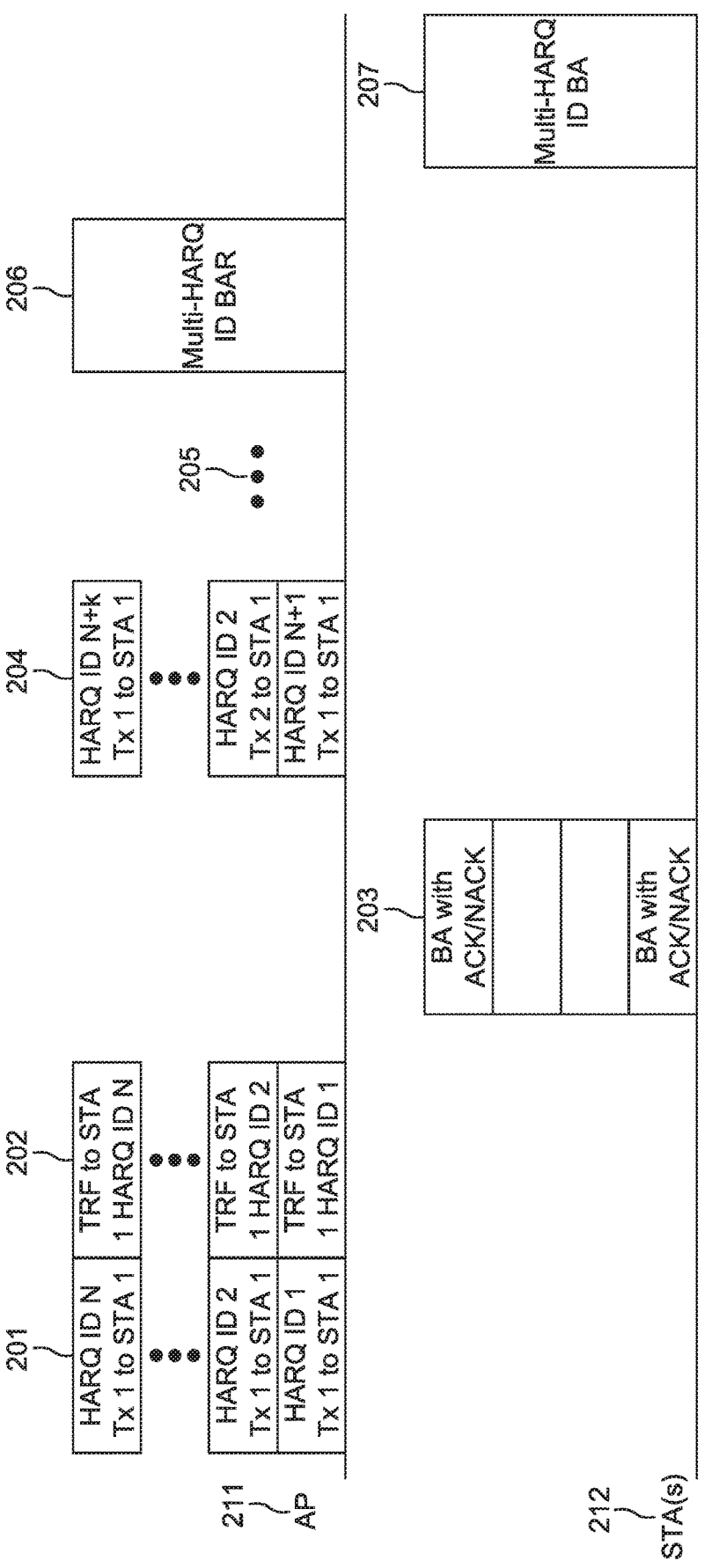
FIG. 2 is a transmission diagram illustrating an example of parallel HARQ processes through OFDMA for one or more STAs.

FIG. 2 is a transmission diagram illustrating an example of parallel HARQ processes through OFDMA. Initially, an AP 211 may assign multiple RUs to a single STA1 of a plurality of STAs 212. The AP 211 may assign N RUs to STA 1. At 201 and 202, the AP 211 may transmit multiple parallel transmissions with different HARQ Process IDs concurrently to STA 1, where each transmission is on a different RU: On RU 1, the AP 211 may transmit the first transmission for HARQ Process ID 1 (e.g., HARQ ID 1 Tx 1 to STA 1); on RU 2, the AP 211 may transmit the first transmission for HARQ Process ID 2 (e.g., HARQ ID 2 Tx 1 to STA 1); and, on RU N, the AP may transmit the first transmission for HARQ Process ID N.

There may be HARQ trigger frames (TRF) at 202 for each HARQ part to trigger HARQ responses from each STA, such as STA 1 (e.g., and any other STAs 212), and the TRF may be contained in the same PPDU that contains the HARQ transmissions. For example, TRF to STA1 HARQ ID 1 on RU 1, TRF to STA1 HARQ ID 2 on RU 2, and so on until a TRF to STA1 HARQ ID N on RU N.

In some cases, an AP may transmit the trigger frame for a HARQ process ID before it conducts the transmission for the HARQ data on one or more RUs (e.g., where 202 would be in front of 201).

At 203, HARQ responses may be sent from the STAs 212 (e.g., STA 1), such as one or more acknowledgment (ACK), a negative acknowledgment (NAK), or a block acknowledgment (BA) for a given HARQ process (e.g., ACK/NACK HARQ ID 1 transmitted in RU assigned in the HARQ Trigger frame). Note that for each RU there may not be a HARQ response as shown at 203 with the empty boxes, where each box corresponds to a RU.

The STA(s) 212 may indicate its HARQ response time to the AP 211 and vice versa. The STA(s) 212 may indicate the HARQ response time when it is associated with an AP (e.g., AP 211), and the AP 211 may include its HARQ response time in an element (e.g., an EHT capabilities element, a HARQ element, or the like). Such an indication may be included in a Probe Request/Response frame, beacon and short beacon frames, (Re)Association Request/Response frames, FILS discovery frames, or other types of control management frames.

At 204 and 205, the HARQ process may continue as necessary depending on whether the STAs 212 receive the prior HARQ transmission (e.g., at 201). Therefore, in some cases, a second transmission (Tx 2) may be needed but will have the same HARQ ID (e.g., HARQ ID 2 Tx 2 to STA 1). In other cases, where the transmission is successful, a new first transmission (Tx 1) with a new HARQ ID may be used in that resource, and the HARQ ID that was used previously may be incremented (e.g., HARQ ID N+1 Tx 1 to STA 1), and this would continue until some value k, or as needed (e.g., HARQ ID N+k Tx 1 to STA 1). At 205, one or more parts of this process may repeat (e.g., continued HARQ transmission, acknowledgment, etc.).

In some cases, such as where there is a known HARQ response time as described herein, the transmitting AP 211 may send a Multi-HARQ ID Block Acknowledgement Request (BAR) to the receiving STA(s) 212 to solicit responses about one or more HARQ process IDs at a scheduled time, or when the transmitting AP 211 acquires the channel and any HARQ response time has expired (e.g., see 206). The Multi-HARQ ID BAR may indicate the HARQ process IDs for the responses that are solicited.

At 207, in cases of where a Multi-HARQ ID BAR is sent, the receiving STA(s) 212 may then transmit a Multi-HARQ Block Acknowledgement (BA) to provide responses on the status of the HARQ operations for the HARQ process IDs indicated.

While the example of FIG. 2 is shown with a transmitting AP and a receiving STA, in some cases the transmitting AP (e.g., AP 211) may be replaced by a transmitting STA, and/or, the receiving STA may be replaced by an AP.

A STA that is conducting HARQ operations with another STA may not request HARQ ACK/NAK/BA from the other STA before the indicated HARQ response time, that starts at the end of a PPDU that contains the HARQ transmission, expires. The response may be in an RU as indicated by the trigger frame or over the entire channel bandwidth. Additionally, the HARQ ACK/NAK/BA may be implemented with several acknowledgment response options, such as: ACK, NAK, Not Ready, No Signal Detected, Collision, Interference, and Request to Restart the HARQ process. For the ACK acknowledgment option, this response may indicate that a HARQ transmission and/or its RVs have been correctly received and decoded. For the NAK acknowledgment option, this response may indicate that a HARQ transmission and/or its RVs have been received, but the decoding failed. NAK may also contain additional feedback information such as recommended RV, recommended MCS, recommended RU/channel, recommended retransmission, and the like. For the Not Ready acknowledgment option, this response may indicate that the receiving STA has detected signals of HARQ transmissions and/or its RVs, however, it has not finished decoding and needs more time before an ACK/NAK can be provided; this response option may also include an expected response time. For the No Signal Detected acknowledgment option, this response may indicate that the receiving STA has not detected HARQ transmissions and/or its RVs; this may be due to channel fading, destructive addition of signals, low transmit power, or other reasons. For the Collision acknowledgment option, this response may indicate that the HARQ transmission and/or its RV have experienced a collision with another packet or frame on the wireless medium; this may imply that the received signal may be useful for future combining and processing and a new transmission should be sent. For the Interference acknowledgment option, this response may indicate that there is strong interference, such as high-powered microwave energy or NR-U transmissions on the same band; this response may imply that the received signal may be useful for future combining and processing and a new transmission should be sent. For the Request to Restart the HARQ process acknowledgment option, this response may indicate that the receiver finds it more valuable to restart the HARQ process, instead of continuing with additional RV or retransmissions, which may be due to a bad signal, a bad received signal, bad channel conditions, or bad interference or collisions.

A transmitting STA receiving these responses (e.g., ACK, NAK, Not Ready, No Signal Detected, Collision, Interference, or Request to Restart the HARQ process) may conduct different operations. When receiving an ACK, the transmitting STA may delete buffered copies for the HARQ process ID and continue with the next HARQ process ID. When receiving a NAK, the transmitting STA may decide to transmit either another copy of the same frame, or an RV for the same HARQ process ID, to continue the HARQ operation for the HARQ process ID. If the number of retransmissions and/or RVs has reached a threshold, the transmitting STA may stop or abandon the HARQ process. When receiving a Not Ready response, the transmitting STA may send another HARQ Block ACK Request (BAR), or trigger frame, or MU HARQ BAR, to the receiving STA after some time has expired, to solicit a response to the current HARQ process ID. Such a time may be indicated by the receiving STA, such as a HARQ response time, or indicated in the Not Ready response. When receiving a response of No Signal Detected, Collision, or Interference, the transmitting STA may retransmit the packet/frame, or send another RV for the HARQ process ID. This may take place on a different RU or channel, or using a different transmit power, which may be recommended by the receiving STA in the previous response.

When receiving a response of Request to Restart the HARQ process, the transmitting STA may restart the current HARQ process, as if the previous transmissions for the current HARQ process ID has never taken place. This process may take place on a different RU or channel, or using a different transmit power, which may be recommended or indicated by the receiving STA in the previous response. The scheduling for a response for a HARQ process ID may be done in the header of the transmitted HARQ frames.

Figure 3:
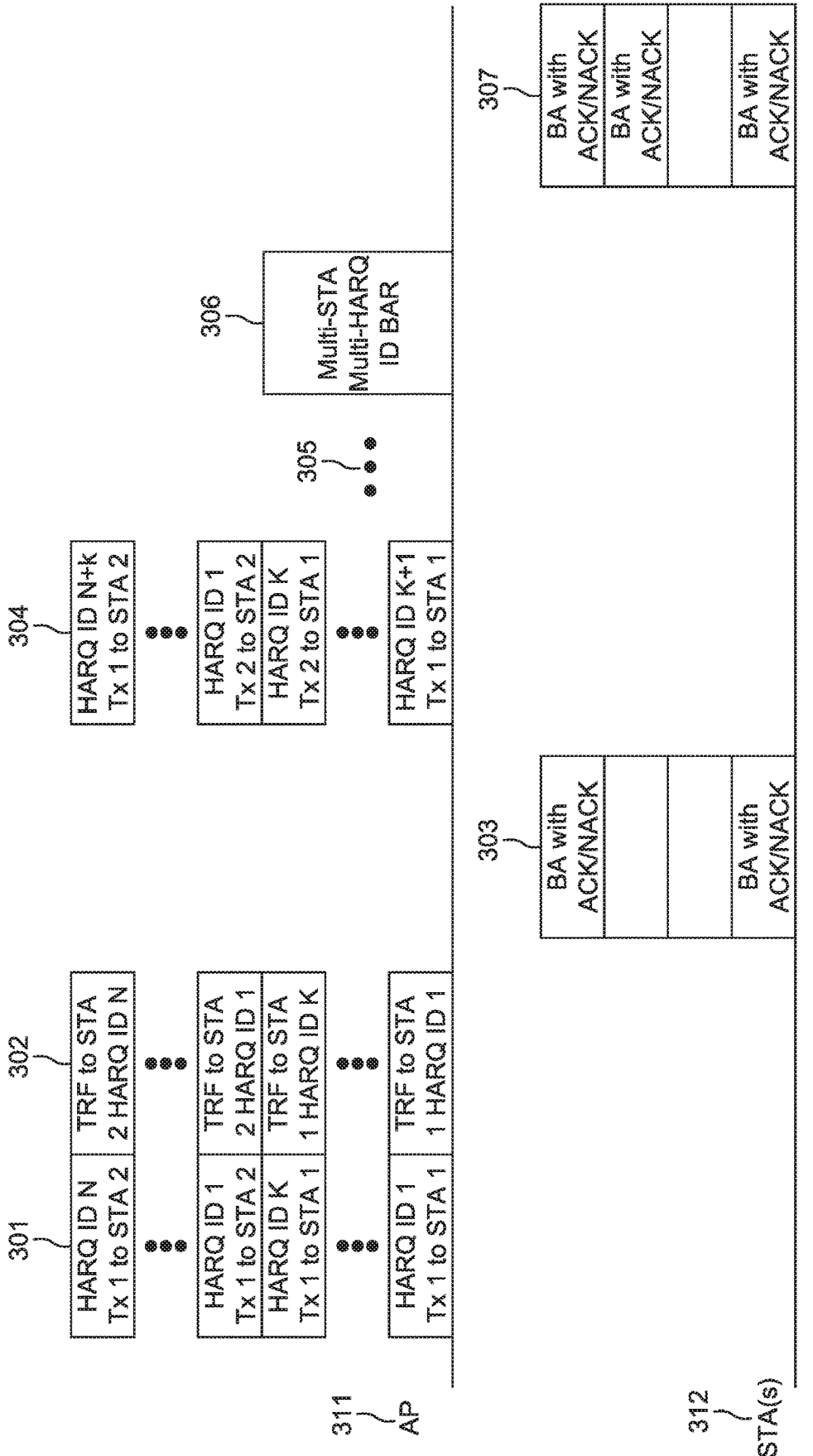
FIG. 3 is a transmission diagram illustrating an example of parallel HARQ processes through OFDMA for multiple STAs.

FIG. 3 is a transmission diagram illustrating an example of parallel HARQ processes through OFDMA for multiple STAs. FIG. 3 and FIG. 2 may be similar, except that FIG. 3 shows examples of multiple HARQ transmissions for multiple STAs. At 301 and 302, an AP 311 may transmit concurrent transmissions of multiple HARQ Process IDs for multiple STAs 312 (e.g., STA 1, STA 2, STA 3, etc.). For example, 301 shows an initial part of the packet transmission, where a TRF may follow as shown with 302. As shown, there may be a transmission of HARQ ID 1 Tx 1 to STA 1, and another concurrent transmission to the same STA 1 of different HARQ IDs, and concurrent HARQ transmissions to STA 2 of for multiple HARQ IDs.

At 302, HARQ trigger frames (TRF) for each HARQ ID may trigger HARQ responses from each STA 312, such as STA 1, and the TRFs may be contained in the same PPDU that contains the HARQ transmissions. For example, TRFs may be sent to STA 1 with HARQ ID 1 (e.g., TRF to STA 1 HARQ ID 1) to K, and concurrently TRFs to STA 2 for HARQ IDs 1 to N may be sent. Here, K and N are some whole numbers.

At 303, a response for parallel HARQ processes for multiple STAs 312 may be similar as described in the example of FIG. 2, and may be triggered by a trigger frame, or scheduled by the response scheduling field in the header of the HARQ transmissions, or triggered by a multi-STA multi-HARQ ID BAR frame in which resources may be allocated for the STAs to transmit their responses for the HARQ processes in the uplink. The trigger frame, response scheduling header, and/or the multi-STA multi-HARQ ID BAR frame may identify each of the tuples that may contain one or more of a HARQ process ID, a STA ID, or a traffic ID (TID) for each of the RU on which a HARQ process response is triggered.

At 304 and 305, the HARQ process may continue as necessary depending on whether the STAs receive the prior HARQ transmission (e.g., at 301). Where the transmission is unsuccessful, there may be a second transmission (Tx 2) with the same HARQ ID, (e.g., HARQ ID 1 Tx 2 to STA 2, or HARQ ID K Tx 2 to STA 1). Where the transmission is successful, there may be a new transmission with a new HARQ ID (e.g., HARQ ID K+1 Tx 1 to STA 1). At 305, one or more steps of this process may repeat (e.g., continued HARQ transmission, acknowledgment, etc.).

In some cases, such as where there is a known HARQ response time as described herein, the transmitting AP 311 may send a Multi-HARQ ID Block Acknowledgement Request (BAR) to the receiving STA(s) 312 to solicit responses about one or more HARQ process IDs at a scheduled time, or when the transmitting AP 311 acquires the channel and any HARQ response time has expired (e.g., see 306). The Multi-HARQ ID BAR may indicate the HARQ process IDs for the responses that are solicited. The responses at 307 may contain one or more of a HARQ Process ID, a STA ID, or a TID. The STA ID may be the MAC address or association ID (AID), or compressed forms of these or other IDs.

In some cases, a trigger frame (TRF) may be used by an AP to trigger transmissions of multiple HARQ process IDs from the same or multiple STAs concurrently in the uplink. The trigger frame may indicate STA IDs. For example, In some cases, a trigger frame may be used by an AP to trigger transmissions from multiple STAs concurrently in the uplink and indicate a set of RUs for the transmitting STAs and announce an RU factor Z that indicates a number of RUs allowed for uplink transmission. The AP may also indicate a purpose of the factor (e.g., repetition or independent transmission). The AP may determine a transmission method for a STA in each allocated RU. For example, the AP may assign an MCS, HARQ ID, RV, or the like. The AP may let a STA determine a transmission method, such as MCS, HARQ ID, RV, or the like.

Generally, a STA may be an associated STA (e.g., a STA that is associated with a network/AP/BSS) or a non-associated STA and may access a channel randomly to reduce latency. Transmitting STAs may choose Z RUs randomly. Each transmitting STA may create a HARQ ID for each selected RU if the purpose of the factor is independent transmission or may use the same HARQ ID if the purpose of the factor is repetition where the STA may repeat the information content (i.e., information bits) or complex symbols (e.g., the symbols in frequency) of a RU on Z RUs.

In some cases, a STA may use a different RV from RU to RU. For example, RUx and RUy may be assigned for repetition transmission. The STA may use the same HARQ ID for both RUs, however RUx may use RV0 and RUy may use RV1. A STA may use different MCSs for different RUs based on a multipath channel response on that RU in the downlink. A STA may use a different channel encoder structure for each RU and a rate may be set differently. In case of unequal PPDU length for different RUs, the shorter PPDU may be padded to maintain equal length. An UL PPDU length may be determined by the AP and may be carried in the trigger frame.

Generally, the AP may decode the content in an announced RU(s). If the AP is able to decode the packet, it may transmit an ACK for each RU or BA for all RUs. If the AP cannot decode the packet, it may transmit a NACK. The AP may indicate why it cannot decode the packet during a NACK transmission (e.g., collision, interference, and low SNR).

Figure 4:
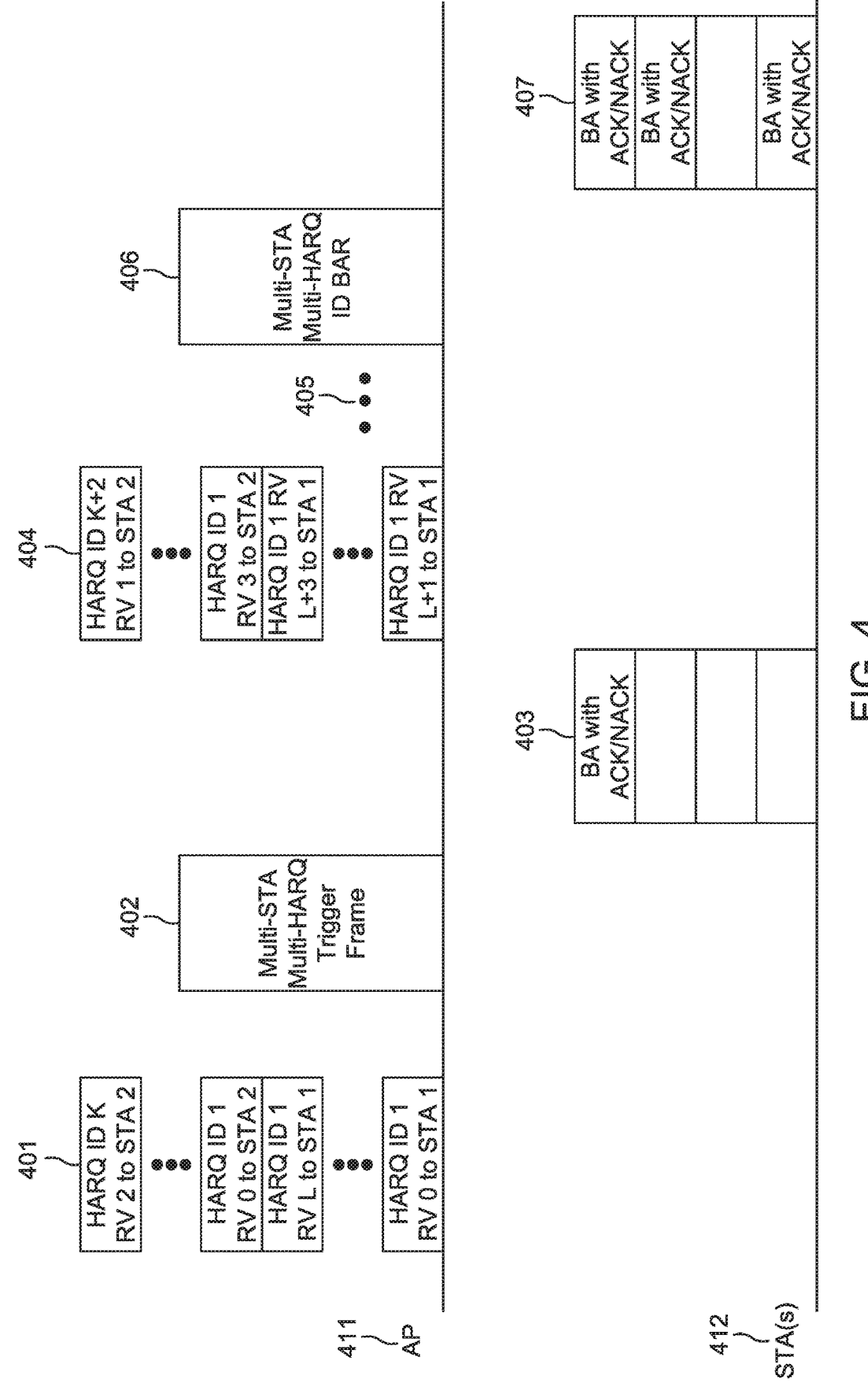
FIG. 4 is a transmission diagram illustrating an example of parallel RV transmissions for one or more STAs through OFDMA.

FIG. 4 is a transmission diagram illustrating an example of parallel RV transmissions for one or more STAs through OFDMA. In this example, different RVs of the same HARQ process may be transmitted for the same or multiple STAs concurrently.

At 401 an AP 411 may transmit parallel RVs of one or more HARQ IDs to one or more STAs 412 (e.g., STA 1, STA 2, STA 3, etc.) through OFDMA. The AP 411 may transmit RV 0 for HARQ ID 1 to STA 1 on RU 1, then RV 1 for HARQ ID 1 to STA1 on RU 2 (not shown), and this may continue until RV L for HARQ ID 1 to STA1 on another RU, where L is the number of RVs assuming a new RV is sent in each RU. The RU(s) chosen for transmission may not be consecutive. Similarly, for STA 2, the AP 411 may transmit RV 0 of HARQ ID 1 to STA 2 concurrently on another RU. This approach may also be repeated for each HARQ ID for a given STA (e.g., HARQ 2, 3, etc.). This process may continue for all STAs 412. In this example, the last concurrent transmission may be HARQ ID K RV 2 STA 2.

At 402, after a HARQ response time has expired for example, AP 411 may transmit a trigger frame to trigger HARQ responses from the STAs 412. The trigger frame may identify the RU resources for the STAs 412 to transmit their response at 403 on for one or more HARQ process IDs. Alternatively, such responses 403 may be triggered by a response scheduling header carried in the HARQ transmission frames or other type of transmissions.

At 404 the AP may transmit multiple RVs to a number of STAs incrementing the RV numbers based on the prior transmissions already sent depending on whether the initial transmission was successful. For instance, assuming HARQ is not successful for STA 1 and HARQ ID 1, the AP 411 may transmit HARQ ID 1 to STA 1 with RV L+1, where L was the last RV sent for HARQ ID 1 of STA 1. This may continue for STA 1, and in this example it may continue until RV L+3. Similarly, the transmission may not be successful for STA 2 HARQ ID 1, therefore AP 411 may transmit an increased RV, such as RV 3. Where the transmission is successful, the HARQ may increase. For example, HARQ ID K may be successful, therefore the AP 411 may transmit some HARQ ID K+2, which merely represents some other HARQ ID process other than HARQ ID K since that was transmitted successfully (e.g., as determined from the STA2 response at 403).

At 405, one or more steps of this process may repeat (e.g., continued HARQ transmission, acknowledgment, etc.).

The HARQ responses 407 may be triggered or solicited by a multi-STA multi-HARQ ID BAR at 406, in which the RU are identified for each tuple that may contain one or more of a HARQ Process ID, a STA ID, or a TID.

One feature for EHT is multi-AP, where multiple APs are deployed in the same service set (e.g., BSS), such as in a home or work environment. The multiple APs may conduct coordination as well as certain levels of collaborations to achieve higher peak throughput and increased efficiency. In order to achieve better BSS edge coverage, multiple APs may use HARQ operations with one or more STAs. To accomplish this, there must be an efficient design of HARQ operation between one or more STAs and multiple APs.

Multi-AP HARQ transmission may enable more than one AP to transmit a packet to one STA. The APs may transmit a packet asynchronously. In other words, the transmissions may be performed in a TDD way and use different time slots to achieve the sending of the packet to one STA.

An AP may include a Multi-AP capability field/subfield or Multi-AP HARQ capability field/subfield in a Beacon, Probe Response frame, (re)Association response frame, and/or other control/management frame. The AP may also announce a list of neighboring APs which may work together to perform multi-AP HARQ transmission.

A STA may include a Multi-AP capability field/subfield or Multi-AP HARQ capability field/subfield in its Probe Request frame, (re)Association request frame, and/or other control/management frame. In this field/subfield, the STA may include its HARQ buffer capability/restriction. The HARQ buffer capability/restriction may include a buffer lifetime, which may give a suggestion of how long the corrupted packet may be saved in the buffer. This may be a value in time, such as microseconds (μs), milliseconds (ms), or seconds (s). There may be a list of valid buffer lifetime predefined/predetermined values. The STA may select one or more values from the list and the value indices may be included and transmitted to the AP. The valid buffer lifetimes may depend on the number of APs used to asynchronously transmit to the STA, and the maximum number of transmissions expected from those APs. A HARQ buffer capability/restriction may include a buffer size that may imply the maximum size a HARQ buffer may handle. This may be a value in bits or bytes. There may be a list of valid size predefined/predetermined values. The valid maximum buffer sizes may depend on the type of HARQ retransmissions, such as whether repetition or incremental redundancy is used. The STA may select one or more values from the list and the value indices may be included and transmitted to the AP.

A STA may include information regarding neighbor (unassociated) APs, including both APs announced by the associated AP and other APs, such as AP identifiers, capability information, channel information, measurement information, context information, or other related information. For example, the information the STA may include may be: SSID, BSSID, MAC Address, other AP identifiers; Channel Number, Operating Class, or PHY Type; Received Channel Power Indicator (RCPI), Channel Width, Channel Center Frequency Segment 0, Channel Center Frequency Segment 1, Beacon Interval, Clear Channel Assessment (CCA), Received Power Indicator (RPI), Channel Load, Noise Histogram, Beacon, Frame, STA Statistics, Location Configuration Information (LCI) [latitude, longitude, altitude], Transmit Stream/Category measurement, Multicast Diagnostics, Location Civic, Location Identifier, Directional Channel Quality, Directional Measurement, Directional Statistics, Fine Timing Measurement Range; and any other neighbor AP information. The STA may also include any additional type of information.

For a multi-AP HARQ configuration with a Master AP managing HARQ processes, a STA may associate with an AP and that AP may become, or already may be, a Master AP and may manage HARQ traffic to and from the associated STA. The Master AP may supply the STA with a list of APs that may send and/or receive HARQ packets. The Master AP may request the associated STA to measure characteristics of other APs. The Master AP may receive the measured characteristics from the STA. The Master AP may consider the measured characteristic information when managing the HARQ APs. The Master AP may inform the STA as to which APs it should monitor to receive multi-AP HARQ packets.

For HARQ packets sent to the STA, the Master AP may generate HARQ redundancy packets and provide them to APs that the Master AP has determined will be sending the packets. The Master AP may provide the APs with data to be sent and which HARQ redundancy version should be used to create the desired HARQ packets for transmission. From this information, the AP may create the desired HARQ redundancy packet the Master AP has determined it should send. Once an AP has received or generated a HARQ packet, the Master AP may request (trigger) the AP to send the packet by sending a trigger packet. The request may be sent over the air (e.g., wirelessly) with AP to AP signaling via a defined protocol. The request may be sent via a wired AP to AP network connection. The Master AP may specify to the AP a transmission time of when the data or HARQ redundancy packet is sent to the AP or at any time prior to the desired transmission time.

A STA may receive HARQ packets sent by the Master AP and other APs and may process the packets using standard HARQ procedures until the packet has been successfully received.

A STA may send HARQ packets to the Master AP and/or other APs as directed by the Master AP. HARQ packets may be specifically addressed to an AP. The Master AP and the other APs may attempt to receive packets sent by the STA that are not addressed to them (e.g., the AP) specifically, but are addressed to any of them (e.g., any of the APs transmitting the packet, or any AP in the network). This may enable HARQ packets sent by a STA to be detected by multiple APs. These detected packets may be forwarded to the Master AP to be HARQ combined or they may be combined at each AP independently or in any combination of APs.

For a multi-AP HARQ configuration with a STA associated with multiple APs using distributed HARQ process control, a STA may associate with multiple APs. The STA and the associated APs may manage HARQ traffic to and from the associated STA. The STA may inform the APs which APs it has associated with and the APs may coordinate with the STA and each other to determine which AP or APs may send HARQ packets, which redundancy version should be sent, and when the packets should be sent. The APs may request the associated STA to measure characteristics of other APs. The APs may receive the measured characteristics from the STA. The APs may consider the measured characteristic information when managing the HARQ process or suggest the STA to associate with other APs.

For HARQ packets sent to a STA, the APs may generate various agreed-upon HARQ redundancy packets independently, assuming they are all aware of the data to be sent, or they may coordinate among themselves as to how the packets will be generated and which AP or APs should send the packets. The STA may provide feedback to the APs. The APs may use the feedback in coordinating how the packets may be sent. The APs may coordinate wirelessly, via a wired network, or any combination of the two.

The STA may receive HARQ packets sent by the APs and may process the packets using standard HARQ procedures until the packet has been successfully received.

The STA may send HARQ packets to any of the APs as directed and agreed by the APs and the STA. HARQ packets may be specifically addressed to an AP. APs may attempt to receive packets sent by the STA that is not addressed to them but are addressed to other APs that are participating in this process. This may enable HARQ packets sent by the STA to be detected at multiple APs. These detected packets may be forwarded to one of the APs to be HARQ combined or they may be combined at each AP independently or in any agreed combination of APs.

For a multi-AP HARQ configuration with a virtual BSS and a Master AP managing HARQ processes, an AP (e.g., the Master AP), may define a virtual BSS that all the APs supporting the HARQ process for an STA may belong to. An STA, associated with an AP, may request multi-AP HARQ support; this AP may become the Master AP and may create a virtual BSS for the multi-APs supporting the multi-AP HARQ process that the STA will use. The Master AP may request the associated STA to measure characteristics of other APs. The Master AP may receive the measured characteristics from the STA. The Master AP may consider the measured characteristic information when managing and creating a virtual BSS. Once the Master AP has chosen the APs that will be supporting the virtual BSS and has coordinated with these APs as to what the virtual BSS configuration is (e.g., SSID, MAC address, and all other BSS parameters), the Master AP may inform the STA as to the BSS parameters and the STA may associate with the BSS. The STA may maintain its association with the Master AP for non-multi-AP HARQ traffic. The Master AP may manage HARQ traffic to and from the STA associated with the virtual BSS. The STA may not need to have knowledge as to which APs comprise the virtual BSS, since all transmissions from these APs may look like they are coming from a single BSS. The Master AP or the virtual BSS may inform the STA as to which APs it should provide measurement information on so that the Master AP can manage the virtual BSS.

For HARQ packets sent to the STA, the Master AP may generate HARQ redundancy packets and provide them to APs that the Master AP has determined will be sending the packets using the virtual BSS identity. The Master AP may provide the APs with data to be sent and which HARQ redundancy version should be used to create the desired HARQ packet for transmission. From this information, the AP may create the desired HARQ redundancy packet that the Master AP has determined it should send using the virtual BSS identity. Once an AP has received or generated the HARQ packet, the Master AP may request (trigger) the AP to send the packet by sending a trigger packet. The request may be sent over wireless media via a defined AP to AP protocol. The request may be sent via a wire AP to AP network connection. The Master AP may specify a transmission time to the AP when the data or HARQ redundancy packet is sent to the AP or at any time prior to the desired transmission time.

The STA may receive HARQ packets sent by any of the APs using the virtual BSS identity and process these packets using standard HARQ procedures until the packet has been successfully received. ACK and NACK packets may be sent to the virtual BSS and may be received by one or all APs in the virtual BSS.

The STA may send HARQ packets to APs in the virtual BSS, by addressing the HARQ packets to the virtual BSS. All APs or any subset of the APs in the virtual BSS may attempt to receive packets sent by the STA. This may enable all the HARQ packets sent by the STA to be detected at multiple APs. These detected packets may be forwarded to the Master AP to be HARQ combined or they may be combined at each AP in the virtual BSS independently or any combination of APs configured by the Master AP.

For a multi-AP HARQ configuration with an STA managing HARQ processes, an STA may associate with multiple APs and may manage the APs to provide a multi-AP HARQ service. The STA may request one of the associated APs to be its primary AP. If the AP agrees to the role, the AP may become the primary AP and as a distributed system (DS) the primary AP may route the STAs traffic to its destination and the AP may coordinate with the other APs requested by the STA to form a multi-AP group to support multi-AP services for the STA. The primary AP may take on the role similar to that of a "Master AP" described above, except that the STA may manage which APs are in the multi-AP group. The primary AP may inform the STA of the existence of other APs that the primary AP thinks the STA should consider adding to the multi-AP group. The STA may provide the primary AP with a request as to which APs should send which redundancy version of the HARQ packet and which order is preferred to send the packets. The primary AP may generate various HARQ redundancy packets and provide them to the APs that it has determined will send them, or the primary AP may provide the APs in the multi-AP group with the data to be sent and which HARQ redundancy version should be used to create the desired HARQ packet for transmission. From this information, the AP may create the desired HARQ redundancy packet the primary AP has requested it to send. Once the AP has received or generated the HARQ packet, the primary AP may request (e.g., trigger) the AP to send the packets by sending a trigger packet. The trigger packet may be sent over wirelessly by AP to AP signaling via a defined protocol. The trigger packet may be sent via a wire AP to AP network connection. The primary AP may specify a transmission time to the AP when the data or HARQ redundancy packet is sent to the AP or at any time prior to the desired transmission time.

The STA may send HARQ packets to the APs in the multi-AP group as it desires. All APs or any subset of the APs in the multi-AP group may attempt to receive any packets sent by the STA. HARQ packets sent by the STA may be enabled to be detected at multiple APs or just the AP addressed by the STA. This configuration may be controlled by the STA's requested configuration for the multi-AP group and may be requested by the primary AP. These detected packets may be forwarded to the primary AP to be HARQ combined or they may be combined at each AP in the multi-AP group independently or any combination of APs configured at the request of the STA and requested by the primary AP.

Generally, during any multi-AP HARQ situation, there may be a number of features or actions concerning an STA and a plurality of APs that apply to scenarios concerning a downlink (DL) transmission. In such a scenario, an STA may associate and/or negotiate, with multiple APs (e.g., a first AP and a second AP), then one or more of the APs may send a transmission, which the STA may or may not receive all of, after which a HARQ process may address the incomplete/complete reception of the data transmission. A transmission sent by the AP may include an indication, such as BSSID/Color, access point identifier (AID), multi-AP HARQ transmission, ACK policy, and/or HARQ related information.

The BSSID/Color may be indicated in a field, where this field may carry the BSSID or compressed version of BSSID or BSS color, which may be a locally unique ID for the BSS/AP. An AP may indicate an AID in a field. This field may be carried in the PLOP header so the STA may know whether it is a desired receiver of the packet.

The multi-AP HARQ transmission indication may be indicated in a field, where an AP may use this field to explicitly or implicitly indicate the transmission is a multi-AP HARQ transmission, which may allow the STA to combine received packets with different receive AIDs. A multi-AP HARQ field may be carried in the PLOP header. Special values in the HARQ type field may be used to indicate the upcoming transmissions are a multi-AP HARQ transmission. Special values in the HARQ process IDs may be used to indicate the upcoming transmissions are a multi-AP HARQ transmission. The explicit or implicit multi-AP HARQ signaling may be carried in a PLOP header or a MAC header.

An AP may indicate the ACK policy in a PLOP header or MAC header. Different ACK policies may result from different APs/STA frame exchange procedures. The ACK policy may be carried in a PLOP header or a MAC header together with the multi-AP HARQ data packet. The ACK policy may be negotiated and determined before the multi-AP HARQ data transmission.

In an example ACK policy, an immediate acknowledgment is sent with ACK/NAK/NTX after each transmission. Here ACK/NAK are positive/negative acknowledgments respectively. NTX is for no transmission which may happen when the entire packet is lost, and the STA may not transmit an acknowledgment.

In an example ACK policy, an immediate ACK is sent after all of the configured transmissions. For example, two transmissions (e.g., multi-AP HARQ transmissions) may be configured for the STA. When the first AP and second AP complete their transmission to the STA, the STA may send the acknowledgment.

In an example ACK policy, a delayed ACK may be sent. In this case, the acknowledgment may be transmitted in a delayed version. A single HARQ process may be repeatedly transmitted before the delayed ACK received. More than one HARQ process may be supported and transmitted before the delayed acknowledgment received.

In an example ACK policy, a Triggered/Polled ACK may be sent. When this is set, the transmission of an ACK may need to be triggered or polled by a peer STA using a control/management frame.

In an example ACK policy, a multi-AP ACK may be sent. When this field is set, the STA may be able to transmit multi-AP acknowledgment back to the APs. When this field is not set, the STA may transmit to a single AP each time. A single acknowledgment back to the master AP may be expedient in those cases where STA transmissions are not omnidirectional. Multiple acknowledgment frames may be transmitted sequentially with or with an inter-frame space (xIFS) in the case that multiple APs may request the acknowledgment.

In an example ACK policy, a value indicating no acknowledgment between AP repetition transmissions may be sent. In this case, the AP may also signal the number of APs which may perform multi-AP HARQ transmission to the STA. The AP may signal the number of APs which may transmit after this transmission and before an expected acknowledgment. The AP may signal the total number of APs which may transmit in the multi-AP HARQ transmission. The AP(s) may signal both, for example, the number of total AP transmissions and the number of the rest of the AP transmissions before acknowledgment.

The first AP may indicate HARQ related information, such as a HARQ process identifier (ID), redundancy version (RV), Modulation and Coding Scheme (MCS), retransmission indication, and the like.

Based on the transmission, the STA may make one or more determinations, and/or take one or more actions. Up receiving a packet, the STA may check the AID and BSSID/Color field indication/information (e.g., in the PLCP header sent and received with the packet) and compare it with the STAs assigned AID in the corresponding BSS (e.g., configured during association/negotiation). If the AIDs match, the STA may consider it to be a desired receiver of the packet. The STA may continue to check for other indications/information (e.g., PLCP header), and may determine that the transmission is for multi-AP HARQ. The STA may determine that this is a new transmission or retransmission for multi-AP HARQ. The STA may know the maximum number of transmissions expected from the corresponding AP during the negotiation phase. The STA may save the transmission ID or HARQ process ID, which may be used to identify transmissions of the same packet. The STA may determine and save the RV of the transmission which may be used with a previously received transmission with the same transmission ID.

Once the packet has been received, the STA may decode the packet. If the packet is decoded successfully, the STA may transmit an acknowledgment based on the ACK policy as discussed herein. The STA may transmit a multi-AP acknowledgment back to both the first AP and the second AP, or back to the master/primary AP only (e.g., the first AP). If the packet is not decoded successfully, the STA may start a HARQ timer. The STA may store the corrupted packet in its buffer. Depending on the ACK policy, the STA may determine whether it may send a NAK. In some cases, the STA may not transmit anything back, or it may send the NTX if the entire packet was lost.

There may be a period of time for response after the transmission of the initial signal from the first AP with the packet. The second AP may not receive any positive acknowledgment from the STA during this period of time and may start its multi-AP HARQ retransmission. This waiting period for the second AP may be predefined or predetermined and known to all parties. The period may be enough to cover an ACK transmission and a short inter-frame space (SIFS) duration plus a distributed coordinated function (DCF) inter-frame space (DIFS) duration. For example, the second PA may need to wait an extended inter-frame space (EIFS) duration to prepare a retransmission. The second AP may carry the same set of control signaling as the first AP, or the second AP may carry a subset of the control signaling carried by the first AP. The second AP may have its BSSID/Color and AID assigned to the STA, which may not be the same as that carried by the first AP.

Upon reception of the packet transmitted by the second AP, the STA may check the AID and BSSID/Color field in PLOP header and compare it with its assigned AID in the corresponding BSS. If the AIDs match, the STA may consider it to be a desired receiver of the packet. The STA may continue to check the PLOP header. The STA may determine the transmission is for multi-AP HARQ. The STA may determine this is a retransmission for multi-AP HARQ. The STA may check the corresponding HARQ timer. If the timer expired, the STA may treat the transmission as a new transmission. If the timer is not expired, the STA may combine the received packet with the one saved in its buffer. More than one HARQ process may be allowed. The STA may check its buffer and select the packet with the correct AID and HARQ process ID to combine. The STA may have different AIDs associated with different AP. The STA may know the relationship of the AID and corresponding AP. The STA may have different HARQ process IDs in different AP. The STA may know the HARQ process ID and corresponding AP during the negotiation phase. The STA may consider the RV of the transmission when combining it with ones saved in its buffer. The STA may know the maximum numbers of transmissions expected from the corresponding AP during the negotiation phase.

Figure 5:
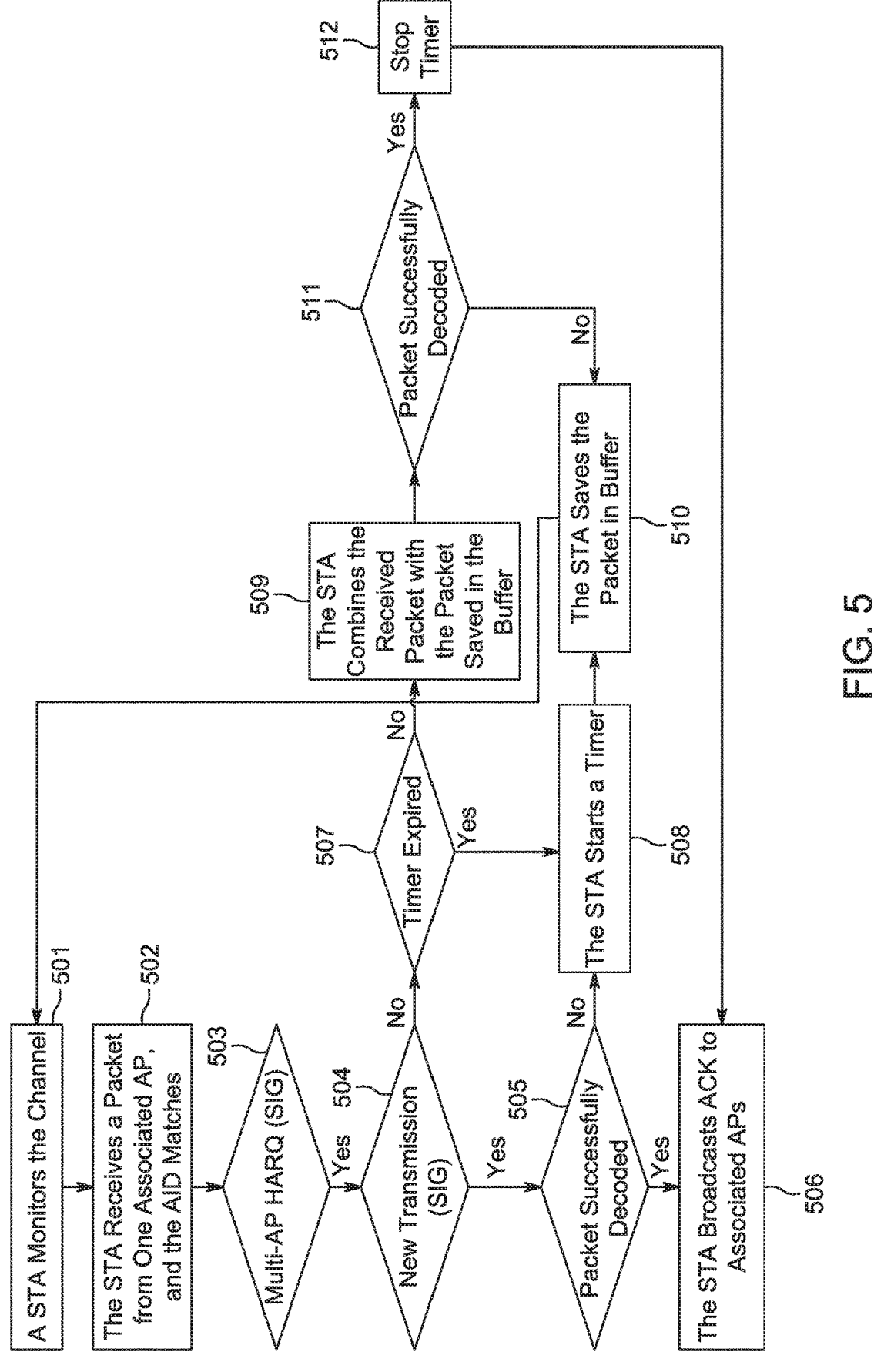
FIG. 5 is a flow diagram illustrating an example of a multi-AP HARQ downlink process from the perspective of a STA.

FIG. 5 is a flow diagram illustrating an example of a multi-AP HARQ downlink process from the perspective of a STA. It may be assumed for purposes of this example that any of the general multi-HARQ scenario features/actions described herein may apply, even if not explicitly recited. As a result of a negotiation between a STA and two APs for a multi-HARQ scenario, as described herein, at 501, a STA may monitor a channel. At 502 the STA may receive a packet in a signal from one of the associated APs (e.g., a first AP) on the monitored channel. The STA may determine that the AP AID matches what was configured (e.g., during the association/negotiation). At 503, the STA may determine that the signal is a multi-HARQ signal (e.g., based on the PLOP header). At 504, the STA may determine that the signal is a new transmission (e.g., not a retransmission). If the signal is a new transmission, then at 505 the STA determines if the packet can be decoded successfully. If the packet can be decoded successfully, then at 506, the STA may generate and transmit or broadcast ACK to the associated AP(s). If the STA determines at 505 the packet cannot be decoded successfully, the STA starts a timer at 508. At 510, the STA then saves the packet in a buffer, then returns to the beginning of the process 501 to await the retransmission. In some cases, if the packet was able to be partially decoded (e.g., still not successful), the STA may transmit a NACK, and return to the beginning of the process 501 to await a retransmission (not shown). At 504, if the STA determines that a received multi-HARQ signal is a not a new transmission (e.g., a retransmission), then the STA determines if the timer has expired at 507. If the timer has expired, the STA starts a timer at 508 and continues from there as described above. If the timer has not expired, then at 509 the STA may combine the received packet with the stored in the buffer. The STA then determines, at 511, if the packet has been successfully decoded (e.g., the STA has decoded the entire packet). If the STA has decoded the packet successfully, then at 512 the STA stops the timer, then proceeds to broadcast ACK to the associated APs at 506. If the packet is not decoded successfully at 511, then the STA saves the packet in the buffer at 510, and continues the process from there. Note, that the determination of whether the packet is decoded at 511 is made only for a retransmission.

Figure 6:
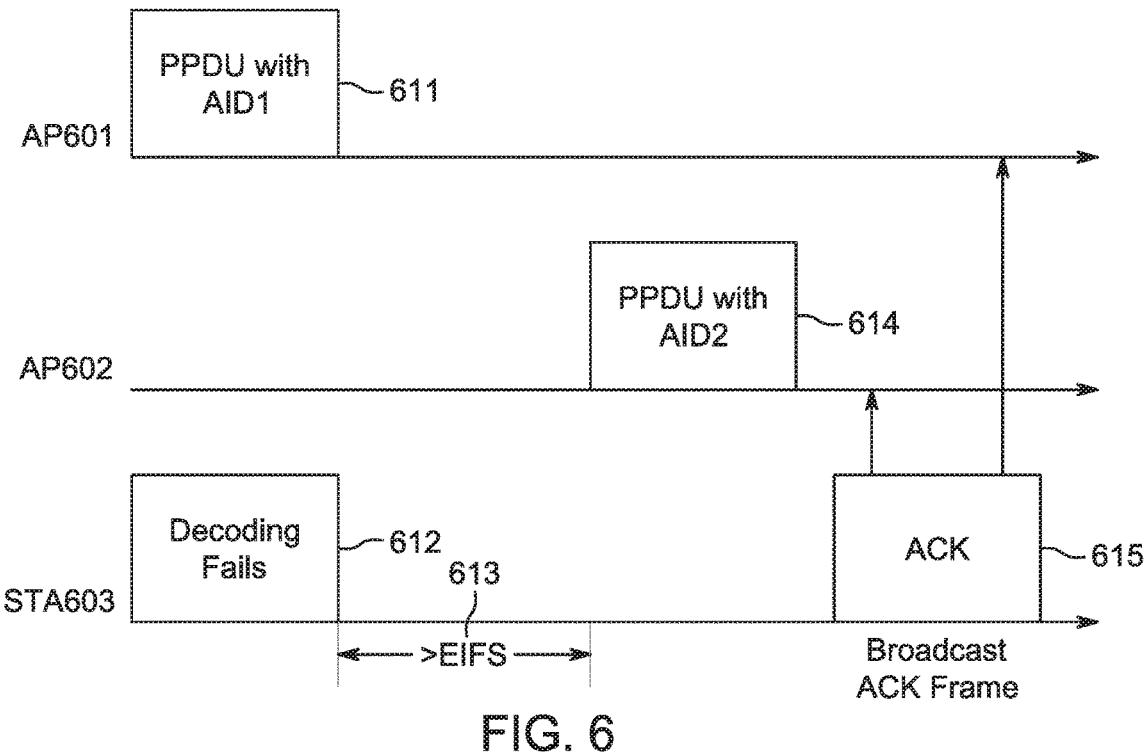
FIG. 6 is a transmission diagram illustrating an example of a multi-AP HARQ downlink transmission.

FIG. 6 is a transmission diagram illustrating an example of a multi-AP HARQ downlink transmission. It may be assumed for purposes of this example that any of the general or example multi-HARQ scenario features/actions described herein may apply, even if not explicitly recited. A STA 503 may associate with more than one AP (e.g., AP601 and AP602). AP601, AP602, and STA603 may negotiate to carry out a downlink (DL) multi-AP HARQ transmission (e.g., process 511-515). As a result of the negotiation, STA603 may have been indicated/informed that AP601 has AID1 and AP602 has AID2. AP601 may be the main/primary/master AP for the STA603, and AP602 may be the secondary/ servant AP for STA603. In this example, the ACK policy may be to not respond if no packet is received, or if a packet is received but not fully decoded.

After the association, AP601, AP602, and STA603 may negotiate to perform multi-AP HARQ transmissions (e.g., PPDU transmissions from both AP601 and AP602 to STA603). The negotiation may happen any time before the initial multi-AP HARQ transmission, which happens at 611 when AP601 transmits a multi-AP HARQ packet to the STA603 (e.g., sends a PPDU with AID1), which may include information/indications as disclosed herein (e.g., BSSID/Color, access point identifier (AID), multi-AP HARQ transmission, ACK policy, HARQ related information, etc.). In this example at 612, the STA603 may not receive the packet (e.g., decoding fails), therefore no acknowledgment following the transmission of the packet may be sent.

After a certain period of time 613, the AP602 may not receive any acknowledgment from the STA603, and may start its multi-AP HARQ retransmission at 614. The waiting period for AP602 may be predefined or predetermined. The period may be enough to cover the ACK transmission and a short inter-frame space (SIFS) duration plus a distributed coordinated function (DCF) inter-frame space (DIFS) duration. For example, the AP602 may need to wait an extended inter-frame space (EIFS) duration to prepare the retransmission as shown at 613. AP602 may provide the same set of control signaling as AP601, or AP602 may carry a subset of the control signaling as provided by AP601. AP602 may have its BSSID/Color and AID (e.g., AID2) provided to STA603, which may not be the same as that provided by AP501.

STA603 may decode the retransmission sent from AP602 successfully. Based on the pre-configured ACK policy, STA603 may prepare acknowledgment transmission. At 615, STA603 may transmit a multi-AP ACK back to both AP601 and AP602 in an xIFS duration from the end of the packet.

Figure 7:
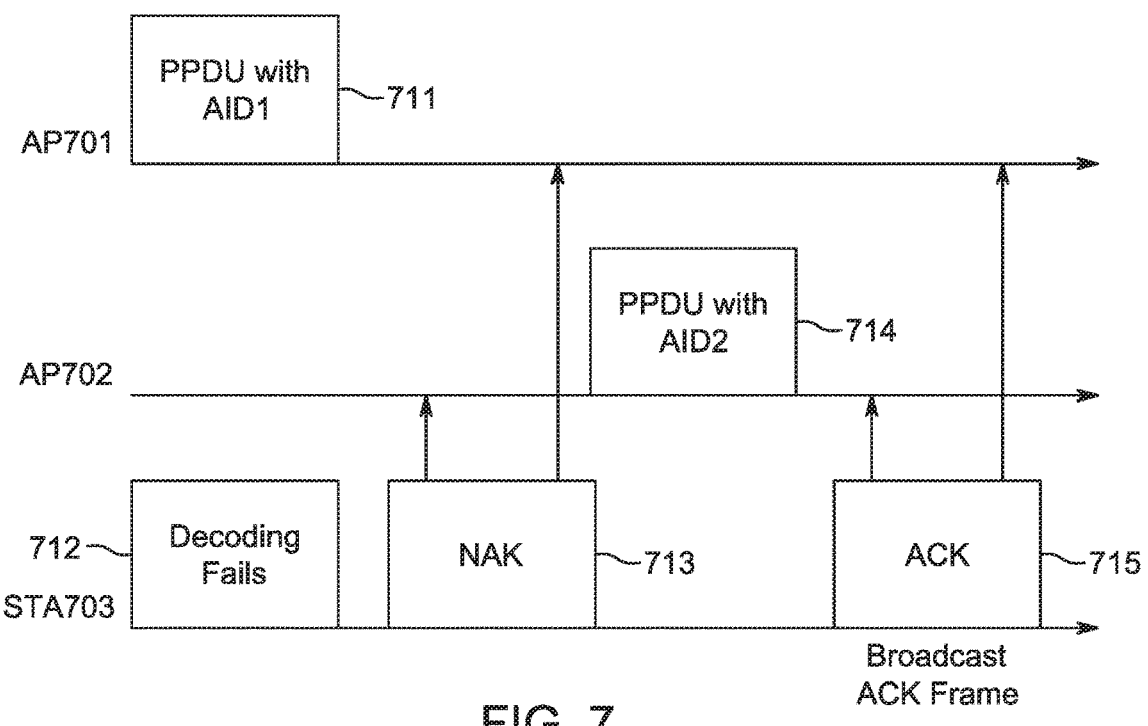
FIG. 7 is a transmission diagram illustrating an example of a multi-AP HARQ downlink transmission.

FIG. 7 is a transmission diagram illustrating an example of a multi-AP HARQ downlink transmission. As can be seen, FIG. 7 is a diagram illustrating an example of a multi-AP HARQ transmission procedure with an explicit NAK transmission, whereas FIG. 6 is an example of multi-AP HARQ transmission procedure without an explicit NAK transmission. It may be assumed for purposes of the example shown in FIG. 7, that any of the general or example multi-HARQ scenario features/actions described herein may apply, even if not explicitly recited. Similar to the general process described herein for multi-HARQ scenarios, AP701, AP702, and STA703 may negotiate a multi-HARQ transmission. AP701 may have AID1, and AP702 may have AID2. In this example, the ACK policy may be set to a value that indicates immediate acknowledgment with ACK/NAK/ NTX after each transmission. Here ACK/NAK may be positive/negative acknowledgments respectively.

At 711, AP701 may transmit a packet (e.g., PPDU) with AID1 to STA703. At 712, If the packet is not decoded successfully, the STA703 may start a HARQ timer. The STA703 may save the corrupted packet in its buffer. The STA703 may know the maximum number of transmissions expected from the corresponding AP during the negotiation phase. Depending on the ACK policy, at 713, the STA703 may transmit a NAK to AP701 and/or AP702. The STA703 may transmit a control/management frame to AP701 and/or AP702. Alternatively, the STA703 may send a frame to AP702 to trigger the retransmission. In the control/management frame, the STA703 may indicate the preferred or suggested HARQ retransmission parameters. AP702 may receive the NAK from STA703 that may trigger its multi-AP HARQ retransmission at 714, where AP702 sends the packet (e.g., retransmission) with AID2. AP702 may carry the same set of control signaling as AP701, or AP702 may carry a subset of the control signaling carried by AP701. AP702 may have its BSSID/Color and AID assigned to the STA703, which may not be the same as that carried by AP701. At 715, after the STA successfully decodes the packet of the retransmission of 714, the STA703 may prepare an acknowledgment transmission based on the ACK policy, then the STA703 may transmit a multi-AP ACK back to both AP701 and AP702 xIFS duration from the end of the packet.

Figure 8:
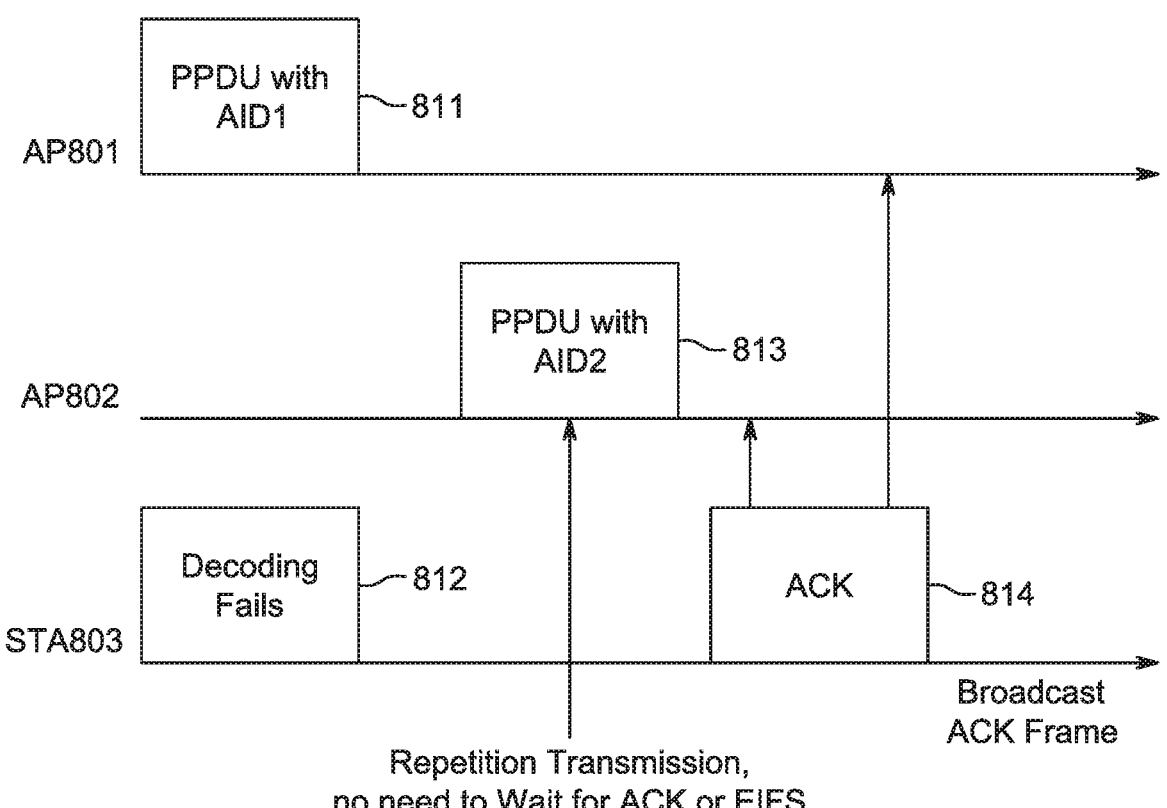
FIG. 8 is a transmission diagram illustrating an example of a multi-AP HARQ downlink transmission.

FIG. 8 is a transmission diagram illustrating an example of a multi-AP HARQ downlink transmission. In this example, there may be repeated transmissions such that for the ACK policy, there is no need to wait for a timer period (e.g., EIFS) or acknowledgment (e.g., ACK/NACK). It may be assumed for purposes of this example that any of the general or example multi-HARQ scenario features/actions described herein may apply, even if not explicitly recited. AP801, AP802 and STA803 may negotiate to enable multi-AP HARQ transmissions, which may happen any time before the multi-AP HARQ transmission 811. During the negotiation, an ACK policy may be indicated. The ACK policy may be set to a value indicating no acknowledgment between AP repetition transmissions. The STA803 may receive an indication regarding one or more of the following: the number of APs that may perform multi-AP HARQ transmission; the number of APs that may transmit after this transmission and before an expected acknowledgment; the total number of APs that may transmit in the multi-AP HARQ transmission; and/or, the number of total AP transmissions and the number of the rest of the AP transmissions before acknowledgment.

At 811, AP801 may transmit a multi-AP HARQ packet to STA803. At 812, the STA803 may note that there is an indication that no ACK is needed between the multi-AP HARQ transmission. If the decoding fails, then the STA803 may proceed with the procedure for when reception/decoding fails as disclosed herein. If the reception is successful (e.g., STA803 is able to decode the MAC body successfully), the STA803 may ignore any future repetition transmissions. At 813, AP802 may start the multi-AP HARQ retransmission after the transmission from AP801 without waiting for a time period or acknowledgment.

Once all transmissions are sent, the STA803 may prepare an acknowledgment transmission at 814. The STA803 may transmit a multi-AP ACK back to both AP801 and AP802 xIFS duration from the end of the packet (e.g., during a broadcast ACK frame).

The example of FIG. 8 may be extended to a situation where there are repetition transmissions for each AP. For example, AP801 may transmit the packet more than one (e.g., twice) and AP802 may transmit the packet more than once (e.g., twice), then STA803 may transmit an acknowledgment back after all repetitions are complete.

As discussed herein, a physical resource allocation for each transmission in a HARQ process may be different to achieve frequency diversity. For example, the first transmission may use RU set 1 and the second transmission may use RU set 2. RU set 1 and RU set 2 may or may not fully overlap or may partially overlap. Even though the RU set 1 may overlap with RU set 2, the modulated symbol to physical resource mapping may be different for each transmission.

In the examples shown in FIGS. 6, 7, and 8 there are two APs transmitting to one STA for the simplicity of the illustration, however, these examples may be expanded to situations where more than two APs transmit to one STA. Further, these examples of multi-AP HARQ processes may be used in multi-band HARQ cases.

Generally, during any multi-AP HARQ situation, there may be a number of features or actions concerning a STA and a plurality of APs that apply to scenarios concerning an uplink (UL) transmission. In such a scenario, a STA may receive a trigger from one or more APs (e.g., a first AP and a second AP. The first AP may be a primary/master AP and the second AP may be a secondary/servant AP. The STA may then transmit HARQ transmissions to both APs using one resource for both or using different resources for each AP. Then the STA may receive an acknowledgment, either from one of the APs for both.

Initially, the STA may need to determine a resource for the uplink multi-AP HARQ transmission. In one case, STA may be allocated a common resource on both APs (e.g., in the trigger), and may transmit a single HARQ RV to both APs simultaneously. For joint uplink HARQ combining, the APs may use a combination of Chase combining and IR combining to decode the packets. The information from both APs gathered from a packet sent from the STA at a specific time may be Chase combined together. Additional RV versions of the packet sent at other times may be IR combined with the originally received packet.

In another case, the STA may be allocated different resources on each AP. The resources may be separated by frequency (e.g. RU) or time. In this case, the AP may IR combine information from the different resources for the different APs.

In an AP directed case, the STA may be allocated one resource for both APs, or a different resource for each AP. In an example, one single master Trigger frame (from the master AP) may assign the STA resources for both APs. The STA may read this master trigger and transmit information to the APs based on the HARQ ID, RV, transmit power, and resource for both APs. In another example, a separate Trigger frame may be sent by each AP independently.

In an autonomous STA case, the STA may independently acquire the HARQ transmission resource on the requisite AP(s) and transmit to the desired AP(s). This may be by EDCA or by responding to a UL OFDMA Random Access (UORA) Trigger frame. The STA packet may indicate the address of the desired AP(s).

Once a resource of the STA has been determined, the STA may send a transmission with a packet, and the APs may receive the transmissions, on the allocated resources, and process them independently or jointly.

In an example, a backhaul may be used to enable HARQ combining of the information that arrives at the different APs (e.g., joint uplink HARQ combining).

In an example, each AP may decode the information independently, performing local HARQ combining (e.g., separate uplink HARQ combining). In this example, the communication between the APs may be limited to whether there was a successful decoding or not and how the success or failure of the decoding process will be transmitted to the STA.

Once the transmission is processed, the AP(s) need to send a multi-AP HARQ response to the STA. The ACK/

NAK response may be sent independently from each AP or may be sent by the designated primary AP.

In scenarios where increased reliability may be needed for the AP response, both APs may send the response independently. This may be sent on the same resource (e.g., to provide additional diversity, such as a multi-AP shift diversity in which the diversity comes from the different channels to the STA or from one AP deliberately delaying transmission of its ACK to provide more channel variation due to increasing the frequency selectivity of the channel) or on different resources.

In scenarios where a primary AP performs the HARQ combining, the primary AP may send the ACK/NAK. Alternatively, the primary AP may perform the decoding and send the status of the feedback to the secondary AP. Each AP may then opportunistically send the response to the STA.

Generally, any of the features or actions of multi-HARQ downlink scenarios described herein may apply to uplink situations, in a reciprocal fashion, even if not explicitly recited in an example.

Figure 9:
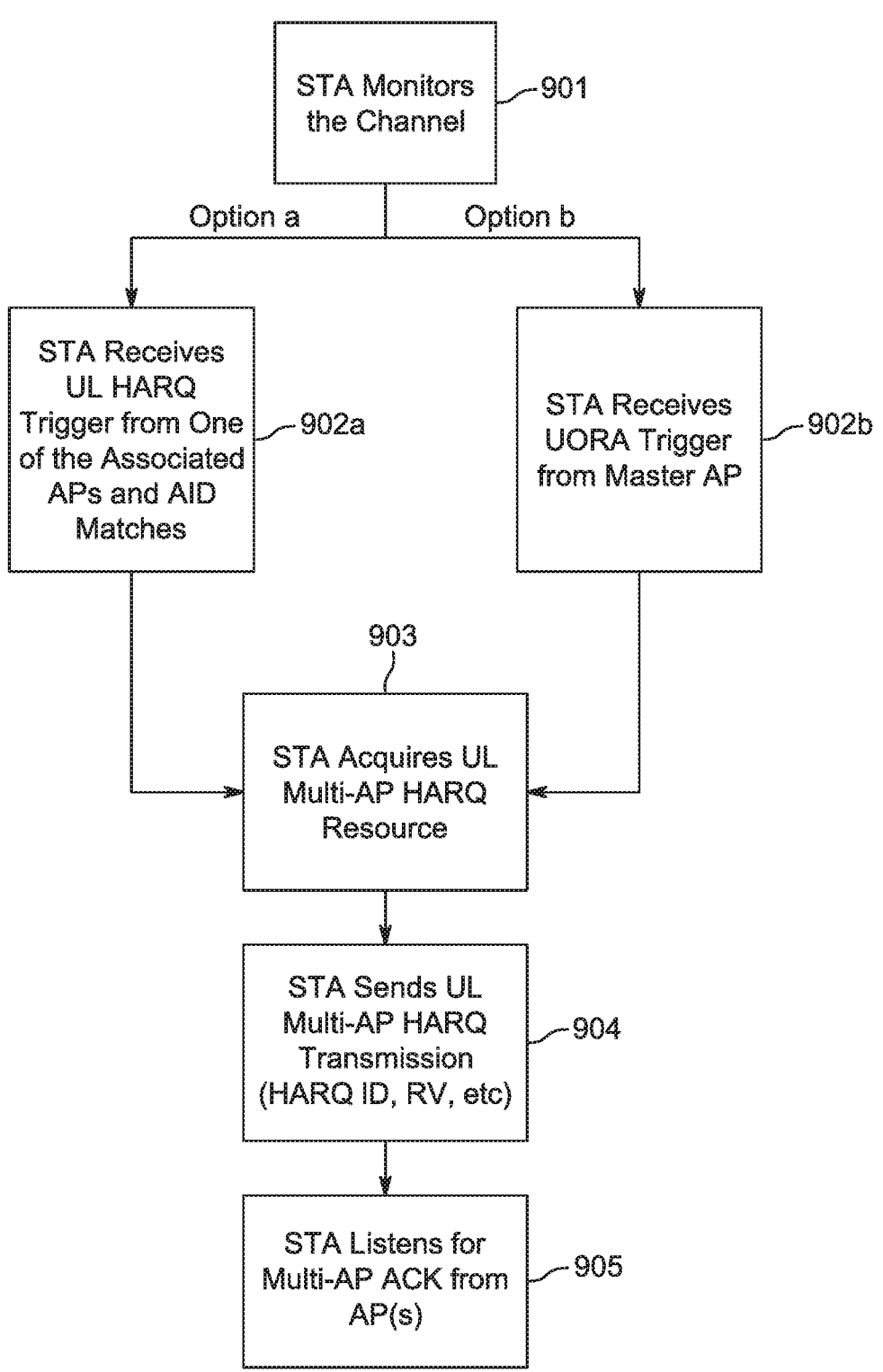
FIG. 9 is a flow diagram illustrating an example of a multi-AP HARQ uplink process from the perspective of a STA.

FIG. 9 is a flow diagram illustrating an example of a multi-AP HARQ uplink process from the perspective of a STA. It may be assumed for purposes of this example that any of the general multi-HARQ scenario features/actions described herein may apply, even if not explicitly recited. Initially, a STA may associate with multiple APs, and negotiate with these APs for a multi-HARQ configuration. At 901, a STA may monitor a channel (e.g., as a result of the negotiation). In one option, at 902*a* the STA may receive an uplink HARQ trigger from one of the associated APs and determine that the AID matches. In another option, at 902*b*, the STA may receive an UORA trigger from the primary AP. In either case, at 903, the STA may be indicated an UL uplink multi-AP HARQ resource from the trigger. At 904, the STA may send the uplink multi-AP HARQ transmission (e.g., including the HARQ ID, RV, etc.) on the indicated resource. At 905, the STA may listen for a multi-AP acknowledgment from the AP(s).

In some cases, an acknowledgment frame may be transmitted from a STA to multiple APs. In the example of FIG. 9, the multi-AP acknowledgment may contain an acknowledgment for one HARQ transmission, but the acknowledgment may need to be delivered to more than one AP. Therefore, one or more or all of the following information may be needed in the acknowledgment frame: an acknowledgment type, such as a multi-AP HARQ ACK; an AP ID(s), as used to indicate the APs; HARQ IDs; and/or, the acknowledgments.

Figure 10:
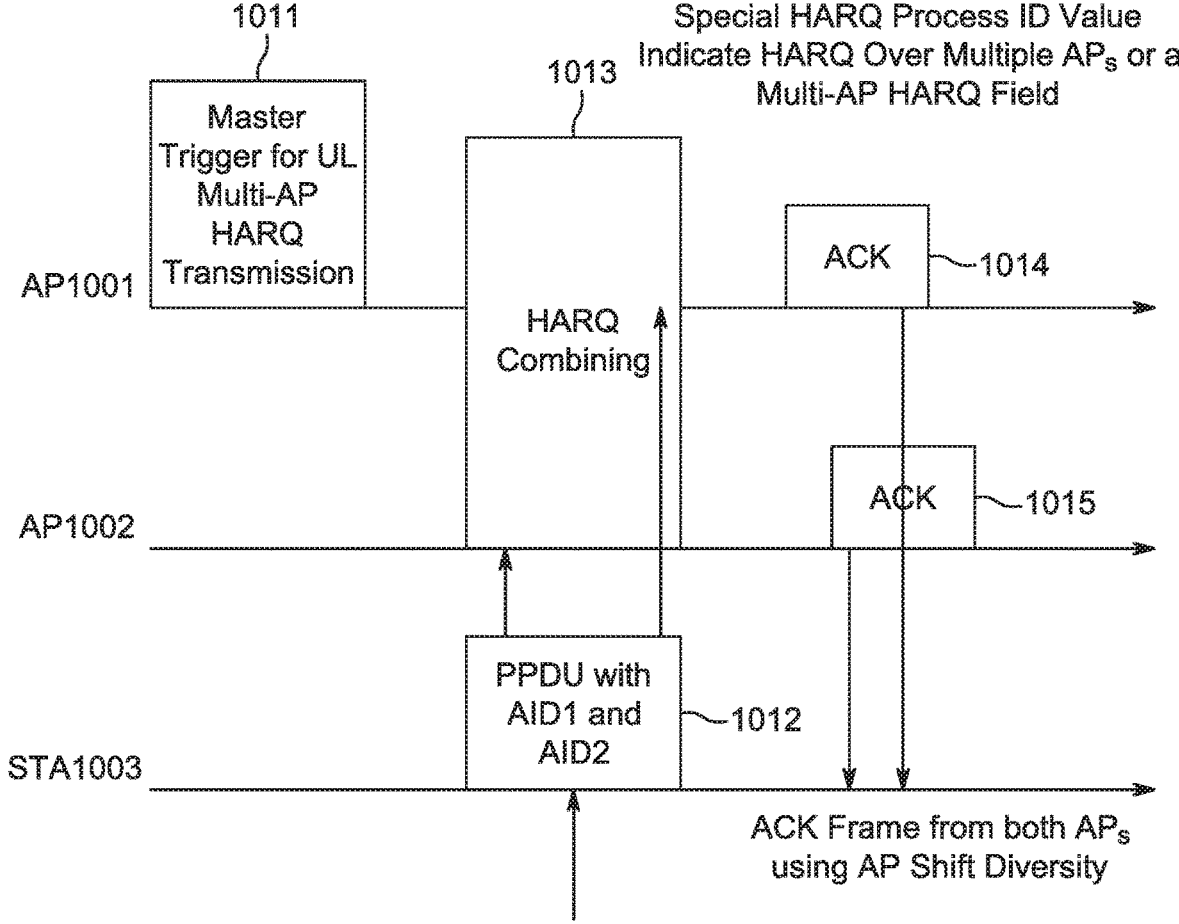
FIG. 10 is a system diagram illustrating an example radio access network (RAN) and an example core network (CN) that may be used within the communications system illustrated in FIG. 1A according to an embodiment.

FIG. 10 is a transmission diagram illustrating an example of a multi-AP HARQ uplink transmission. It may be assumed for purposes of this example that any of the general multi-HARQ scenario features/actions described herein may apply, even if not explicitly recited. There may be an AP1001, AP1002, and a STA1003 that conducts a negotiation for performing multi-AP HARQ uplink transmission. At 1011, AP1001 (e.g., primary AP) may send one single master trigger frame for UL multi-AP HARQ transmission, that assigns STA1003 resources for all APs (e.g., AP1001 and AP1002). The trigger may indicate information related to HARQ ID, RV, transmit power, and resources for both APs. STA1002 may transmit a packet to the APs based on the trigger (e.g., with a single RV). In some cases, a separate trigger frame may be sent by each AP independently (not shown). At 1013 the APs may receive the packet on a common resource. In some cases, the APs may independently decode the packet (not shown). In another case, the APs may HARQ combine using backhaul/controller, where the APs may use a combination of Chase and IR combining to decode the packets. The information from both APs regarding a packet sent at a specific time may be Chase Combined together. At 1014 and 1015, each AP may send, independently, an acknowledgment (e.g., ACK using shift diversity).

Figure 11:
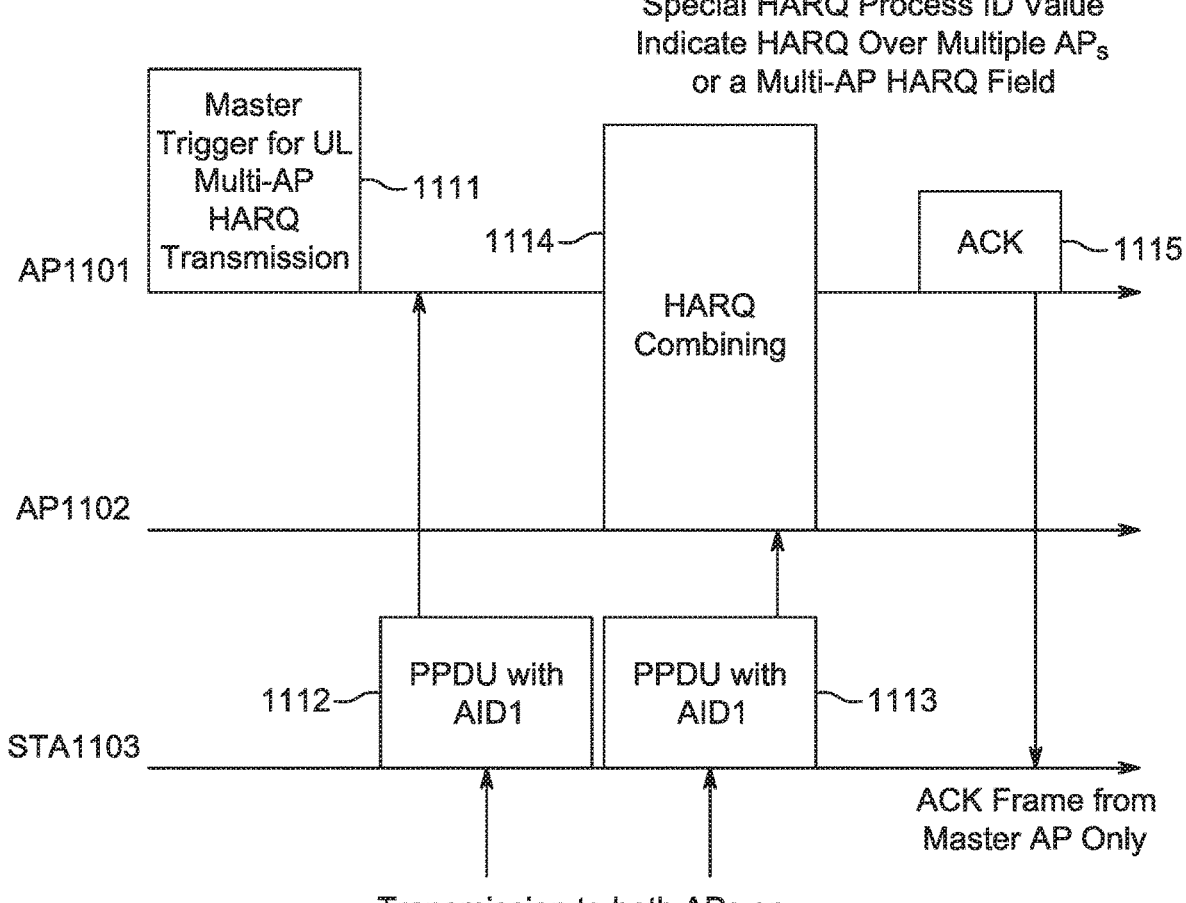
FIG. 11 is a transmission diagram illustrating an example of a multi-AP HARQ uplink transmission.

FIG. 11 is a transmission diagram illustrating an example of a multi-AP HARQ uplink transmission. It may be assumed for purposes of this example that any of the general multi-HARQ scenario features/actions described herein may apply, even if not explicitly recited. There may be an AP1101, AP1102, and STA1103 that negotiates for performing multi-AP HARQ uplink transmission. At 1111, AP1101 (e.g., primary AP) may send one single master trigger frame for UL multi-AP HARQ transmission, that assigns STA1103 resources for all APs (e.g., AP1101 and AP1102). The trigger may indicate information related to HARQ ID, RV, transmit power, and resources for both APs. At 1112 and 1113, the STA1103 may transmit one to each AP using a different resource. The resources may be separated by frequency (e.g., RU) or time. At 1114, AP1101 and AP1102 may IR combine information from the different resources for the different APs, as described herein. At 1115, the ACK/NAK response may be sent from AP1101 (e.g., the primary/master AP) based on all APs information.

Figure 12:
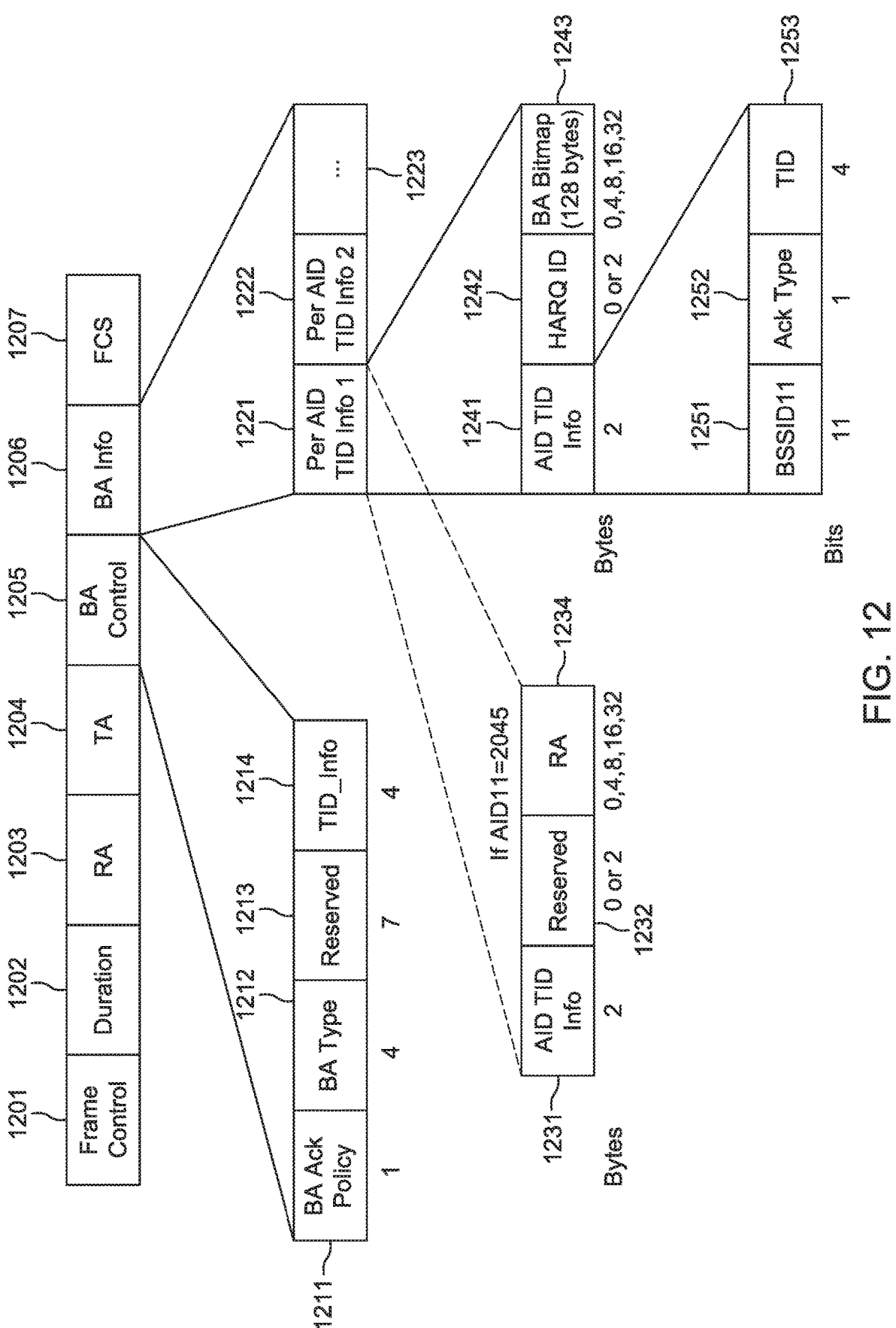
FIG. 12 is a SIG-B diagram illustrating an example of a multi-AP HARQ acknowledgment.

FIG. 12 is a SIG-B diagram illustrating an example of a multi-AP HARQ acknowledgment. Generally, a multi-STA BA (e.g., such as defined in 802.11ax) may be modified to fulfill a multi-AP acknowledgment. In this way, each AP may have its own acknowledgment part. For example, one or more fields may be adapted, as shown in FIG. 12. One field may be a BA Type field 1212 where a BA type may be used to indicate multi-AP HARQ acknowledgment. Another field may be a BSSID11 field 1251, which may be defined in the AID TID Info field. The BSSID11 may be used to indicate an AP ID. Another filed may be a HARQ ID field 1242, which may be defined in each per AID TID Info field. The HARQ IDs may be different from AP to AP, however, the APs may use the HARQ ID and BSSID11 together to identify the packet acknowledged; this field may be optional in the case that only one HARQ ID is used.

In some cases, a wired backhaul may not be available, therefore a wireless backhaul may need to be utilized. In a multi-AP HARQ situation with a wireless backhaul, the APs may share the data payload between each other before the multi-AP transmission(s) (e.g., inter-AP communication). This communication between the APs may be considered as overhead unless it is reused by the STA(s). The STA(s) may be capable of receiving a signal over the channel used for inter-AP communications.

For this wireless backhaul situation, there may be two stages of communication: backhaul transmission stage, where one AP shares the payload for a STA with one or more APs, and multi-AP transmission stage where one or more APs may coordinate to transmit to the STA. To make the data payload sharing between APs reusable at the STA side, the data payload sharing (e.g., backhaul transmission stage) may use one or more algorithms: single STA data sharing; and/or, multi-STA data sharing.

For single STA data sharing, one AP may pack the data intended to a STA in a packet and share this with one or more APs. The packet may be transmitted in an aggregated PPDU format, such that each PPDU is individually coded and may be transmitted independently to the STA later. The packet may have a special SIG field, which may contain one or more information fields.

One information field may be a backhaul transmission indication, where this field may indicate the transmission is a backhaul transmission between APs to share the data payload for a STA.

One or more information fields may be a source AP ID, destination AP ID, and intended STA ID. The source/destination AP IDs may indicate the transmitter and receiver ID. The intended STA ID may indicate the data carried in the PPDU may belong to the STA. The IDs may be MAC address, BSSID, AID, or other type of compressed or uncompressed IDs One or more information fields may be multi-AP HARQ related information, such as HARQ process ID, new transmission indication, and the like. In some instances, the same HARQ process ID may be used for the same packet transmitted in the backhaul transmission stage and multi-AP transmission stage for a STA, so that the STA may determine if it can perform HARQ combining at the receiver side when it receives the packet in the multi-AP transmission stage.

Figure 13:
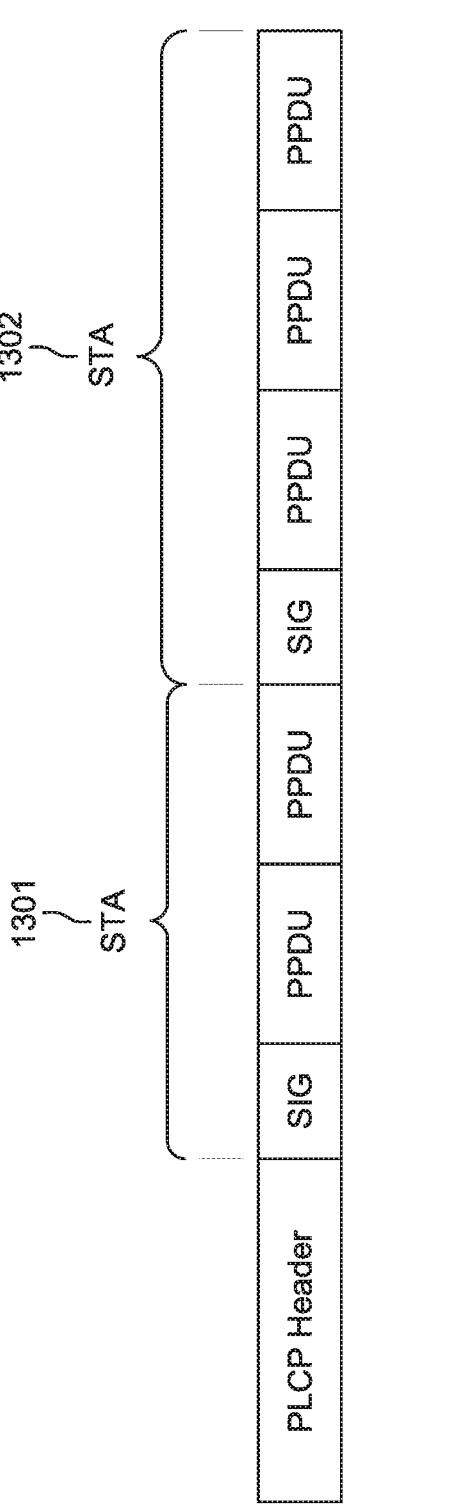
FIG. 13 is a packet diagram illustrating an example of A-PPDU format transmitted over backhaul for multiple STAs

FIG. 13 is a packet diagram illustrating an example of A-PPDU format transmitted over backhaul for multiple STAs. For multi-STA data sharing, one AP may pack the data intended to one or more STAs in a packet and share that with one or more APs. The packet may be transmitted in an aggregated PPDU format, such that each PPDU is individually coded and may be transmitted independently to a STA later. For example, the packet may contain 2 PPDUs to STA 1301, 3 PPDUs to STA 1302. In one example, the SIG field may be STA specific and inserted before PPDUs which belong to the STA, as shown in FIG. 13. In another example, the SIG field may be PPDU specific and inserted before each PPDU (not shown). The SIG field may contain one or more information fields.

One information field may be a backhaul transmission indication, where this field may indicate the transmission is a backhaul transmission between APs to share the data payload for a STA. Alternatively, this field may be carried in a common SIG field in PLOP header.

One or more information fields may be a source AP ID, destination AP ID, and intended STA ID. The source/destination AP IDs may indicate the transmitter and receiver ID. The intended STA ID may indicate the data carried in the PPDU may belong to the STA. The IDs may be MAC address, BSSID, AID, or other type of compressed or uncompressed IDs One or more information fields may be multi-AP HARQ related information, such as HARQ process ID, new transmission indication, and the like. In some instances, the same HARQ process ID may be used for the same packet transmitted in the backhaul transmission stage and multi-AP transmission stage for a STA, so that the STA may determine if it can perform HARQ combining at the receiver side when it receives the packet in the multi-AP transmission stage.

One information field may be a Next SIG field, which may be used to indicate the location of the next SIG field in the A-PPDU.

For the wireless backhaul scenario, the STAs may be allowed to transmit an acknowledgment during a backhaul transmission or after a backhaul transmission to indicate that it detects the PPDU intended for it. The acknowledgment transmissions from STAs may be xIFS time after the last acknowledgment between the APs. Alternatively, the acknowledgment transmissions from STAs may be poll based. For example, one AP may transmit a polling frame to one or more STAs before the multi-AP transmissions, and if the acknowledgment from the STA may be successfully received by one of the APs, the multi-AP transmission stage may not be needed.

For a situation where the STA may transmit an acknowledgment in the backhaul channel(s), the STA may initially monitor the backhaul channel(s). If the STA successfully detects a SIG field in a received packet, the STA may check if it is a backhaul transmission and if the STA ID matches its own ID. If both checks pass, the STA may try to decode the following PPDU(s). If the STA decodes the PPDU(s) successfully, the STA may acknowledge the APs. If the STA does not decode the PPDU(s) successfully, the STA may save the received signal in a buffer and continue to monitor its operating channels. Thereafter, if the STA detects a transmission to it with the same HARQ ID, the STA may combine the received signal with that saved in the buffer and decode. The STA may also perform any other step as described herein.

Figure 14B:
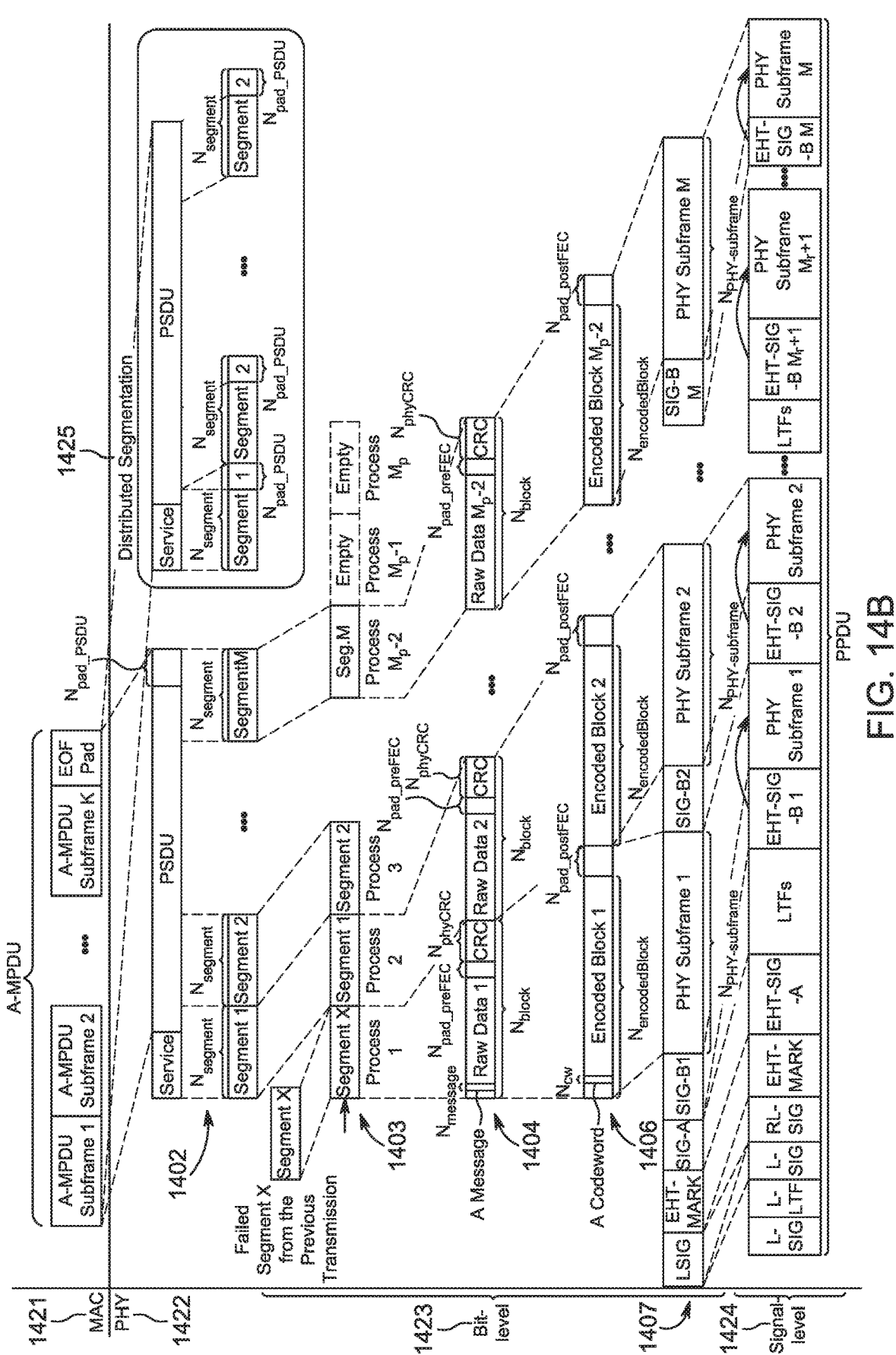
FIG. 14B is a diagram that illustrates an example of different levels/layers of a transmission using a unique SIG-B field for each HARQ process.

FIG. 14A is a flow diagram that illustrates an example transmission process using a unique SIG-B field for each HARQ process. FIG. 14B is a diagram that illustrates an example different levels/layers of a transmission scenario using a unique SIG-B field for each HARQ process. The description of FIG. 14A may apply to FIG. 14B, and the example as illustrated in both figures may be referred to as the example of FIG. 14. There may be a HARQ-based PPDU transmission with $M_p$ HARQ processes for each STA, and the transmission may contain information that may include PLOP Service Data Unit (PSDU) (e.g., a view of the MPDU from the physical layer), service field bits, and the padding bits. This information may be divided into $M \leq M_p$ segments, and each segment may be transmitted along with a unique SIG-B field associated with the corresponding PHY subframe and one or more standalone codewords (CW). For example, a PSDU may comprise of K A-MPDU subframes and End-of-Frame (EOF) (e.g., see FIG. 14B at 1421 MAC layer). The following may then be applied to transmit the PSDU to enable segment-based HARQ transmission with multiple SIG-B fields (e.g., FIG. 14B at 1422 PHY layer, 1423 Bit-level, and 1423 Signal level). This process may be performed by a STA or an AP.

At 1401, the PSDU and service field bits may be concatenated and padded with $N_{pad\_PSDU}$ bits, which may yield $N_{bits}$ bits in total as the information bits to be transmitted. The bits in the information content may be scrambled with a scrambler or may be interleaved with an interleaver.

At 1402, $N_{bits}$ information bits may be divided into M segments where each segment includes $N_{segment}$ bits. In some cases, distributed segmentation may be performed where the information bits are grouped into M segments and the padding is applied to each segment (e.g., FIG. 14B at 1425 Distributed Segmentation). For example, the number of padding bits may be uniformed distributed among segments such that each segment has $N_{pad\_PSDU}$ padding bits. Alternatively, the padding bits may be grouped into bytes first and the number of bytes may be uniformly distributed among segments except the last segment. The segmentation may be a function of the LDPC codeword size.

At 1403, based on the previous failed segments and the new available segments, the segments may be assigned to different HARQ process. Each HARQ process may transmit the same segment until the transmission and until all redundancy versions of the same segment may be transmitted.

At 1404, the raw data in each HARQ process may be padded with $N_{pad\_preFEC}$ bits and prepended with $N_{phyCRC}$ CRC bits, which leads to $N_{block} = N_{segment} + N_{pad\_preFEC} + N_{phyCRC}$ bits. A block may include the raw data, padding, and CRC. The bits in each block may be scrambled with a scrambler. The bits in each block may be interleaved with an interleaver.

At 1405, each block may be portioned into the $M_{message}$ messages wherein each message may contain $N_{message}$ bits.

At 1406, each message may be encoded with an encoder, such as LPDC encoder or BCC encoder, with a code rate $$r = \frac{N_{message}}{N_{cw}},$$

which may generate a codeword of length $N_{cw}$ bits. The encoded block may be generated by concatenating $M_{message}$ codewords where the size of an encoded block may be $N_{encodedBlock} = M_{message} N_{cw}$.

At 1407, the corresponding PHY subframe in bit-level may be generated by padding an encoded block with $N_{pad\_postFEC}$ zeros, which leads length $N_{PHYsubframe} = N_{encodedBlock} + N_{pad\_postFEC}$ bits for each PHY subframe in bit-level.

At 1408, a bit level interleaver may be applied for the $N_{cw}$ coded bits or $N_{encodedBlock}$ bits or $N_{PHYsubframe}$ bits.

For the mth PHY subframe, a unique SIG-B field may be prepared with the following contents: A segment indicator ($\lceil \log_2 M \rceil$ bits) which may indicate what segment is carried on the following PHY-subframe, (e.g., if it is 2; PHY subframe contains information related to the second segment); A new segment indicator (1 bit) may indicate if the content of the following PHY subframe is a new or not (e.g., if it is 0, it is the re-transmission of the same segment (e.g., Segment X in FIG. 14B) if it is 1, it means a new segment is transmitted); A redundancy version index may indicate the redundancy version of the segment (e.g., if it is 3, the third redundancy version of the indicated segment is transmitted in the following PHY-subframe); A number of pre-FEC padding bits ($\lceil \log_2 \max N_{pad\_preFEC} \rceil$) may be used in the following PHY-subframe; A number of post-FEC padding bits ($\lceil \log_2 \max N_{pad\_postFEC} \rceil$) may be used in the following PHY-subframe; A number of PSDU padding bits ($\lceil \log_2 \max N_{pad\_PSDU} \rceil$) may be used in the following PHY-subframe; A modulation-coding index may be used in the following PHY-subframe; A segment length, which may indicate the size of information bits before coding may be used, where the size may be in the unit of bytes, and this field may indicate the size of Raw Block and pre-FEC padding bits and/or this field may indicate the size of Raw Block.

At 1409, the bits in each PHY subframe may be mapped to the modulation symbols which may lead to $N_{modSymbol} = N_{PHYsubframe} / \log_2 S$ where modulation S may be the modulation order (e.g., S=6 for 64-QAM).

A symbol level interleaver may be applied to $N_{modSymbol}$ symbols. Alternatively, the symbol level interleaver may be applied to each OFDM symbol.

At 1410, the modulation symbols then may be mapped to the time and frequency resources in OFDM symbols along with the reference symbols and the resulting OFDM symbols may generate the corresponding PHY subframe in signal-level.

At 1411, the corresponding SIG-B field for the mth PHY subframe may be converted to signal by using OFDM transmission.

The mth SIG-B field associated with the mth PHY subframe may be transmitted back-to-back.

In one case, $N_{pad\_preFEC}$ may be chosen uniformly for each block, which may simplify the receiver design. In another case, $N_{pad\_preFEC}$ may be set to 0 except the last block transmitted to reduce the overhead. For example, the bits may be evenly distributed to units (pre-FEC padding in each unit) or evenly distributed to the byte level to each unit and the last unit may need pre-FEC padding.

An EHT-MARK field also may contain signature information related to a HARQ PPDU. It may be a rotated version of RL-SIG. For example, EHT-MARK may be 1i*RL-SIG.

The segmentation calculation may be based on the codeword length. For example, various parity check matrices with different sizes may be considered for LPDC, which may yield different codeword length. To address this issue, the $N_{bits}$ information bits may be partitioned into $M = N_{CW,total}$ groups. After CRC addition, each group may be encoded to a plurality of codewords (i.e., block). Based on the size of the selected parity check matrix, $N_{CW,total}$ may be determined.

Figure 15:
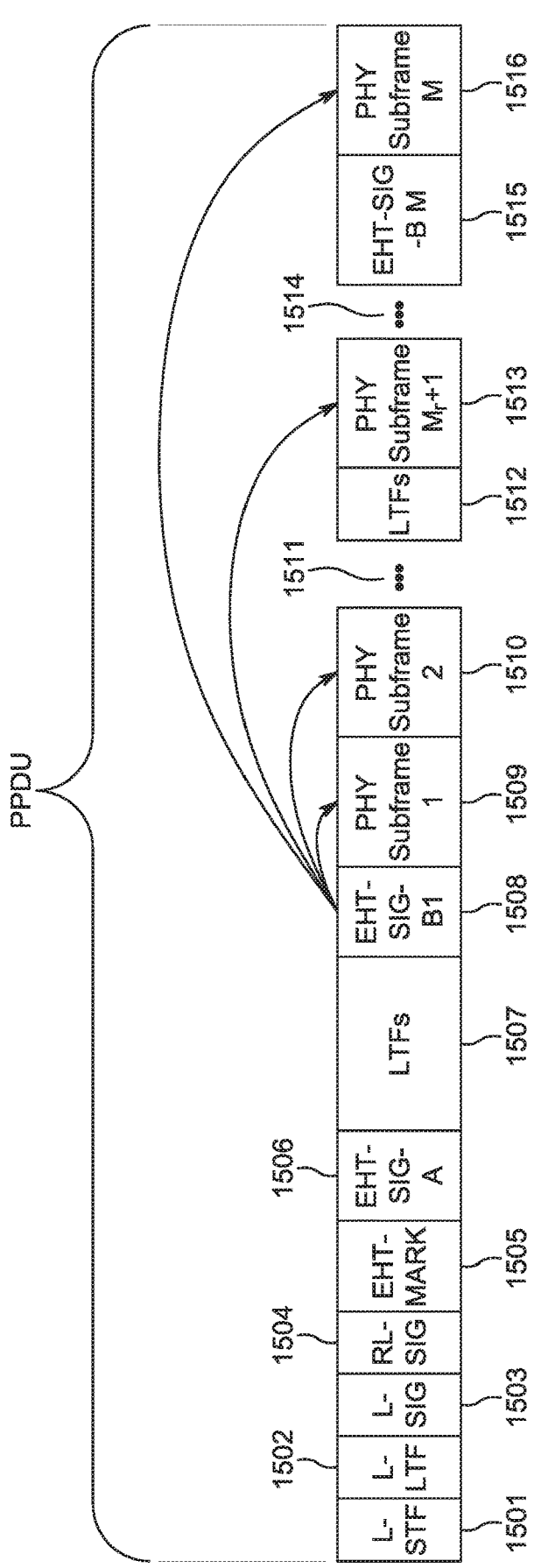
FIG. 15 is a packet diagram illustrating an example where a single SIG-B indicates the HARQ information related to all PHY subframes.

FIG. 15 is a packet diagram illustrating an example where a single SIG-B indicates the HARQ information related to all PHY subframes. To reduce the PPDU duration, the SIG-B field which may comprise of multiple OFDM symbols that may include the information related to multiple PHY subframes. For this one PPDU, the EHT-SIG-B1 1508 may provide the information for the PHY Subframe 1 1509, the PHY Subframe 2 1510, and so on, until the $M^{th}$ PHY Subframe 1516.

Figure 16:
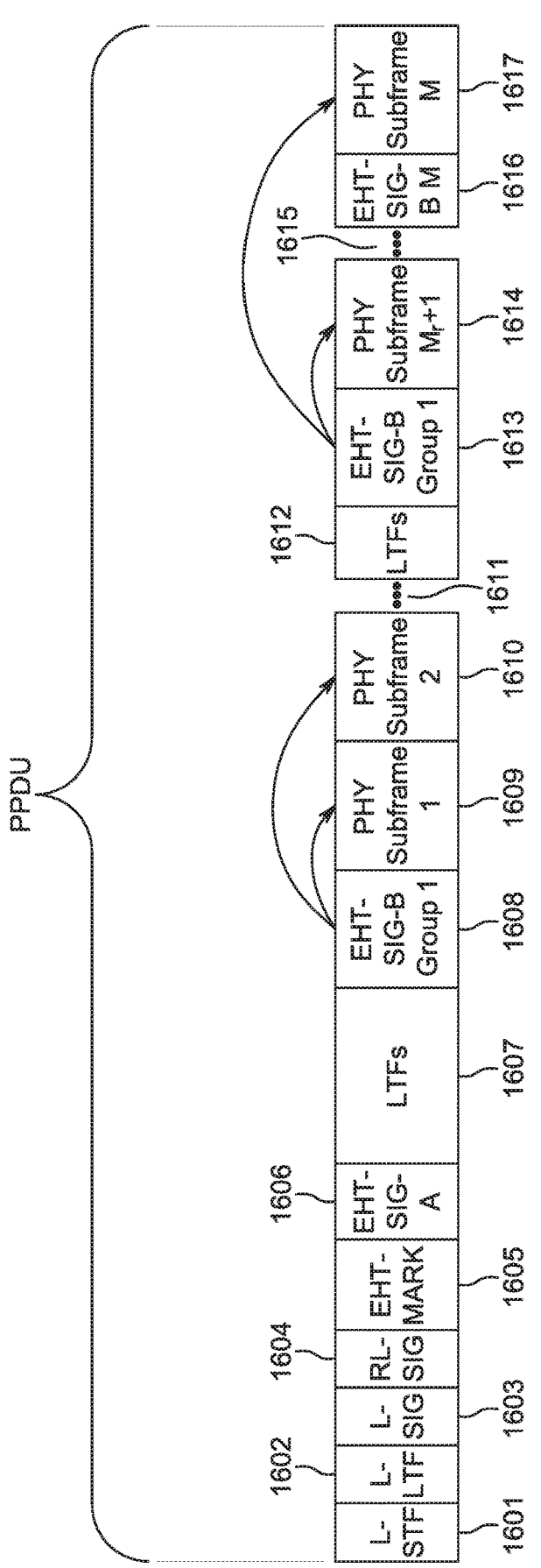
FIG. 16 is a packet diagram illustrating an example where a single SIG-B indicates the HARQ information related to a group of PHY subframes.

FIG. 16 is a packet diagram illustrating an example where a single SIG-B indicates the HARQ information related to a group of PHY subframes. Here, for one PPDU a single SIG-B 1608 may indicate the information related $M_r$ PHY subframes and the following PHY subframes are indicated by another SIG-B 1613 along with LTFs.

In some cases, to enhance the channel estimation performance for long packets with HARQ retransmission, LTFs may be retransmitted after the $M_r$th PHY subframe. For example, if $M_r = 4$, between the fourth and fifth PHY subframe, LTFs may be re-transmitted.

In one approach, there may be segmented transmissions with a single HARQ process ID. A PPDU transmission may have a single HARQ process ID and up to $M_{max}$ PHY Subframes, where $M_{max}$ may be predefined/predetermined. Alternatively, the value may be dynamically determined by the AP and signaled in management/control frames, such as a Beacon frame, a Trigger frame, or the like. For each STA, the information content that may include a PSDU, service field bits, and the padding bits, may be divided into $M \leq M_{max}$ segments and each segment may be transmitted along with a unique SIG-B field associated with the corresponding PHY subframe and one or more standalone codewords. A single HARQ process ID may be used for all segments which may be generated by one PSDU, and each segment may have its own segment ID. It may be possible that in one transmission, or an A-PPDU, PHY Subframes may have different HARQ process IDs. For example, some PHY Subframes may be used for retransmission with HARQ process ID x and some PHY Subframes may be used for new transmission with HARQ process ID y. The segment ID and HARQ process ID together may uniquely identify a PHY subframe/segment.

The procedure may be the same as that discussed with relation to FIG. 14A, however, the signaling part may be modified. In the case that a SIG-B field may be carried before each PHY Subframe, for the mth PHY subframe, the SIG-B field may be prepared with a HARQ process ID, which may indicate the HARQ process ID for the PHY Subframe. The SIG-B field may be prepared with a Segment ID, which may indicate what segment is carried on the following PHY-subframe, where this field may have $\lceil \log_2$ $M_{max}$] bits or $\lceil \log_2 M \rceil$ bits. The SIG-B field may be prepared with a segment indicator (1 bits), which may indicate if the content of the following PHY subframe is a new transmission or not (e.g., if it is 0, it may be the re-transmission of the same segment (e.g., Segment X in FIG. 14B), and if it is 1, it may indicate a new segment is transmitted). The SIG-B field may be prepared with a redundancy version index, which may indicate the redundancy version of the segment (e.g., if it is 3, the third redundancy version of the indicated segment may be transmitted in the following PHY-subframe). The SIG-B field may be prepared with a Number of pre-FEC padding bits ($\lceil \log_2 \max N_{pad\_preFEC} \rceil$) used in the following PHY-subframe. The SIG-B field may be prepared with a Number of post-FEC padding bits ($\lceil \log_2 \max N_{pad\_postFEC} \rceil$) used in the following PHY-subframe. The SIG-B field may be prepared with a Number of PSDU padding bits ($\lceil \log_2 \max N_{pad\_PSDU} \rceil$) used in the following PHY-subframe. The SIG-B field may be prepared with a Modulation-coding index used in the following PHY-subframe. The SIG-B field may be prepared with a segment length, which may indicate the size of information bits before coding, where the size may be in the unit of Bytes, and this field may indicate the size of Raw Block and pre-FEC padding bits and/or this field may indicate the size of Raw Block.

Figure 17:
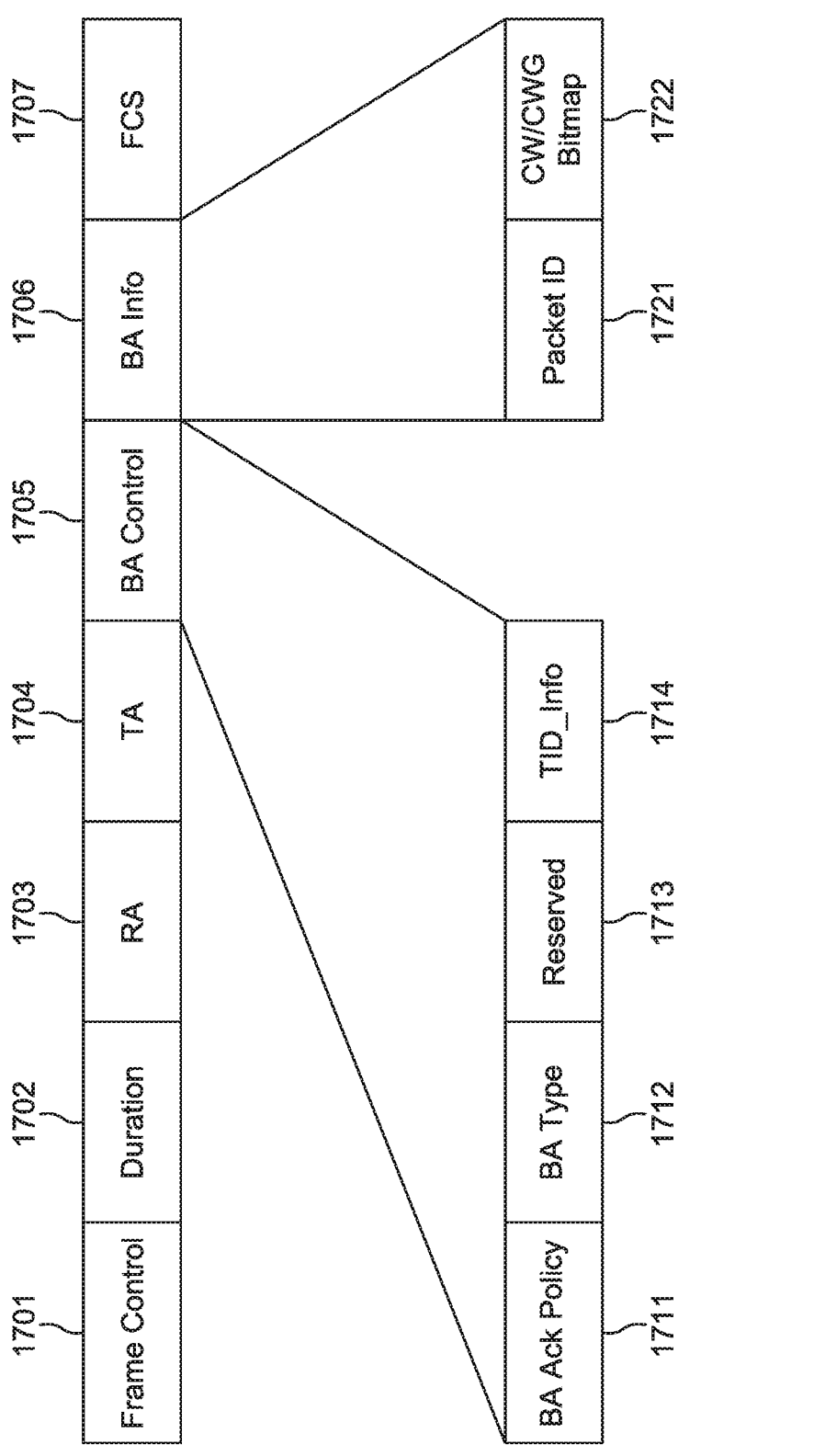
FIG. 17 is a SIG-B diagram illustrating an example of a frame format for basic code word (CW)/CW group (CWG) based acknowledgment.

FIG. 17 is a SIG-B diagram illustrating an example of a frame format for basic code word (CW)/CW group (CWG) based acknowledgment. Generally, a basic CW/CWG based acknowledgment may be used to carry CW/CWG based acknowledgment for a packet with a packet ID 1721. The packet ID may be a HARQ transmission ID, a sequence number, a MAC protocol data unit (MPDU) ID or a PPDU ID. The packet ID 1721 may be used to uniquely identify a packet within a period. The packet ID may be carried in a PLCP header, and the content of the packet may be carried in a data field. The packet may be composed of one or more codewords. The maximum number of CWs/CWGs may be predefined, predetermined or configured.

A value in a BA Type field 1712 may indicate a basic CW/CWG based acknowledgment. By detecting this field, the receiver may expect the BA Info field 1706 to contain fields such as a Packet ID field 1721 and a CW/CWG bitmap field 1722.

A Packet ID field 1721 may be used to carry an ID for the acknowledged packet. The Packet ID may be a HARQ transmission ID, a sequence number, a MPDU ID or a PPDU ID. The packet ID may be used to uniquely identify a packet within a period.

A CW/CWG bitmap field 1722 may carry CW or CWG acknowledgments for the packet. The size of the bitmap may be determined by the maximum number of CWs/CWGs allowed for a packet. A maximum number of CWs/CWGs per packet may be predetermined, predefined or configured. In one case, the maximum number of CWs/CWGs per packet may be related to traffic identifier (TID) values. For example, for TID 1, n1 CWs/CWGs may be allowed, and for TID 2, n2 CWs/CWGs may be allowed. A $k^{th}$ bit in the bitmap may indicate if the $k^{th}$ CW or CWG may be correctly decoded.

Figure 18:
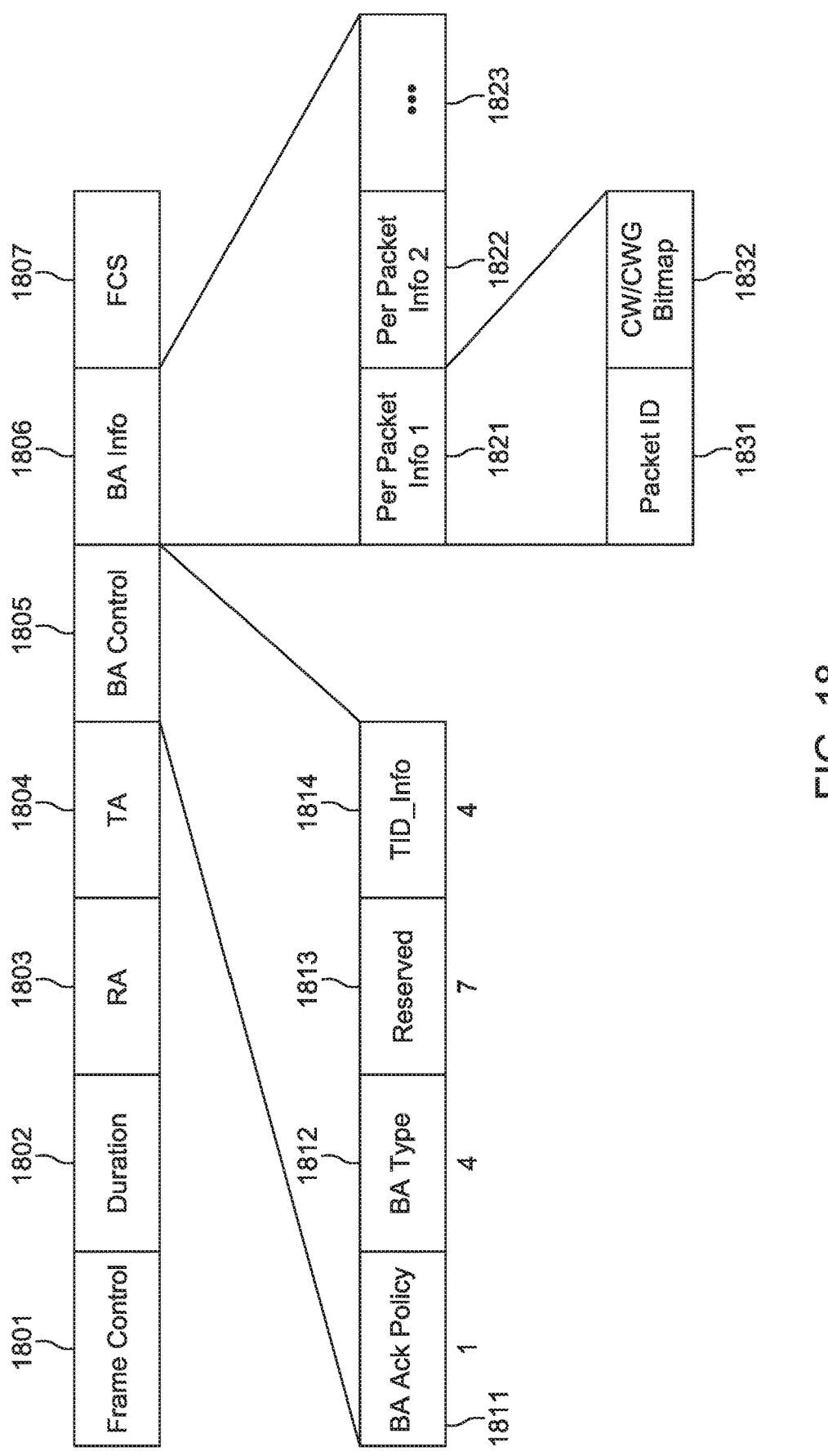
FIG. 18 is a SIG-B diagram illustrating an example of a frame format for aggregated codeword (CW)/CW group (CWG) based acknowledgment.

FIG. 18 is a SIG-B diagram illustrating an example of a frame format for aggregated codeword (CW)/CW group (CWG) based acknowledgment. Here, an aggregated CW/CWG based acknowledgment may be used to carry CW/CWG based acknowledgment for one or more packet IDs. The acknowledgment may be an aggregated acknowledgment.

A value in a BA Type 1812 field may indicate an aggregated CW/CWG based acknowledgment. By detecting this field, the receiver may expect the BA Info 1806 field to contain fields such as a Packet ID field 1831 and a CW/CWG bitmap field 1832. The BA Info field 1806 may carry one or more Per Packet Info fields (e.g., 1821, 1822, 1823). Each Per Packet Info field may carry a Packet ID field 1831 and a CW/CWG bitmap field 1832.

In some cases, an acknowledgment may be a PHY layer acknowledgment and carry limited information. Such information may be carried in a null data packet (NDP), which may have a PLOP header and no MAC body.

CW based NDP ACK may have one or more of fields. The CW based NDP ACK may include a wideband PLOP header, which may include L-STF, L-LTF, L-SIG, RL-SIG field, or the like. The transmission of these fields may be over the entire operating band.

The CW based NDP ACK may include a narrow band PLOP header with NDP acknowledgment, which may include EHT-STF, EHT-LTF, CW sequences. The transmission of these fields may be over the entire band, or over the assigned RUs (e.g., narrowband).

There may be resource unit (RU) based CW sequences defined for acknowledgment. In one case, two sequences may be defined, and one sequence may indicate a positive ACK, and the other sequence may indicate a negative ACK. In another case, three sequences may be defined, where one sequence may indicate a positive ACK and a second sequence may indicate a negative ACK; a third sequence may be used to pad the transmission to the same boundary.

Figure 19:
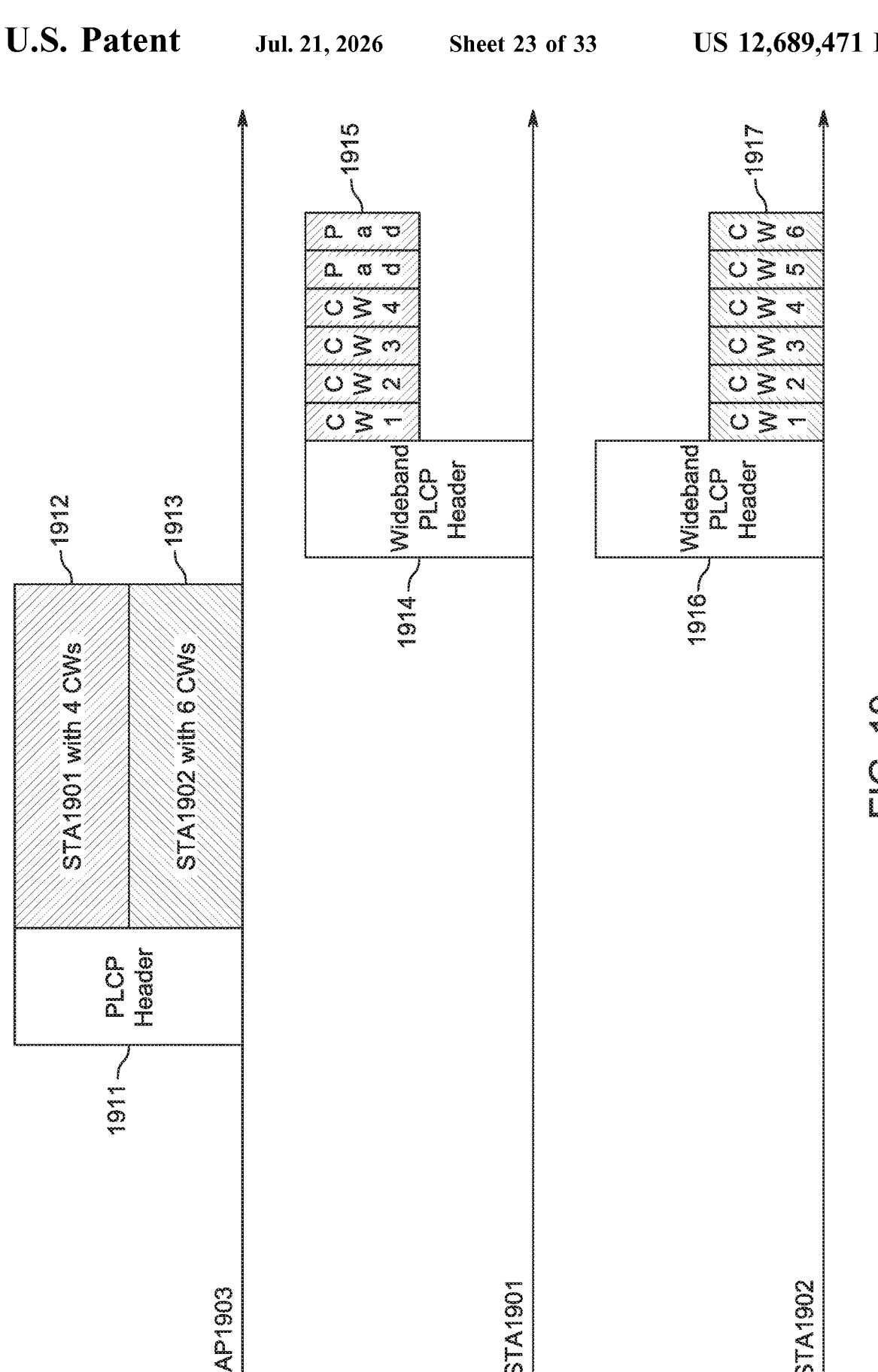
FIG. 19 is a transmission diagram illustrating an example of DL OFDMA transmission with UL NDP CW based acknowledgment.

FIG. 19 is a transmission diagram illustrating an example of DL OFDMA transmission with UL NDP CW based acknowledgment. Generally, CW sequences may be transmitted over assigned RUs and over N OFDM symbols. The RUs may be explicitly assigned or implicitly assigned. With implicit assignment, the RUs may be used to carry CW ACKs and may be the same set of RUs for acknowledged data transmission. In one case, the RU based CW sequence may be repeated over the assigned RUs.

N may be determined by the maximum number of CWs allowed or the maximum number of CWs in the acknowledged data transmission among all the users. For example, if four CWs are allowed for data transmissions, then N may be 4n, as shown in the transmission from AP1903 to STA1901 with four CWs (e.g., see 1915 showing 4 CWs and 2 pads). The first n OFDM symbols may be used to carry the CW sequence corresponding to the first CW. The second n OFDM symbols may be used to carry the CW sequence corresponding to the second CW and so on. Here n may be a predefined, predetermined, or configured integer number; for example, n=1. At the transmission to STA1902, there may be six CWs (e.g., see 1917 showing 6 CW), so N=6n.

Low density parity check (LDPC) may be used as one of the coding schemes for WLAN. An aggregated packet may contain multiple LDPC codeword groups. Due to channel and interference variation, some of the codeword groups may be correctly decoded, while others may not be correctly decoded. It follows then that there is a need for improved LDPC encoding for WLAN packets to enable more efficient HARQ transmissions to achieve higher peak throughput.

Figure 20:
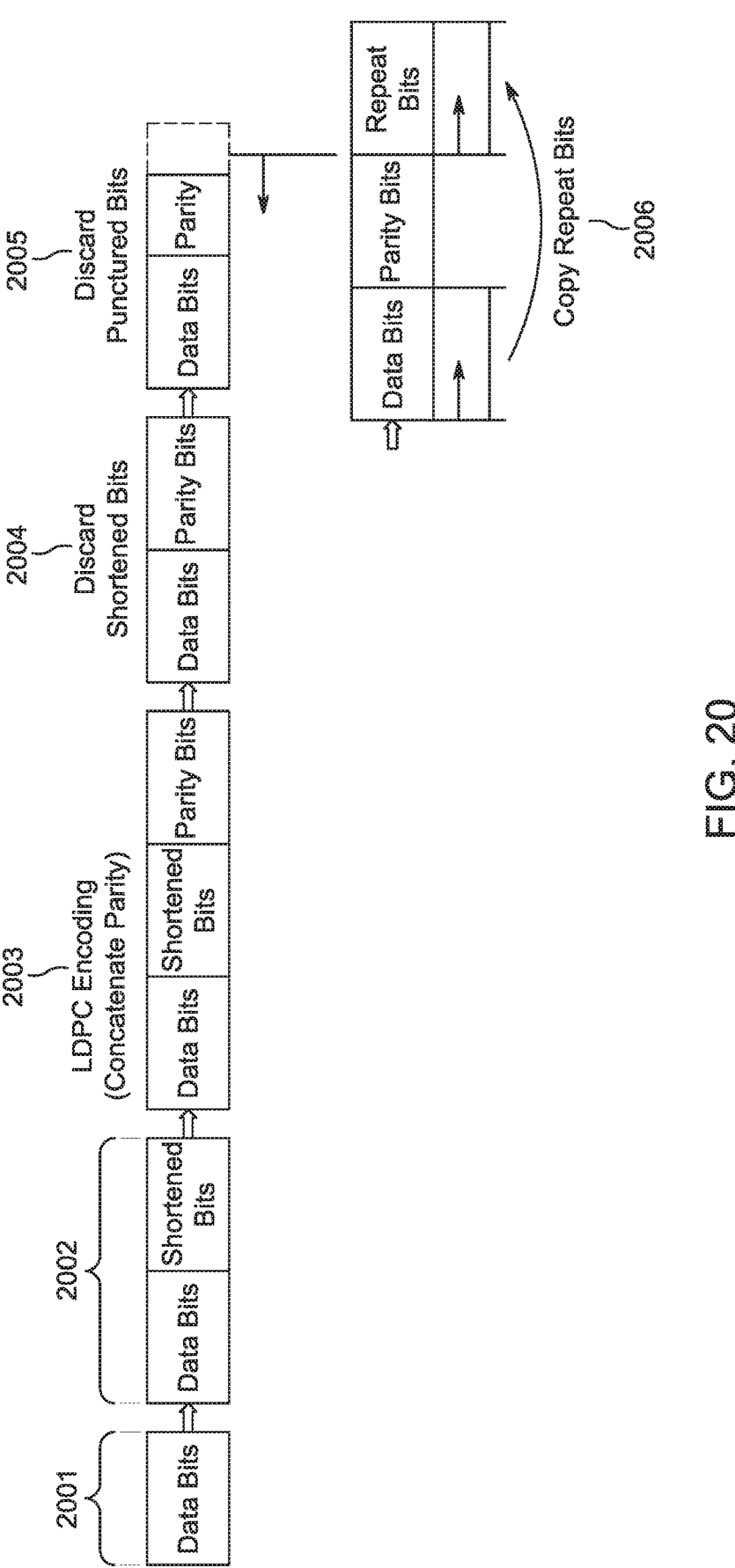
FIG. 20 is a diagram illustrating an example low density parity check (LDPC) encoding for a single codeword (CW)

FIG. 20 is a diagram illustrating an example LDPC encoding for a single CW. In LDPC encoding and decoding Incremental Redundancy (IR) HARQ, for example in 802.11, the bits selected for each redundancy version may be different. In this example process, data bits are input at 2001. Next, at 2002 shortened bits are inserted right before the LDPC encoding to fit the encoded bit length at 2003.

Afterwards, at 2004 the shortened bits are discarded. If needed, at 2005 and 2006, puncturing and repeating may follow to generate the final CW.

Figure 21:
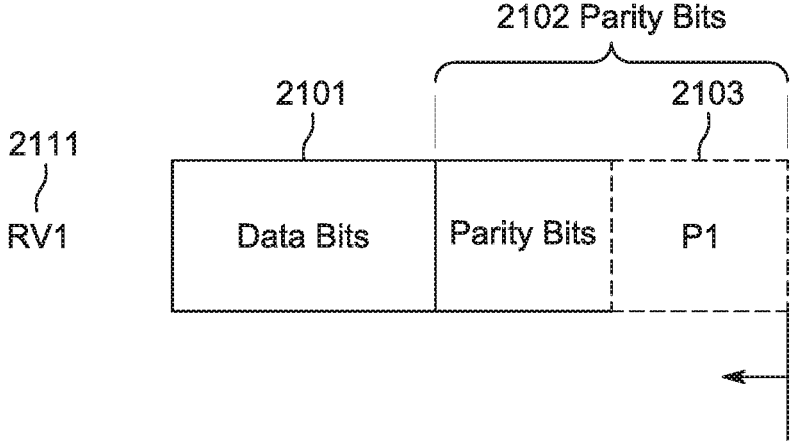
FIG. 21 is a diagram illustrating an example of puncturing in LDPC encoding.

FIG. 21 is a diagram illustrating an example of puncturing in LDPC encoding. Generally, in LDPC encoding, the punctured bits may be equally distributed over all NCW codewords with the first $N_{punc}$ mod NCW codewords punctured one bit more than the remaining codewords. The Number of punctured bits per codeword may be defined as $N_{ppcw}$=floor ($N_{punc}/N_{cw}$). If $N_{ppcw}$>0, the puncturing may be performed by discarding the last $N_{ppcw}$ parity bits of the encoded packet. In this example, there is a RV1 encoded packet 2111 with data bits 2101 and parity bits 2102. Puncturing may be performed by discarding the last P1 2103 parity bits 2102 from the end of the encoded RV 1 packet 2111.

Figure 22:
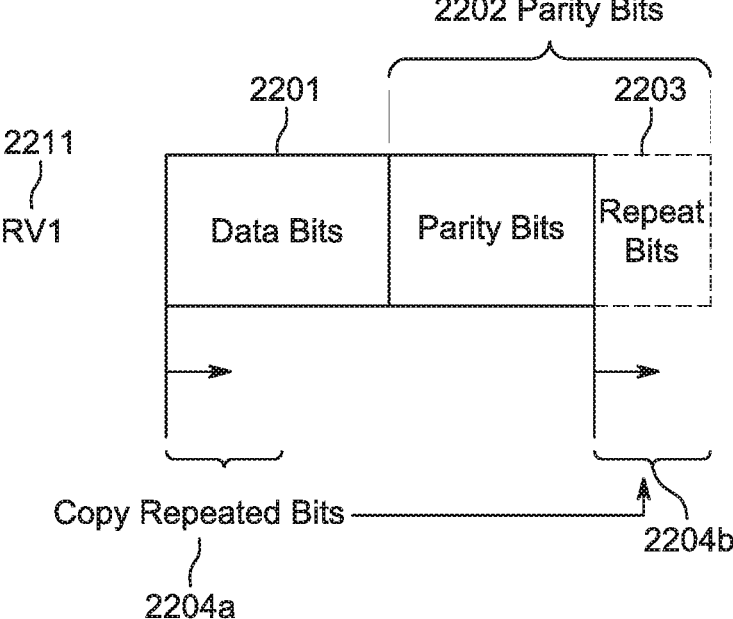
FIG. 22 is a diagram illustrating an example of padding in LDPC encoding.

FIG. 22 is a diagram illustrating an example of padding in LDPC encoding. Generally, for padding, the number of coded bits per codeword may be defined as $N_{rep}$ to be repeated and $N_{rep}$ is calculated. The number of coded bits to be repeated may be equally distributed over all codewords with one or more bits repeated for the first codeword than for the remaining codewords. The coded bits to be repeated for any codeword may be copied from that codeword itself (e.g., copy repeated bits 2204a-2204b), starting from information bit i(0) (e.g., the first bit) and continuing sequentially through the information bits (e.g., data bits 2201) and, when necessary, into the parity bits (e.g., 2202), until the required number of repeated bits are obtained for that codeword. The repeated bits (e.g., 2203) may be copied from the codeword after the shortening bits have been removed. To enable different redundancy versions in this process, the specific bits may need to be selected for removal (e.g., in puncturing) or repetition (e.g., in padding) for IR-HARQ.

For IR-HARQ, additional redundancy versions (RVs) may be selected by changing a start index of the punctured bits or the bits selected from the data bits for padding. The rest of the LDPC encoding procedure may stay the same.

Figure 23:
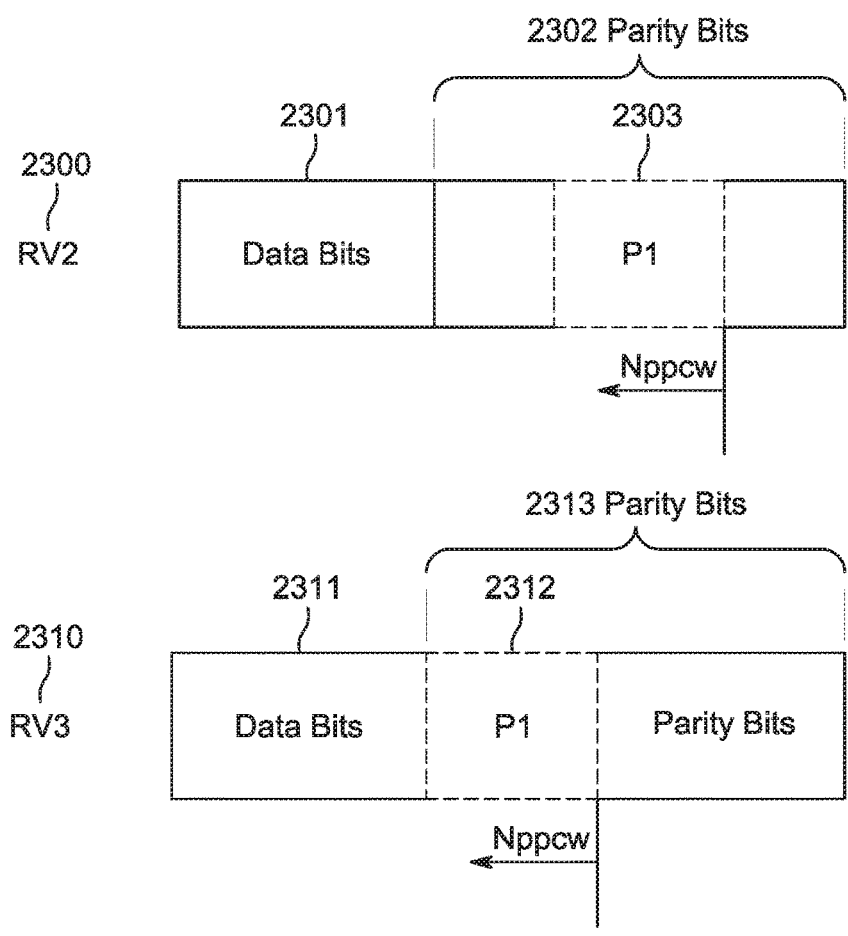
FIG. 23 is an encoding diagram illustrating an example of puncturing for IR-HARQ in LDPC encoding.

FIG. 23 is an encoding diagram illustrating an example of puncturing for IR-HARQ in LDPC encoding. For puncturing for IR-HARQ, a start index of the punctured bits (e.g., P1 2303 and 2312) may be changed for each RV, as shown for RV2 2300 and RV3 2310. Note that the parity bits 2303 for RV2 2300 start at a different time than the parity bits 2312 for RV3 2310.

Figure 24:
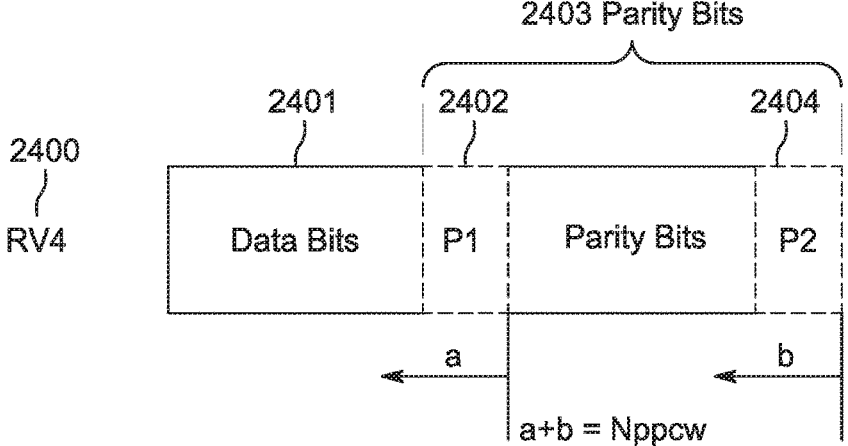
FIG. 24 is an encoding diagram illustrating an example of puncturing for IR-HARQ with parity buffer wraparound.

FIG. 24 is an encoding diagram illustrating an example of puncturing for IR-HARQ with parity buffer wraparound. When a start of the bits to be punctured is such that the punctured bits are some of the data bits 2401, the parity buffer may be wrapped around so that the bits to be punctured are at the start and end of the parity bit buffer 2403; see P1 2402 wrapping around the parity bits 2403 with P2 2404. This ensures that the data bits 2401 are not affected and may ensure that the system is self-decodable.

Figure 25:
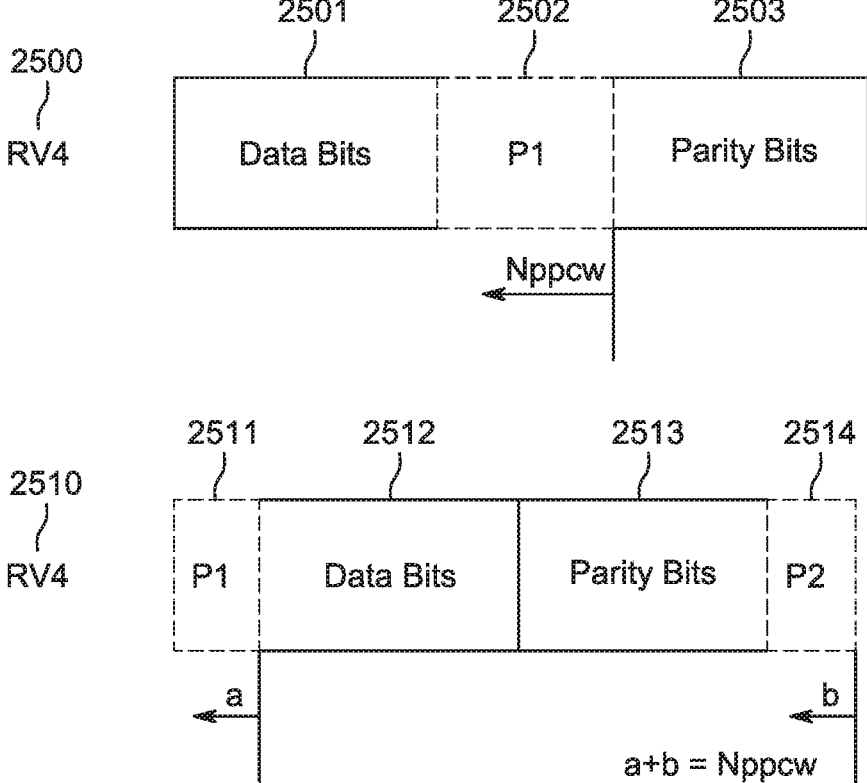
FIG. 25 is an encoding diagram illustrating an example of puncturing for IR-HARQ with an entire buffer wraparound.

FIG. 25 is an encoding diagram illustrating an example of puncturing for IR-HARQ with an entire buffer wraparound. At RV4 2500, when a start of the bits to be punctured is such that the punctured bits P1 2502 are some of the data bits 2501 and the parity bits 2503), then an entire wraparound may be employed. At RV4 2510, the wraparound is showed where P1 2511 is at the beginning and P2 2514 is at the end (e.g., wrapping around).

Figure 26:
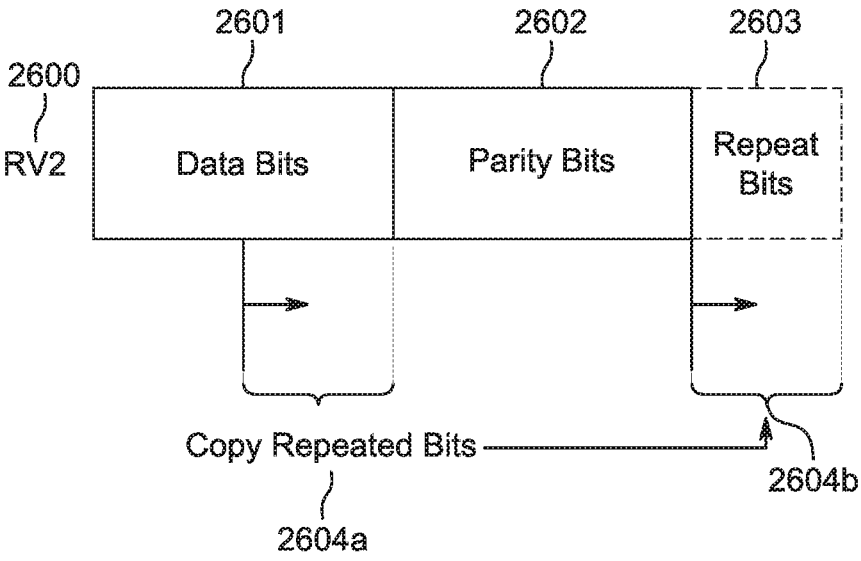
FIG. 26 is an encoding diagram illustrating an example of padding for IR-HARQ.
Figure 26:
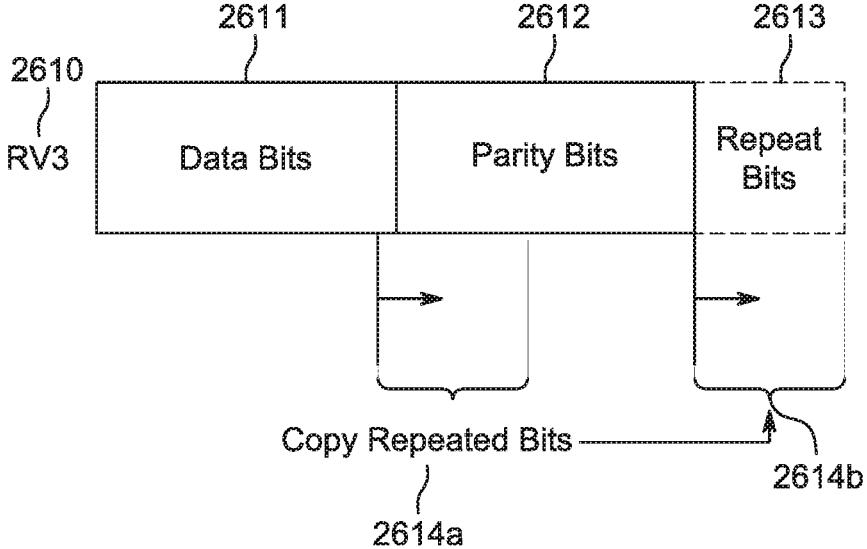

FIG. 26 is an encoding diagram illustrating an example of padding for IR-HARQ. To perform padding for IR-HARQ, the start index of the padded bits may be changed for each redundancy version. For example, for RV2 2600 the start index at 2604a may be copied to the repeat bits 2603 at

2604b, and at RV3 2610 the start index 2614a may move forward relative to RV2 2600, with the repeated bits 2613 going to 2614b.

Figure 27:
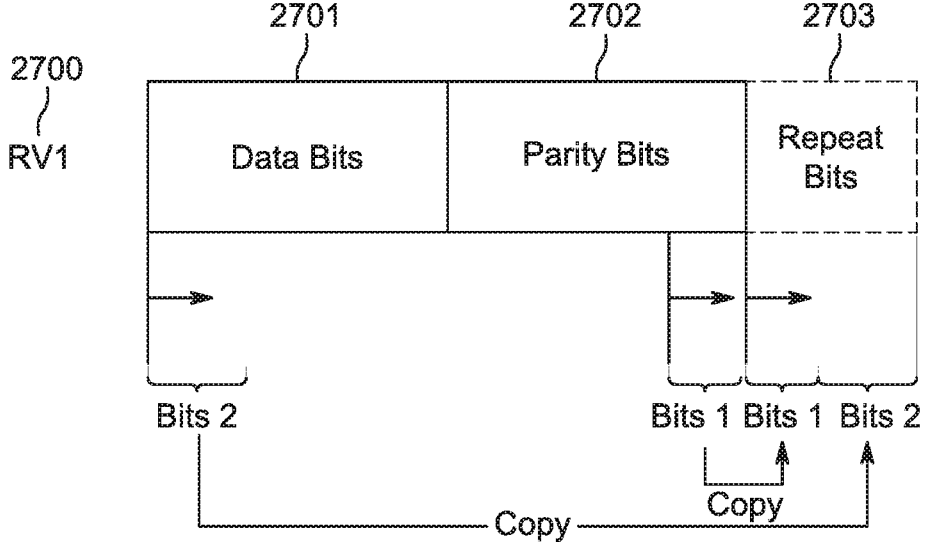
FIG. 27 is an encoding diagram illustrating an example of padding for IR-HARQ.

FIG. 27 is an encoding diagram illustrating an example of padding for IR-HARQ. For RVs such as RV1 2700 with start indices that exceed a size of a combined data 2701 and parity bits buffer 2702, the buffer may be wrapped around (e.g., bits 2 is copied from the data bits 2701 to the end of the repeated bits 2703 and bits 1 is copied from the end of the parity bits to the beginning of the repeated bits 2703).

A duration field in a MAC header may indicate a duration starting from the end of a physical layer convergence protocol (PLOP) protocol data unit (PPDU) to the end of a transmission opportunity (TXOP), which may include a response frame and/or multiple exchanges between a transmitter and a receiver. A duration field in the first HARQ transmission and a HARQ retransmission may not be the same. In a case where the HARQ transmissions may be in different TXOP, a TXOP format may be different such that the duration fields may carry different values. In a case such where the HARQ transmissions may be in a single TXOP, each duration field carried by a HARQ transmission may indicate the duration from the end of the PPDU that carries the duration field to the end of the TXOP. Therefore, the duration fields may be different from one HARQ transmission to another.

If duration fields are not the same, the MAC frames may be different. A first transmission and a retransmission may carry different information bits, which may cause issues for HARQ combining. A duration field may be used for unintended STAs to set a Network Allocation Vector (NAV), which may force a same duration field, which may cause issues.

In an approach to address the above issues, a TXOP duration field carried by a signal (SIG) field and a duration field carried by a MAC header may be used to jointly signal the potential TXOP duration with HARQ transmissions. This approach may be applicable to any transmitter and a receiver, either of which may be a STA or an AP.

For a HARQ transmission, the transmitter may set, in a PLCH header or SIG field, a transmission indicator that indicates if the transmission is a first transmission. The transmitter may set, in a PLCH header or SIG field, a TXOP duration field that may indicate a quantized TXOP duration from the end of this PPDU to the end of the TXOP; a quantized TXOP may be needed since a TXOP duration may be long and require many bits, whereas the SIG field has limited space, so some quantization of the TXOP may be needed. A TXOP duration field may be different from each HARQ transmission for the same data packet.

For a HARQ transmission, the transmitter may set, in a MAC header, which is carried in a PPDU data field, a Duration field. For a first transmission of a HARQ transmission sequence, the Duration field may indicate the TXOP duration from the end of this PPDU to the end of the TXOP. For retransmissions of a HARQ transmission sequence, the Duration field may be set to the same value as that in the first HARQ transmission, and therefore may be the same among all the HARQ transmissions for the same data packet.

A receiving STA, including a desired and a non-desired receiving STA, may check the PLOP header. If the receiving STA successfully detects the PLOP header and SIG field, the receiving STA may check the new transmission indication and continue decoding procedures as discussed herein. If the receiving STA does not successfully detect the PLOP header, the receiving STA may stop decoding. If a new transmission indication indicates a new transmission (e.g., a first transmission a HARQ transmission sequence), the receiving STA may save a value in the TXOP duration field and continue to check the data field. If the data field is successfully decoded, and the receiving STA is not the desired receiving STA, the receiving STA may set NAV based on the duration field carried in the MAC header. If the data field is successfully decoded, and the receiving STA is the desired receiving STA, then the receiving STA may prepare the acknowledgment if needed. If the data field is not successfully decoded, then the receiving STA may set NAV based on the TXOP duration field carried in the PLOP header.

If a new transmission indication indicates a retransmission, the receiving STA may save the value in the TXOP duration field, and continue to check if the STA is the desired receiving STA. If the STA is the desired receiving STA, then the STA may continue to decode the data field. HARQ combination may be performed. If the STA is not the desired receiving STA, then the STA may use the TXOP duration value carried in PLOP header to set or update NAV.

In some cases, fields to be carried in a MAC header may be split into two groups. The fields that may be changed from one HARQ transmission to another may be put into a first group, and the other fields may be put into a second group. For example, the first group may include a duration field, a retry field, and/or a receiving address field. The first group may be carried in a HARQ SIG field, which may be present in a PPDU. For HARQ transmissions or HARQ retransmissions, the second group information may be used to replace a MAC header. In some instances, the format of a MAC header may not be changed, and the content of the MAC header may not be modified from the $x^{th}$ HARQ transmission to the $y^{th}$ HARQ transmission. Here x and y may be any integer numbers from 1 to $N_{max}$, and $N_{max}$ may be the maximum allowed HARQ transmissions. On reception of a HARQ retransmission, the receiver may focus on the HARQ SIG field and second group information carried by MAC header to acquire control information for the packet.

The presence of a HARQ SIG field may be optional and may be signaled by a HARQ SIG present field in general SIG fields, such as SIG-A or SIG-B fields.

In the case of CW based HARQ transmissions, the HARQ SIG field may include information for a receiver to identify the CW. For example, a HARQ SIG field may have MAC addresses, compressed MAC addresses, AIDs, compressed AIDs or other types of IDs of the transmitter(s) and receiver(s). The HARQ SIG field may include a packet ID, such as MPDU ID, PPDU ID so that the receiver may know the received CW belongs to the MPDU or PPDU. The MPDU ID may be the sequence number. The entire MAC header may be moved to the HARQ SIG field together with other HARQ related information.

Figure 28A:
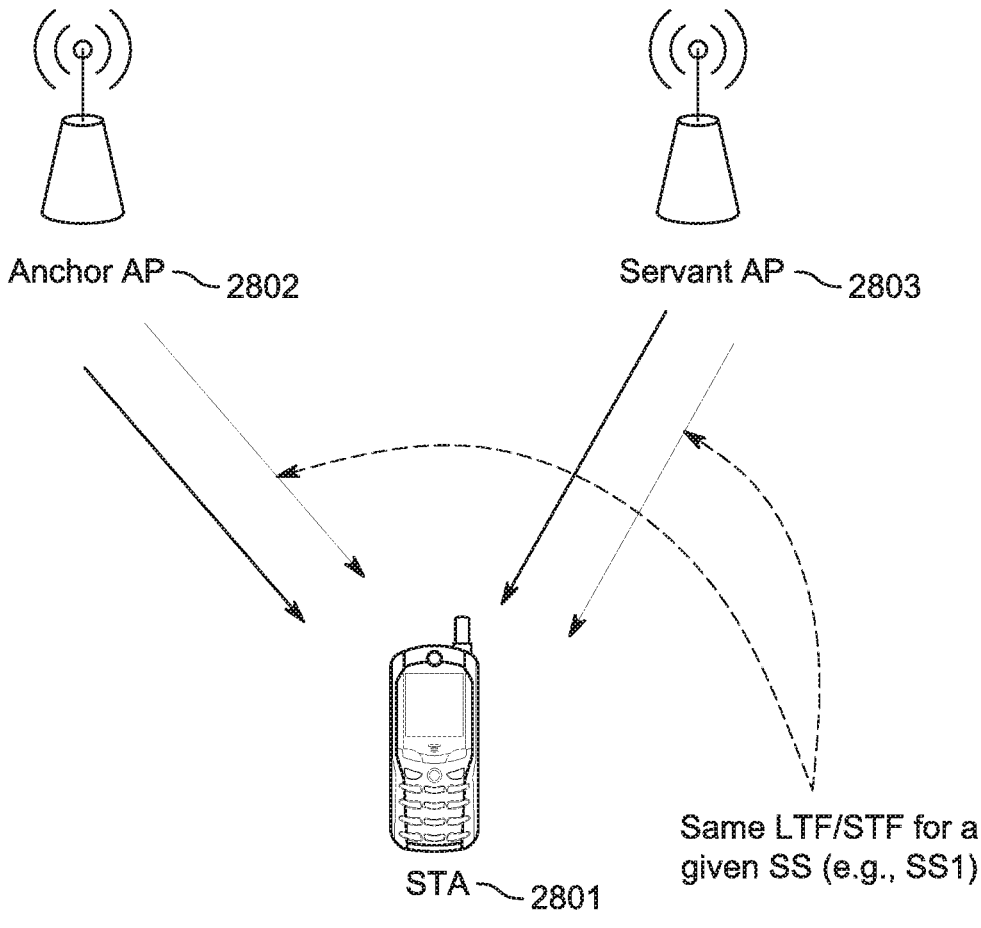
FIG. 28A is a diagram illustrating an example of a joint transmission to a single STA from two APs.
Figure 28A:
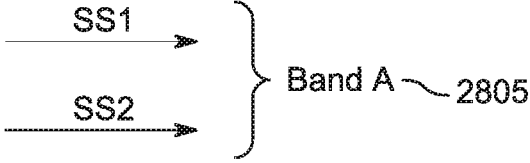

FIG. 28A is a diagram illustrating an example of a joint transmission to a single STA from two APs. In a MU-MIMO joint transmission from a single STA's perspective, a servant trigger may be sent from anchor AP 2802 to a servant AP 2803 before the joint transmission to STA 2801. The trigger may synchronize carrier and symbol frequencies between the APs (e.g., 2802 and 2803) to approximately match the condition when CSI was taken by the STA 2802 prior to the joint transmission.

Noise may be added to the servant trigger when received by the servant AP. After the Carrier Frequency Offset (CFO) correction/synchronization of the servant trigger, there may be no guarantee that the carrier/symbol frequencies at the servant AP 2803 may be exactly the same as that of the anchor AP 2802. Furthermore, the clocks of the APs may drift after this synchronization during the joint transmission, and the synchronized frequency between the APs may also have an offset to the STA 2801 carrier/symbol frequency. Therefore, a residual CFO correction at the receiving/non-AP STA side may be needed.

In some 802.11 protocols, when a STA receives a PPDU, the transmitter of one spatial stream may be a single entity, which has a single clock. Based on this assumption, the receiving STA may base estimations on Short Training Frame (STF) and/or Long Training Frame (LTF) and/or pilots to correct the initial and residual CFO/Sample Frequency Offset (SFO).

In a joint transmission, the transmitters of a spatial stream may be multiple APs and each AP may have its own clock. The use of STF/LTF to estimate the initial CFO may not be ideal because signals from different APs may use the same STF/LTF sequence for the same spatial stream, which may not be separable at the receiver side. Furthermore, the data portions transmitted from different APs of the same spatial stream may also not be separable at the receiver side (e.g., joint transmission to a single antenna STA). This may make present issues for the receiver to apply a specific correction for the signal coming from a specific AP.

As a joint transmission procedure may be transparent to the STA 2801 (e.g., where the STA may not be aware that more than one AP participated in the beamformed transmission), an indication may be signaled in the preamble of a joint transmission PPDU to indicate that it is a joint transmission PPDU, such that the STA may not use the CFO/SFO correction procedures, or other receiver procedures, that are applied to a PPDU coming from a single entity.

For example, if a STA receives a PPDU with two spatial streams with the joint transmission indication, it may assume the two streams have different frequency offsets from its own clock. Based on this, it may perform CFO/SFO corrections per stream separately based on the STF/LTF/pilots of each stream, instead of combining these reference signals from 2 streams to jointly determine a single CFO/SFO correction for both streams.

Figure 28B:
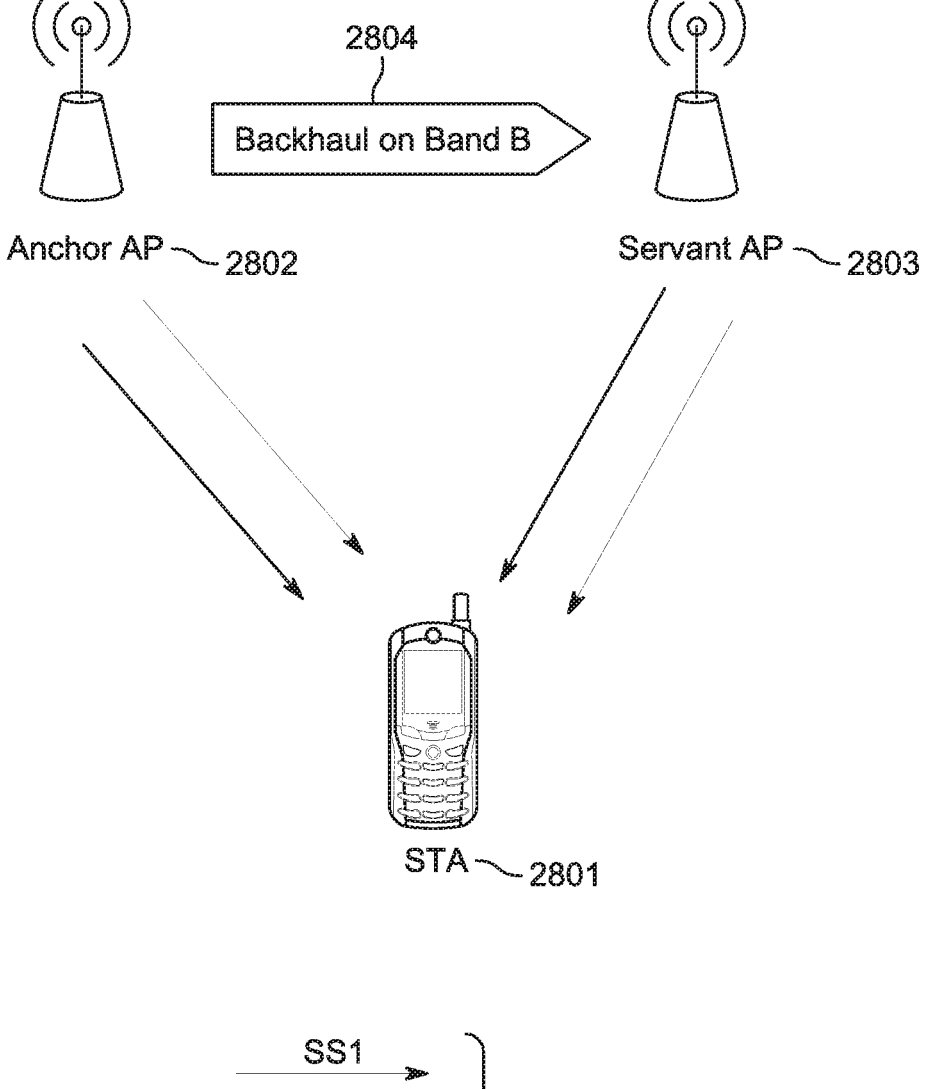
FIG. 28B is a diagram illustrating an example of a joint transmission to a single STA from two APs with a backhaul.

FIG. 28B is a diagram illustrating an example of a joint transmission to a single STA from two APs with a backhaul. The two APs may have a backhaul 2804 link, operating on Band B (e.g., a different band than the bands of used for the joint transmission to the STA).

Figure 28C:
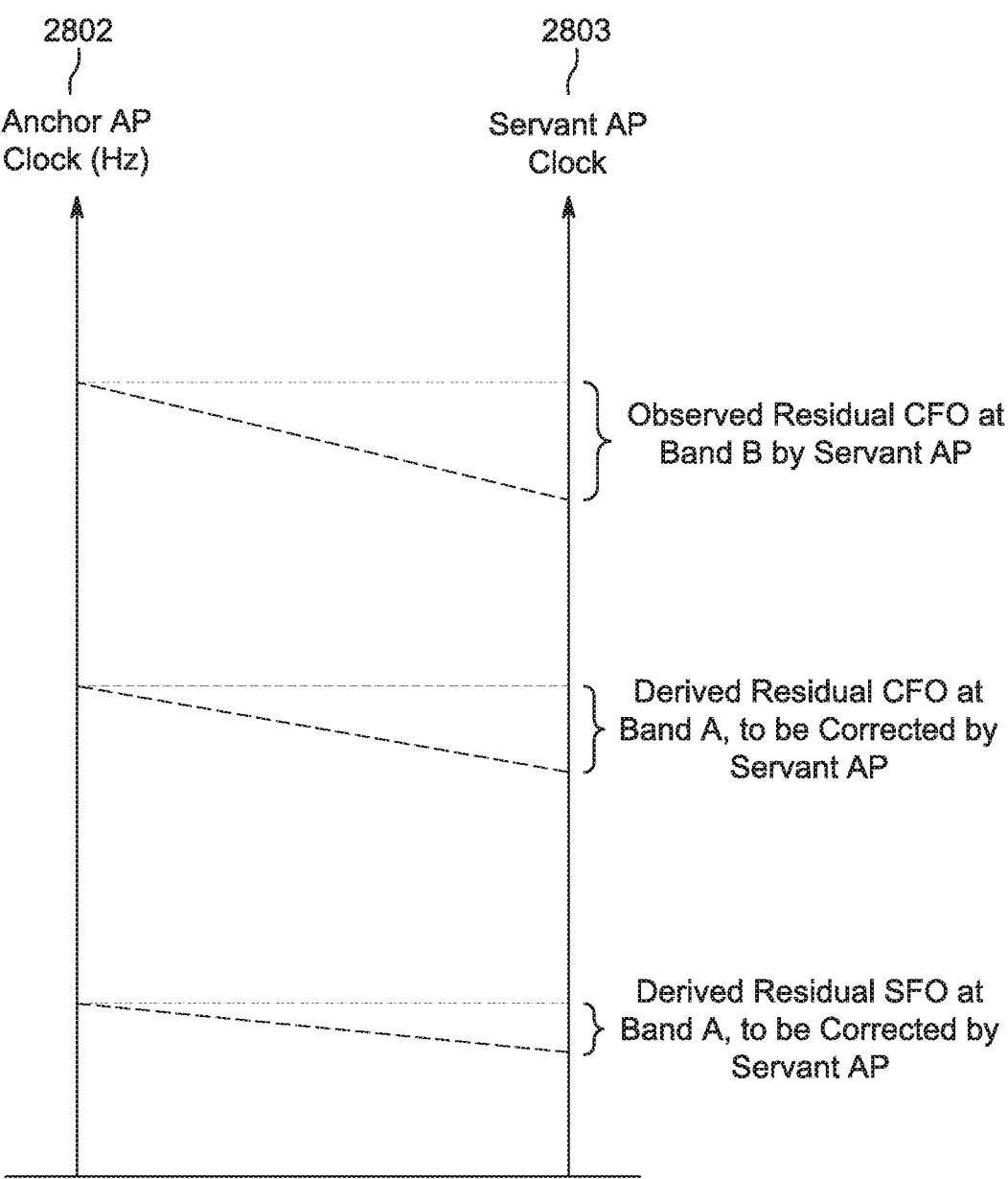
FIG. 28C is a diagram illustrating an example of using a backhaul to correct drift of the access link.

FIG. 28C is a diagram illustrating an example of using a backhaul to correct drift of the access link.

In one case, the anchor AP 2803 may signal to the servant AP 2803 that its backhaul link and access link transmitters have the same clock source or the carrier/symbol frequencies on both links are correlated.

In another case, the anchor AP 2802 may signal to the servant AP 2803 that how its backhaul link and access link carrier/symbol frequencies drifts on both links are correlated. For instance, if the backhaul link from anchor AP 2802 has CFO/SFO of X ppm, then the access link from anchor AP 2802 also has CFO/SFO of X ppm, where X is some number. For example, if the source clock slows down 3 ppm than normal, then the carrier frequency at 5 Hz may slow 5 GHz*3 ppm and carrier frequency at 2.4 GHz may slow 2.4 GHz*3 ppm.

The servant AP 2803 may indicate to the anchor AP 2802 that it may use the above indication to perform frequency synchronization on the access link, based on the observation of the backhaul link 2804. The servant AP 2803 may also have the backhaul link and access link share the same clock source, or the servant AP 2803 may be able to observe in real-time its own clock differences between backhaul and access links. The anchor AP 2802 upon collecting this information from all servant APs (e.g., 2803, may decide to indicate to all servant APs (e.g., 2803) to activate the backhaul-assisted frequency correction during a joint transmission, and/or the joint transmission does not require the transmissions of midambles.

If there are receptions on the backhaul, the servant APs (e.g., 2803) may derive the backhaul CFO/SFO initially based on the estimation LTF/STF, and additionally based on pilot tracking later during the reception. The observed CFO/SFO may be used to correct the received backhaul signals. For example, an AP may apply a symbol dependent phase offset to all OFDM tones of the same symbols to compensate CFO, and/or move the window of the time domain samples before FFT for an OFDM symbol to compensate for the SFO.

After the activation of backhaul-assisted CFO/SFO correction, during the joint transmission, if there are receptions on the backhaul, the servant AP 2803 may use the CFO/SFO estimation of the backhaul at the time, possibly with the correlation of frequencies between backhaul and access links provided by the anchor AP 2802, to determine the corrections for CFO/SFO at the access link at the servant AP 2803 when the signal is transmitted. For example, an AP may apply a symbol dependent phase offset to all OFDM tones of the same symbols to compensate CFO, and/or adjust the time domain waveform after IFFT to compensate for the SFO.

The STA 2801, upon the joint transmission reception, may perform CFO/SFO corrections as if it receives a beamformed transmission from antennas coming from a single AP, to compensate for the error of frequencies between the STA 2801 and the anchor AP 2802. Ideally the servant AP(s) 2803 may have performed the procedures described above to match the anchor AP's 2802 frequencies and behave as if they are the antennas of the anchor AP 2802.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Although the solutions described herein consider 802.11 specific protocols, it is understood that the solutions described herein are not restricted to this scenario and are applicable to other wireless systems as well.

Although SIFS is used to indicate various inter-frame spacing in the examples of the designs and procedures, all other inter-frame spacing such as RIFS, AIFS, DIFS or other agreed time interval could be applied in the same solutions.

Although four RBs per triggered TXOP are shown in some figures as an example, the actual number of RBs/channels/bandwidth utilized may vary.

What is claimed is:

1. A method implemented by a station (STA), the method comprising:

receiving an indication regarding a multi-access point (AP) Hybrid Automatic Repeat Request (HARQ) transmission for a first AP and a second AP;

receiving a first packet with a first association ID, a first basic service set identifier (BSSID), and a HARQ process ID from the first AP, wherein the first packet is received in a first transmission, wherein the first association ID is carried in a first Physical Layer Conformance Procedure (PLCP) header and indicates that the STA is the intended receiver of the first packet, wherein the first BSSID is a locally unique identifier for the first AP;

comparing the first association ID related to the first packet based on information received from the first AP;

determining, without receiving coordination signaling between the first AP and the second AP, the first packet is a first multi-AP HARQ transmission;

decoding the first packet; and starting a timer;

receiving a second packet with a second association ID, a second BSSID, and the HARQ process ID from the second AP, wherein the second packet is received in a second transmission, wherein the second association ID is carried in a second PLCP header and indicates that the STA is the intended receiver of the second packet, wherein the second BSSID is a locally unique identifier for the second AP, and wherein the second packet is a second multi-AP HARQ transmission;

comparing the second association ID related to the second packet based on information received from the second AP;

if the timer has not expired, combining the first packet and the second packet to create a combined packet based on the HARQ process ID associated with the first packet matching the HARQ process ID associated with the second packet, and decoding the combined packet, or if the timer has expired, determining the second packet contains a new transmission, and decoding the second packet; and broadcasting a response to the first AP and the second AP based on whether the second packet completes the first packet.

2. The method of claim 1, further comprising: starting a new timer.

3. The method of claim 1, wherein the response is based on whether the second packet is determined to complete the first packet, and whether the timer has expired.

4. The method of claim 1, wherein the second packet is received after an extended interframe space (EIFS) period.

5. The method of claim 1, wherein the first AP and the second AP are one virtual AP.

6. The method of claim 1, wherein the response includes feedback for one or more resource units of the first packet or the second packet.

7. The method of claim 1, wherein determining that the first packet is the first multi-AP HARQ transmission comprises determining, based on the first BSSID being different from the second BSSID and the HARQ process ID of the first packet matching the HARQ process ID of the second packet, that the first packet and the second packet correspond to a common retransmission attempt from different access points.

8. A station (STA) comprising:

a transceiver; and a processor operatively coupled to the transceiver, wherein the transceiver is configured to:

receive an indication regarding a multi-access point (AP) Hybrid Automatic Repeat Request (HARQ) transmission for a first AP and a second AP; and receive a first packet with a first association ID, a first basic service set identifier (BSSID), and a HARQ HARQ process ID from the first AP, wherein the first packet is received from a first transmission, wherein the first association ID is carried in a first Physical Layer Conformance Procedure (PLCP) header and indicates that the STA is the intended receiver of the first packet, wherein the first BSSID is a locally unique identifier for the first AP;

the processor is configured to:

compare the first association ID related to the first packet based on information received from the first AP;

determine, without receiving coordination signaling between the first AP and the second AP, the first packet is a first multi-AP HARQ transmission;

decode the first packet; and start a timer;

the transceiver is configured to receive a second packet with a second association ID, a second BSSID, and the HARQ process ID from the second AP, wherein the second packet is received from a second transmission, wherein the second association ID is carried in a second PLCP header and indicates that the STA is the intended receiver of the second packet, wherein the second BSSID is a locally unique identifier for the second AP, and wherein the second packet is a second multi-AP HARQ transmission;

the processor is configured to:

compare the second association ID related to the second packet based on information received from the second AP;

if the timer has not expired, combine the first packet and the second packet to create a combined packet based on the HARQ process ID associated with the first packet matching the HARQ process ID associated with the second packet, and decode the combined packet, or if the timer has expired, determine the second packet contains a new transmission, and decode the second packet; and the transceiver is configured to broadcast a response to the first AP and the second AP based on whether the second packet completes the first packet.

9. The STA of claim 8, the processor is further configured to: start a new timer.

10. The STA of claim 8, wherein the response is based on whether the second packet is determined to complete the first packet, and whether the timer has expired.

11. The STA of claim 8, wherein the second packet is received after an extended interframe space (EIFS) period.

12. The STA of claim 8, wherein the first AP and the second AP are one virtual AP.

13. The STA of claim 8, wherein the response includes feedback for one or more resource units of the first packet or the second packet.

14. The STA of claim 8, wherein processor is configured to determine that the first packet is the first multi-AP HARQ transmission based on the first BSSID being different from the second BSSID and the HARQ process ID of the first packet matching the HARQ process ID of the second packet, and that the first packet and the second packet correspond to a common retransmission attempt from different access points.

* * * * *